United States Patent
Arcudi et al.

(10) Patent No.: US 12,540,107 B2
(45) Date of Patent: Feb. 3, 2026

(54) SELECTIVE PHOTOCATALYTIC REDUCTION OF ALKYNES TO ALKENES

(71) Applicant: Northwestern University, Evanston, IL (US)

(72) Inventors: Francesca Arcudi, Evanston, IL (US); Luka Dordevic, Evanston, IL (US); Emily A. Weiss, Evanston, IL (US); Samuel I. Stupp, Evanston, IL (US)

( * ) Notice: Subject to any disclaimer, the term of this patent is extended or adjusted under 35 U.S.C. 154(b) by 63 days.

(21) Appl. No.: 18/556,949

(22) PCT Filed: Apr. 28, 2022

(86) PCT No.: PCT/US2022/026732
§ 371 (c)(1),
(2) Date: Oct. 24, 2023

(87) PCT Pub. No.: WO2022/232393
PCT Pub. Date: Nov. 3, 2022

(65) Prior Publication Data
US 2024/0208885 A1    Jun. 27, 2024

Related U.S. Application Data

(60) Provisional application No. 63/254,395, filed on Oct. 11, 2021, provisional application No. 63/180,798, filed on Apr. 28, 2021.

(51) Int. Cl.
*C07C 5/09* (2006.01)
*B01J 31/18* (2006.01)
*B01J 35/39* (2024.01)

(52) U.S. Cl.
CPC .............. *C07C 5/09* (2013.01); *B01J 31/183* (2013.01); *B01J 35/39* (2024.01); *B01J 2231/645* (2013.01); *B01J 2531/845* (2013.01); *C07C 2531/22* (2013.01)

(58) Field of Classification Search
CPC ......... C07C 5/09; C07C 2531/22; C07C 5/11; B01J 31/183; B01J 35/39; B01J 2231/645; B01J 2531/845
USPC ........................................... 585/272
See application file for complete search history.

(56) References Cited

U.S. PATENT DOCUMENTS

| | | | |
|---|---|---|---|
| 6,054,409 A | 4/2000 | Nguyen et al. | |
| 6,509,292 B1 | 1/2003 | Blankenship et al. | |
| 10,329,217 B2* | 6/2019 | Bunquin | C07C 5/05 |
| 2018/0296569 A1* | 10/2018 | Szade | A61K 31/555 |
| 2020/0225201 A1 | 7/2020 | Swager et al. | |
| 2024/0208884 A1* | 6/2024 | Stone | B01J 35/39 |

FOREIGN PATENT DOCUMENTS

WO    WO-2013057244 A1    4/2013

OTHER PUBLICATIONS

Sustainable Energy Fuels 2018, 2, 2016 (Year: 2016).*

(Continued)

*Primary Examiner* — Prem C Singh
*Assistant Examiner* — Francis C Campanell
(74) *Attorney, Agent, or Firm* — Casimir Jones, S.C.; Anne M. Reynolds

(57) ABSTRACT

Disclosed herein are compositions and methods for the selective photocatalytic reduction of an alkyne compound to an alkene compound (e.g., acetylene to ethylene).

20 Claims, 38 Drawing Sheets

Catalytic hydrogenation

Separation

(56) References Cited

OTHER PUBLICATIONS

Cobalt (III) Porphyrin-catalyzed hydride reduction of alkynes by Shunichi Fukuzumi and Souta Noura (Year: 1997).*
Abdel-Rahman M.K., et al., "Propyne Hydrogenation Over a Pd/Cu(111) Single-Atom Alloy Studied using Ambient Pressure Infrared Spectroscopy", ACS Catalysis, 2020, vol. 10, pp. 9716-9724.
Albani D., et al., "Selective Ensembles in Supported Palladium Sulfide Nanoparticles for Alkyne Semi-hydrogenation", Nature Communication, 2018, vol. 9, Article: 2634, 11 Pages, DOI:10.1038/s41467-018-05052-4.
Arcudi., et al., "Selective Catalytic Conversion of Acetylene to Ethylene Powered by Water and Visible Light," Research Square, Oct. 6, 2021, 25 Pages.
Arcudi F., et al., "Quantum Dot-Sensitized Photoreduction of CO2 in Water with Turnover Number 80,000," Journal of the American Chemical Society, Oct. 19, 2021, vol. 143, No. 43, pp. 18131-18138, Retrieved on Apr. 27, 2022, Retrieved from URL: https://pubs.acs.org/doi/abs/10.1021/jacs.1c06961.
Ardo S., et al., "Non-Nernstian Two-electron Transfer Photocatalysis at Metalloporphyrin-Tio2 Interfaces", Journal of the American Chemical Society, 2011, vol. 133, pp. 16572-16580.
Armbrüster M., et al., "Al13 Fe4 as a Low-cost Alternative for Palladium in Heterogeneous Hydrogenation", Nature Materials, Aug. 2012, vol. 11, pp. 690-693.
Arnett R.L., et al., "The Vibrational Frequencies of Ethylene", The Journal of Chemical Physics, Jan. 1950, vol. 18, No. 1, pp. 118-126.
Ashley K.R., et al., "Kinetic and Equilibrium Study of the Reaction of (meso-Tetrakis(p-sulfonatophenyl)porphyrinato)diaquocobaltate(III) with Pyridine in Aqueous Solution", Inorganic Chemistry, 1981, vol. 20, pp. 2326-2333.
Ashley K.R., et al., "Kinetics of Substitution Reactions of Alpha, Beta, Gamma, Delta-tetra-(p-sulfonatophenyl)porphinatodiaquocobaltate(III)", Inorganic Chemistry, 1976, vol. 15, No. 8, pp. 1937-1939.
Banks R.G.S., et al., "Reactions of Nitrous Oxide with some Transition-metal Complexes", Chemical Communications, Jan. 1, 1967, pp. 387-388, DOI:10.1039/C19670000387.
Becke A.D., "Density-functional Exchange-energy Approximation with Correct Asymptotic Behavior", Physical Review A, Sep. 15, 1988, vol. 38, No. 6, pp. 3098-3100.
Becke A.D., "Density-functional Thermochemistry. III. The Role of Exact Exchange", The Journal of Chemical Physics, 1993, vol. 98, pp. 5648-5652.
Behar., et al., "Cobalt Porphyrin Catalyzed Reduction of CO2. Radiation Chemical, Photochemical, and Electrochemical Studies," The Journal Physical Chemistry, 1998, vol. 102, pp. 2870-2877.
Beyene B.B., et al., "Photocatalytic Hydrogen Evolution from Neutral Aqueous Solution by a Water-soluble Cobalt(II) Porphyrin", Sustainable Energy Fuels, 2018, vol. 2, pp. 2036-2043.
Borodzinski A., et al., "Selective Hydrogenation of Ethyne in Ethene-Rich Streams on Palladium Catalysts Part 1. Effect of Changes to the Catalyst During Reaction", Catalysis Reviews, 2006, vol. 48, pp. 91-144.
Bu J., et al., "Selective Electrocatalytic Semihydrogenation of Acetylene Impurities for the Production of Polymer-grade Ethylene", Nature Catalysis, Jul. 2021, vol. 4, pp. 557-564.
Bullock R.M., et al., "Using Nature's Blueprint to Expand Catalysis with Earth-abundant Metals", Science, Aug. 14, 2020, vol. 369, eabc3183, 11 Pages.
Call A., et al., "Highly Efficient and Selective Photocatalytic CO2 Reduction to CO in Water by a Cobalt Porphyrin Molecular Catalyst," ACS Catalysis, Apr. 17, 2019, vol. 9, pp. 4867-4874.
Chai Y., et al., "Acetylene-Selective Hydrogenation Catalyzed by Cationic Nickel Confined in Zeolite", Journal of the American Chemical Society, May 2019, vol. 141, pp. 9920-9927.
Chan C.W.A., et al., "Interstitial Modification of Palladium Nanoparticles with Boron Atoms as a Green Catalyst for Selective Hydrogenation", Nature Communications, 2014, vol. 5, Article: 5787, 10 Pages, DOI: 10.1038/ncomms6787.

Chen K.J., et al., "Synergistic Sorbent Separation for One-step Ethylene Purification from a Four-component Mixture", Science, Oct. 11, 2019, vol. 366, pp. 241-246 (5 pages).
Ciamician G., "The Photochemistry of the Future", Science, Sep. 27, 1912, New Series, vol. 36, No. 926, pp. 385-394.
De Bruin B., et al., "Hydrogen-atom Transfer in Reactions of Organic Radicals with [CoII(por)].(por=porphyrinato) and in Subsequent Addition of [Co(H)(por)] to Olefins", Chemistry—A European Journal, 2009, vol. 15, pp. 4312-4320.
De Luna P., et al., "What Would it Take for Renewably Powered Electrosynthesis to Displace Petrochemical Processes", Science, Apr. 26, 2019, vol. 364, eaav3506, 10 Pages.
Delley M.F., et al., "Hydrogen on Cobalt Phosphide", Journal of the American Chemical Society, Sep. 2019, vol. 141, pp. 15390-15402.
Ding K., et al., "A General Synthesis Approach for Supported Bimetallic Nanoparticles via Surface Inorganometallic Chemistry", Science, Nov. 2, 2018, vol. 362, No. 6414, pp. 560-564, DOI: 10.1126/science.aau4414.
Dodd D., et al., "β-Styrylcobaloximes: Mechanism of Formation from β-styryl Halides and Mechanism of Cleavage by Electrophiles", Journal of the American Chemical Society, Perkin Transactions II, 1976, vol. 2, pp. 1261-1267, DOI:10.1039/P29760001261.
Fleischer E.B., et al., "Reduction of Acetylene and Nitrogen by a Cobalt-porphyrin System", Journal of the American Chemical Society, 1972, vol. 94, pp. 1382-1384.
Fleischer E.B., et al., "Relationships Between Porphyrin Structure and Reactivity", Annals of the New York Academy of Sciences, 1973, vol. 206, pp. 32-46.
Francl M.M., et al., "Self-consistent Molecular Orbital Methods. XXIII. A Polarization-type Basis Set for Second-row Elements", The Journal of Chemical Physics, Oct. 1, 1982, vol. 77, No. 7, pp. 3654-3665.
Fukuzumi et al., "Cobalt(III) Porphyrin-Catalysed Hydride Reduction of 10-Methylacridinium Ion and Hydrometallation of Alkenes and Alkynes by Tributyltin Hydride," Journal of Porphyrins and Phthalocyanines, 1997, vol. 1, pp. 251-258.
Geyer R., et al., "Production, Use, and Fate of all Plastics Ever Made," Science Advances, Jul. 19, 2017, vol. 3, No. 7 (e1700782), pp. 25-29 (5 Pages).
Ghosh I., et al., "Organic Semiconductor Photocatalyst can Bifunctionalize Arenes and Heteroarenes", Science, Jul. 26, 2019, vol. 365, pp. 360-366.
Gnaim S., et al., "Cobalt-Electrocatalytic Hydrogen Atom Transfer for Functionalization of Unsaturated C—C Bonds", ChemRxiv, Aug. 25, 2021, Version 1, 16 Pages, DOI:10.26434/chemrxiv-2021-b34zl.
Gridnev A.A., et al., "Formation of Organocobalt Porphyrin Complexes by Reactions of Cobalt(II) Porphyrins with Azoisobutyronitrile and Organic Substrates", Journal of the Chemical Society, Chemical Communications, 1993, pp. 1010-1011, DOI:10.1039/C39930001010.
Gupta B.D., et al., "Organocobaloximes: Cobalt-carbon Bond Stability and Synthesis", Inorganica Chimica Acta, 1988, vol. 146, pp. 209-221.
Hehre W.J., et al., "Self-Consistent Molecular Orbital Methods. XII. Further Extensions of Gaussian-Type Basis Sets for use in Molecular Orbital Studies of Organic Molecules", The Journal of Chemical Physics, 1972, vol. 56, pp. 2257-2261.
Howarth R.W., et al., "How Green is Blue Hydrogen", Energy Science & Engineering, Jul. 26, 2021, vol. 9, pp. 1676-1687.
Ichikawa M., et al., "Specific Catalysis By Co(II) Phthalocyanine-Tetrasulfonate in the Selective Reduction of Acetylene With Sodium Boronhydride", Chemistry Letters, 1973, vol. 7, pp. 709-712.
International Search Report and Written Opinion for International Application No. PCT/US2022/026732, mailed Aug. 18, 2022, 09 Pages.
Jakešová M., et al., "Hydrogen-Bonded Organic Semiconductors as Stable Photoelectrocatalysts for Efficient Hydrogen Peroxide Photosynthesis", Advanced Functional Materials, 2016, vol. 26, pp. 5248-5254.
Josephy P.D., et al., "The Horseradish Peroxidase-catalyzed Oxidation of 3,5,3',5'-tetramethylbenzidine, Free Radical and Charge-transfer Complex Intermediates", Journal of Biological Chemistry, Apr. 10, 1982, vol. 257, No. 7, pp. 3669-3675.

(56) References Cited

OTHER PUBLICATIONS

Kamei Y., et al., "Silane- and Peroxide-free Hydrogen Atom Transfer Hydrogenation Using Ascorbic Acid and Cobalt-photoredox Dual Catalysis", Nature Communications, 2021, vol. 12, Article: 966, 09 Pages.

Katari M., et al., "Improved Infrared Spectra Prediction by DFT from a New Experimental Database", Chemistry—A European Journal, 2017, vol. 23, pp. 8414-8423.

Kohler L., et al., "Photoinduced Electron Transfer Kinetics of Linked Ru—Co Photocatalyst Dyads", Journal of Photochemistry & Photobiology A: Chemistry, 2019, vol. 373, pp. 59-65.

Kojima M., et al., "The Merger of Photoredox and Cobalt Catalysis", Trends in Chemistry, May 2020, vol. 2, No. 5, pp. 410-426.

Lee C., et al., "Development of the Colle-Salvetti Correlation-energy Formula into a Functional of the Electron Density", Physical Review B, 1988, vol. 37, pp. 785-789.

Lee S., et al., "Dynamic Metal-polymer Interaction for the Design of Chemoselective and Long-lived Hydrogenation Catalysts", Science Advances, Jul. 8, 2020, vol. 6, No. 28, eabb7369, 10 Pages.

Leveson-Gower R.B., et al., "Unlocking Iminium Catalysis in Artificial Enzymes to Create a Friedel-Crafts Alkylase", ACS Catalysis, 2021, vol. 11, pp. 6763-6770.

Li G., et al., "Evidence for Formation of a Co—H Bond from (H2O)2Co(dmgBF2)2 Under H2: Application to Radical Cyclizations", Journal of the American Chemical Society, 2012, vol. 134, pp. 14662-14665.

Li L., et al., "Ethane/ethylene Separation in a Metal-organic Framework with Iron-peroxo Sites", Science, Oct. 26, 2018, vol. 362, pp. 443-446.

Lin Z., et al., "Highly Efficient Cooperative Catalysis by Col III(Porphyrin) Pairs in Interpenetrating Metal-Organic Frameworks," Angewandte Chemie International Edition, 2016, vol. 128, pp. 13943-13947.

Liu C., et al., "Ligand Controls the Activity of Light-Driven Water Oxidation Catalyzed by Nickel(II) Porphyrin Complexes in Neutral Homogeneous Aqueous Solutions", Angewandte Chemie International Edition, 2021, vol. 60, pp. 13463-13469.

Liu Y., et al., "Adsorbate-induced Structural Evolution of Pd Catalyst for the Selective Hydrogenation of Acetylene", ACS Catalysis, 2020, vol. 10, pp. 15048-15059.

Michiyuki T., et al., "Recent Advances in Four-Coordinated Planar Cobalt Catalysis in Organic Synthesis", Asian Journal of Organic Chemistry, 2020, vol. 9, pp. 343-358.

Miller S.I., "Notes—A Comparison of the Electrophilic Reactivity of Styrene and Phenylacetylene", The Journal of Organic Chemistry, Feb. 1956, vol. 21, pp. 247-248.

Niu Y., et al., "Manipulating Interstitial Carbon Atoms in the Nickel Octahedral Site for Highly Efficient Hydrogenation of Alkyne", Nature Communications, 2020, vol. 11, Article: 3324, 9 Pages, DOI:10.1038/s41467-020-17188-3.

"Sodium Phosphate", Cold Spring Harbor Protocols, 2006, 1 Pages, Retrieved from: https://cshprotocols.cshlp.org/content/2006/1/pdb.rec8303, Retrieved on Jan. 1, 2006, DOI:10.1101/pdb.rec8303.

Osswald J., et al., "Palladium-gallium Intermetallic Compounds for the Selective Hydrogenation of Acetylene Part II: Surface Characterization and Catalytic Performance", Journal of Catalysis, 2008, vol. 258, pp. 219-227.

Prier C.K., et al., "Visible Light Photoredox Catalysis with Transition Metal Complexes: Applications in Organic Synthesis," Chemical Reviews, Mar. 19, 2013, vol. 113, No. 7, pp. 5322-5363.

Pyper J.W., et al., "Equilibrium in the Deuterium Exchange of Acetylene and Water", The Journal of Chemical Physics, Oct. 1, 1964, vol. 41, pp. 1890-1896.

Pyper J.W., et al., "Hydrogen-deuterium Exchange in Acetylene and Between Acetylene and Water", The Journal of Chemical Physics, Jul. 15, 1977, vol. 67, pp. 845-846.

Rassolov V.A., et al., "6-31G* Basis Set for Atoms K Through Zn", The Journal of Chemical Physics, Jul. 22, 1998, vol. 109, pp. 1223-1229.

Savateev A., et al., "Photoredox Catalytic Organic Transformations Using Heterogeneous Carbon Nitrides", Angewandte Chemie International Edition, 2018, vol. 57, pp. 15936-15947.

Schultz D.M., et al., "Solar Synthesis: Prospects in Visible Light Photocatalysis", Science, Feb. 28, 2014, vol. 343, pp. 1239176-1239176.

Shi R., et al., "Room-temperature Electrochemical Acetylene Reduction to Ethylene with High Conversion and Selectivity", Nature Catalysis, Jul. 2021, vol. 4, pp. 565-574.

Sholl D.S., et al., "Seven Chemical Separations to Change the World", Nature, Apr. 28, 2016, vol. 532, pp. 435-437.

Soriano-Lopez et al., "Photoinduced Oxygen Evolution Catalysis Promoted by Polyoxometalate Salts of Cationic Photosensitizers," Frontiers in Chemistry, 2018, vol. 6, Article. 302.

Steinberger B., et al., "Selective Hydrogenation of the CC-triple Bond in Phc=cph by Tris(triphenylphosphine)cobalt Activated Nabh4; Deuterium Tracing Experiments", Journal of Organometallic Chemistry, 1983, vol. 244, pp. 283-288.

Studt F., et al., "Identification of Non-precious Metal Alloy Catalysts for Selective Hydrogenation of Acetylene", Science, Jun. 6, 2008, vol. 320, No. 5881, pp. 1320-1322, DOI: 10.1126/science.1156660.

Swearer D.F., et al., "Heterometallic Antenna-reactor Complexes for Photocatalysis", PNAS, Aug. 9, 2016, vol. 113, No. 32, pp. 8916-8920.

Symoens S.H., et al., "State-of-the-art of Coke Formation during Steam Cracking: Anti-Coking Surface Technologies", Industrial & Engineering Chemistry Research Journal, 2018, vol. 57, pp. 16117-16136.

Tavasoli A.V., et al., "Photocatalytic Dry Reforming: What is it Good for?", Energy & Environmental Science, 2021, vol. 14, pp. 3098-3109.

Teschner D., et al., "The Roles of Subsurface Carbon and Hydrogen in Palladium-Catalyzed Alkyne Hydrogenation", Science, Apr. 4, 2008, vol. 320, No. 5872, pp. 86-89, DOI: 10.1126/science.1155200.

Wang Z., et al., "Enhancement of Alkyne Semi-Hydrogenation Selectivity by Electronic Modification of Platinum", ACS Catalysis, 2020, vol. 10, pp. 6763-6770.

Zhou S., et al., "Pd Single-Atom Catalysts on Nitrogen-Doped Graphene for the Highly Selective Photothermal Hydrogenation of Acetylene to Ethylene", Advanced Materials, 2019, vol. 31, 1900509, 7 Pages.

Zoltan T., et al., "Influence of Charge and Metal Coordination of Meso-substituted Porphyrins on Bacterial Photoinactivation", Spectrochimica Acta Part A: Molecular and Biomolecular Spectroscopy, 2015, vol. 135, pp. 747-756.

* cited by examiner

Catalytic hydrogenation

Separation

Photoreduction

SELECTIVE PHOTOCATALYTIC REDUCTION OF ALKYNES TO ALKENES

CROSS-REFERENCE TO RELATED APPLICATIONS

This application is a national stage entry under 35 U.S.C. 371 of International Patent Application No. PCT/US2022/026732, filed on Apr. 28, 2022, which claims priority to and the benefit of U.S. Provisional Patent Application No. 63/180,798, filed on Apr. 28, 2021, and U.S. Provisional Patent Application No. 63/254,395, filed on Oct. 11, 2021, the entire contents of each of which are incorporated herein by reference.

STATEMENT REGARDING FEDERALLY SPONSORED RESEARCH

This invention was made with government support under DE-SC0000989 awarded by the Department of Energy. The government has certain rights in the invention.

TECHNICAL FIELD

Disclosed herein are compositions and methods for the selective photocatalytic reduction of alkynes to alkenes, e.g., acetylene to ethylene.

BACKGROUND

The selective hydrogenation of alkynes to alkenes is an important process in chemical industry, being relevant to the production of commodity chemicals. Ethylene is a versatile chemical intermediate in the petrochemical industry for the preparation of some of the world's most used plastics (polyethylene, polyvinyl chloride, and polystyrene). However, ethylene obtained from steam cracking can contain up to 2% acetylene, which is a poison for the polymerization process, and thus is usually removed. Others have optimized energy-intensive thermochemical routes for the acetylene-to-ethylene conversion, such as the catalytic thermal semi-hydrogenation using $H_2$ gas feedstock, precious metal catalyst (e.g., palladium), and high temperature (FIG. 1A) (see U.S. Pat. No. 6,054,409, see Borodziński et al. *Catal. Rev.-Sci. Eng.* 48, 91-144 (2006)).

Over-hydrogenation to ethane is an inherent limitation of precious metal catalysts that achieve high conversion using $H_2$ as the hydrogen source (Borodziński 2006; Armbruster et al. *Nat. Mater.* 11, 690-693 (2012); Wang et al. *ACS Catal.* 10, 6763-6770 (2020)). Traditional thermal hydrogenation also has disadvantages with respect to safety and sustainability: it is an energy-intensive (high-pressure, high-temperature) thermochemical reaction in an $H_2$ atmosphere, where the $H_2$ is usually needed in excess and this excess must be separated to avoid possible thermal run-away processes (Borodziński 2006). Physisorption-based acetylene purification (FIG. 1B) is energy-efficient (Chen. et al. *Science* 366, 241-246 (2019); Li et al. *Science* 362, 443-446 (2018)), but wastes the separated acetylene rather than converting it to valuable ethylene.

The mild conditions of electrochemical transformations have been exploited to achieve near 100% conversion of acetylene in the presence of excess of ethylene with 21% energy efficiency, and ethylene selectivity of 90.1% with 0.08% residual hydrogen using 0.5 vol. % $C_2H_2$, 20 vol. % $C_2H_4$, Ar balance as gas feed (Shi et al. *Nat. Catal.* 4, 565-574 (2021)), or ethylene selectivity of 97% with 0.7% residual hydrogen from a $C_2H_4$ feed with 1.0 vol. % of $C_2H_2$(Bu et al. *Nat. Catal.* 4, 557-564 (2021)).

With respect to light-powered hydrogenation, a photothermal system achieved 99% conversion of acetylene in the presence of excess of ethylene and $H_2$ gas (1 vol. % $C_2H_2$, 20 vol. % $C_2H_4$, 20 vol. % $H_2$, Ar balance) but with a selectivity of only 93.5% (Zhou et al. *Adv. Mater.* 31, 1-7 (2019)). A photocatalytic system achieved 97% selectivity but with a pure acetylene feed (5 vol. %, He balance) and $H_2$ gas, and had a lower saturated acetylene hydrogenation yield (~5%) than the analogous thermal reaction (~18%) (Swearer et al. *Proc. Natl. Acad. Sci. U.S.A* 113, 8916-8920 (2016)). However, both of these systems have the disadvantage of requiring the precious metal Pd as the catalyst and an external feed of flammable $H_2$.

SUMMARY

In one aspect, disclosed herein is a method of synthesizing an alkene compound from an alkyne compound, comprising: providing a first mixture comprising a cobalt(III) porphyrin compound, a photosensitizer, a reducing agent, and water; adding an alkyne compound to the first mixture to form a reaction mixture; and illuminating the reaction mixture with light.

In some embodiments, the cobalt(III) porphyrin compound is selected from [{meso-tetra(4-sulfonatophenyl)porphyrinato}cobalt(III)] and [{meso-tetra(4-carboxyphenyl)porphyrinato}cobalt(III)]. In some embodiments, the cobalt(III) porphyrin compound is [{meso-tetra(4-sulfonatophenyl)porphyrinato}cobalt(III)]. In some embodiments, the first mixture comprises the cobalt(III) porphyrin compound at a concentration of about 0.10 μM to about 50 μM.

In some embodiments, the photosensitizer is selected from tris(2,2'-bipyridyl)dichlororuthenium(II) and mesoporous graphitic carbon nitride. In some embodiments, the photosensitizer is tris(2,2'-bipyridyl)dichlororuthenium(II). In some embodiments, the first mixture comprises the tris (2,2'-bipyridyl)dichlororuthenium(II) photosensitizer at a concentration of about 50 μM to about 500 μM. In some embodiments, the photosensitizer is mesoporous graphic carbon nitride. In some embodiments, the first mixture comprises about 2.5 mg of the mesoporous graphitic carbon nitride.

In some embodiments, the reducing agent is sodium ascorbate, or a mixture of sodium ascorbate and triethanolamine. In some embodiments, the first mixture comprises the reducing agent at a concentration of about 0.01 M to about 0.50 M.

In some embodiments, the alkyne compound is a $C_2$-$C_4$ alkyne and the alkene compound is a $C_2$-$C_4$ alkene. In some embodiments, the alkyne compound is acetylene and the alkene compound is ethylene. In some embodiments, the alkyne compound is propyne and the alkene compound is propylene. In some embodiments, the method comprises illuminating the reaction mixture with visible light from a light-emitting diode.

In some embodiments, the first mixture is provided in a reaction vessel, and the step of adding the alkyne compound to the first mixture comprises adding the alkyne compound to the reaction vessel at a pressure of about 1 atm.

In some embodiments, the method is conducted at ambient temperature.

In another aspect, disclosed herein is a composition comprising a cobalt(III) porphyrin compound, a photosensitizer, a reducing agent, and water.

In some embodiments, the cobalt(III) porphyrin compound is selected from [{meso-tetra(4-sulfonatophenyl)porphyrinato}cobalt(III)] and [{meso-tetra(4-carboxyphenyl)porphyrinato}cobalt(III)]. In some embodiments, the cobalt(III) porphyrin compound is [{meso-tetra(4-sulfonatophenyl)porphyrinato}cobalt(III)]. In some embodiments, the composition comprises the cobalt(III) porphyrin compound at a concentration of about 0.10 µM to about 50 µM.

In some embodiments, the photosensitizer is selected from tris(2,2'-bipyridyl)dichlororuthenium(II) and mesoporous graphitic carbon nitride. In some embodiments, the photosensitizer is tris(2,2'-bipyridyl)dichlororuthenium(II). In some embodiments, the composition comprises the tris(2,2'-bipyridyl)dichlororuthenium(II) photosensitizer at a concentration of about 50 µM to about 500 µM. In some embodiments, the photosensitizer is mesoporous graphitic carbon nitride. In some embodiments, the composition comprises about 2.5 mg of the mesoporous graphitic carbon nitride.

In some embodiments, the reducing agent is sodium ascorbate. In some embodiments, the reducing agent comprises a mixture of sodium ascorbate and triethanolamine. In some embodiments, the composition comprises the reducing agent at a concentration of about 0.01 M to about 0.50 M.

In some embodiments, the composition has a pH of about 8.0 to about 11.0.

In some embodiments, the composition further comprises an alkyne compound. In some embodiments, the alkyne compound is a $C_2$-$C_4$ alkyne. In some embodiments, the alkyne compound is acetylene or propyne. In some embodiments, the alkyne compound is acetylene.

Other aspects and embodiments of the disclosure will become apparent in light of the following description and drawings.

BRIEF DESCRIPTION OF THE DRAWINGS

FIG. 1A shows a known process for purifying ethylene from acetylene contaminant: semi-hydrogenation of impurity acetylene using noble-metal catalysts and $H_2$ at high temperature; FIG. 1B shows a method for capture and separation of acetylene from acetylene/ethylene mixtures using porous materials; and FIG. 1C shows a method according to the present disclosure, with ≥99% selective photoreduction of acetylene to ethylene powered by visible light and water at room temperature FIG. 2A shows $[Ru(bpy)_3]^{2+}$ or mpg-CN photosensitizers and CoTPPS catalyst, with redox potentials shown. FIG. 2B shows TON ($C_2H_4$) by the $[Ru(bpy)_3]^{2+}$/CoTPPS system containing 1 µM CoTPPS, 50 µM $[Ru(bpy)_3]^{2+}$, 0.1 M NaAsc and 0.1 M NaHCO$_3$ under $C_2H_2$ (≥99.5 vol. %) irradiated (450 nm) for 6 h, and with conditions that differ from the optimized conditions, as indicated in the axis labels. The inset shows TON ($C_2H_4$) and $S_{C2H4}$ as a function of irradiation time by the $[Ru(bpy)_3]^{2+}$/CoTPPS system. FIG. 2C shows TON ($C_2H_4$) by the mpg-CN/CoTPPS system containing 10 µM CoTPPS, 2.5 mg mpg-CN, 0.05 M NaAsc and 0.2 M TEOA under $C_2H_2$ (≥99.5 vol. %) irradiated (450 nm) for 12 h, and with conditions that differ from the optimized conditions, as indicated in the axis labels. The inset shows TON ($C_2H_4$) and $S_{C2H4}$ as a function of irradiation time by the mpg-CN/CoTPPS system. Error bars are calculated from two to three runs; uncertainty is ≤10%.

FIG. 3A shows a proposed mechanism for the photoreduction of acetylene to ethylene by the $[Ru(bpy)_3]^{2+}$/CoTPPS system (Asc is ascorbate, PS is photosensitizer and SD is sacrificial donor). FIG. 3B shows that the Co$^{III}$-porphyrin is reduced by AscH$^-$ to Co$^{II}$. FIG. 3C shows Stern-Volmer plots for the quenching of the $[Ru(bpy)_3]^{2+*}$ emission lifetime by NaAsc or CoTPPS. FIG. 3D shows GC-MS spectra of acetylene (left) feedstock and ethylene (right) product for the irradiated (450 nm) $[Ru(bpy)_3]^{2+}$/CoTPPS system under $C_2H_2$ (5 vol. %, He balance) in MilliQ $H_2O$ (green) or in $D_2O$ (blue, purple). The shift m/z+2 in $H_2O$ corresponds to incorporation of two hydrogens to produce $C_2H_4$ when starting with $C_2H_2$. The shifts m/z+4 in $D_2O$ correspond to incorporation of two deuteriums to produce $C_2H_2D_2$ when starting with $C_2H_2$ (blue) or of two deuteriums to produce $C_2D_4$ when starring with $C_2D_2$ (purple). FIG. 3E shows experimental gas phase IR spectrum of $C_2H_2D_2$ product (blue) for the irradiated (450 nm) $[Ru(bpy)_3]^{2+}$/CoTPPS system in $D_2O$ (blue in (d)), compared with the DFT calculated gas-phase spectra (black).

FIG. 5A: Gas chromatograms (retention times of $C_2H_4$, $C_2H_2$ and $C_2H_6$) with total ion count of $C_2H_4$ standard (2 vol. %) (green) and $C_2H_6$ standard (2 vol. %) (green), $C_2H_2$ standard (5 vol. %) (magenta), and a $C_2H_2$ (5 vol. %)-purged $H_2O$ solution containing 500 µM $[Ru(bpy)_3]^{2+}$, 10 µM CoTPPS, 0.1 M NaAsc and 0.1 M NaHCO$_3$ after irradiation at 450 nm (140 mW·cm$^{-2}$) for 18 h (black). The pH was 8.4 before bubbling gas. FIG. 5B: Mass spectrum of $C_2H_2$. FIG. 5C Mass spectrum of $C_2H_4$. FIG. 5D: Mass spectrum of $C_2H_6$.

FIG. 6A: Calibration curve for $C_2H_4$ with the corresponding coefficient of linear correlation ($R^2$). FIG. 6B: Calibration curve for $C_2H_6$ with the corresponding coefficient of linear correlation ($R^2$).

FIG. 8A: GC chromatograms with total ion count of $CH_3COOC_2H_5$ standard, $(CH_3CH_2)_2O$ standard, HCOOH standard, $CH_3CH_2OH$ standard, $CH_3CHO$ standard, $CH_3OH$ standard, and a $C_2H_2$ (≥99.5 vol. %)-purged $H_2O$ solution containing 50 µM

[Ru(bpy)$_3$]$^{2+}$, 1 μM CoTPPS, 0.1 M NaAsc and 0.1 M NaHCO$_3$ after kept in the dark or after irradiation at 450 nm (140 mW·cm$^{-2}$) (black) for 6 h. The pH was 8.4 before bubbling gas. * is N$_2$ or O$_2$;  is CO$_2$; * is H$_2$O; **** is CH$_3$COCH$_3$ (contained in C$_2$H$_2$≥99.5 vol. %, Airgas). FIGS. 8B-8H show mass spectra of CH$_3$COOC$_2$H$_5$, (CH$_3$CH$_2$)$_2$O, HCOOH, CH$_3$CH$_2$OH, CH$_3$CHO, CH$_3$OH, and C$_2$H$_2$. Note: No H$_2$O$_2$ was detected using horse radish peroxidase (HRP) and 3,3',5,5'-tetramethylbenzidine (TMB) assay.

FIG. 12A: TON (C$_2$H$_4$) by the [Ru(bpy)$_3$]$^{2+}$/CoTPPS system under C$_2$H$_2$ (≥99.5 vol. %) irradiated at 450 nm (140 mW·cm$^{-2}$) for 6 h through variation of 0.1 M SD in the presence of 50 μM [Ru(bpy)$_3$]$^{2+}$ and 1 μM CoTPPS. Error bars indicate standard error of the mean, calculated from two to three runs (trace C$_2$H$_4$ with Na$_2$SO$_3$ were detected). FIG. 12B: Absorption spectra of 3.0 mL C$_2$H$_2$ (≥99.5 vol. %)-purged H$_2$O containing 1 μM CoTPPS without (top) and with 1 mM SD and recorded after 3 min stirring. The pH measured before bubbling gas is 10.6 with TEOA, 7.0 with EDTA and 8.4 with the other SDs. The sample with NaAsc contains 0.1 M NaHCO$_3$. Previous work reported [Co$^{III}$P(H$_2$O)(OH)] and [Co$^{II}$P(OH)] as predominant species at pH=8.4.

FIG. 13A: Structure of the MTPPS (M=H$_2$, Mn$^{III}$, Fe$^{III}$, Co$^{III}$, Ni$^{II}$, Cu$^{II}$, Zn$^{II}$) catalysts. FIG. 13B: TON (C$_2$H$_4$) by the [Ru(bpy)$_3$]$^{2+}$/MTPPS system under C$_2$H$_2$ (≥99.5 vol. %) irradiated at 450 nm (140 mW·cm$^{-2}$) for 6 h through variation of 1 μM MTPPS (M=H$_2$, Mn$^{III}$, Fe$^{III}$, Co$^{III}$, Ni$^{II}$, Cu$^{II}$, Zn$^{II}$) in the presence of 50 μM [Ru(bpy)$_3$]$^{2+}$, 0.1 M NaAsc and 0.1 M NaHCO$_3$. The pH measured before bubbling gas is 8.4. Error bars indicate standard error of the mean, calculated from two to three runs.

FIG. 14A: Absorption spectra of 2.0 mL C$_2$H$_2$ (≥99.5 vol. %)-purged H$_2$O containing 10 μM CoTPPS, 0.1 M NaAsc and 0.1 M NaHCO$_3$ upon irradiation at 450 nm (140 mW·cm$^{-2}$). The pH was 8.4 before bubbling gas. FIG. 14B: Absorption spectra of 2.0 mL C$_2$H$_2$ (≥99.5 vol. %)-purged H$_2$O containing 50 μM [Ru(bpy)$_3$]$^{2+}$, 0.1 M NaAsc and 0.1 M NaHCO$_3$ upon irradiation at 450 nm (140 mW·cm$^{-2}$). The pH was 8.4 before bubbling gas. FIG. 14C: Time-dependent absorbance changes at 412 nm for 2.0 mL C$_2$H$_2$ (≥99.5 vol. %)-purged H$_2$O containing 10 μM CoTPPS, 0.1 M NaAsc and 0.1 M NaHCO$_3$ (red) or at 454 nm for 2.0 mL C$_2$H$_2$ (≥99.5 vol. %)-purged H$_2$O containing 50 μM [Ru(bpy)$_3$]$^{2+}$, 0.1 M NaAsc and 0.1 μM NaHCO$_3$ (blue) upon irradiation at 450 nm (140 mW·cm$^{-2}$). FIG. 14D: Photographs of the quartz cuvettes with septum cap, used to monitor the absorptions over time, containing either 10 μM CoTPPS, 0.1 M NaAsc and 0.1 M NaHCO$_3$ (left) or 50 μM [Ru(bpy)$_3$]$^{2+}$, 0.1 M NaAsc and 0.1 M NaHCO$_3$ (right).

Figure 22A:
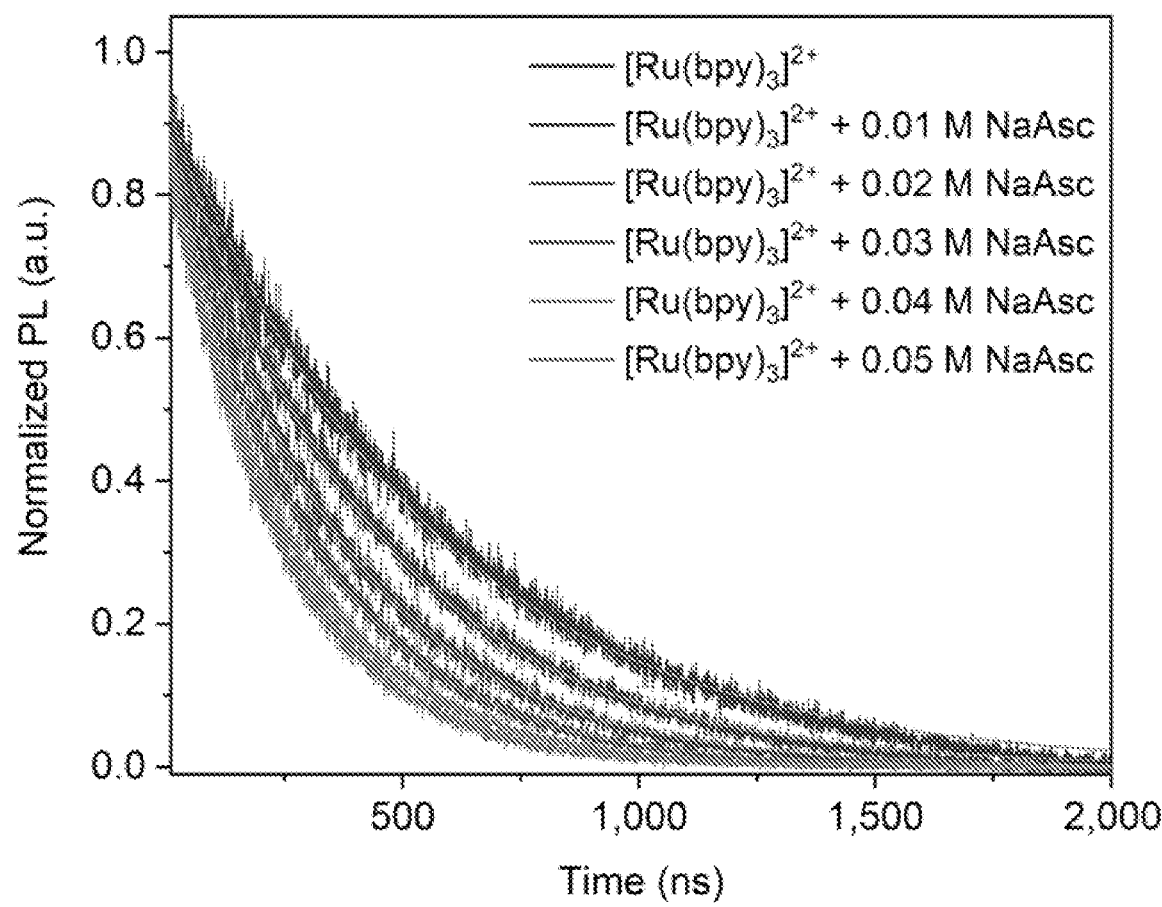
Figure 22B:
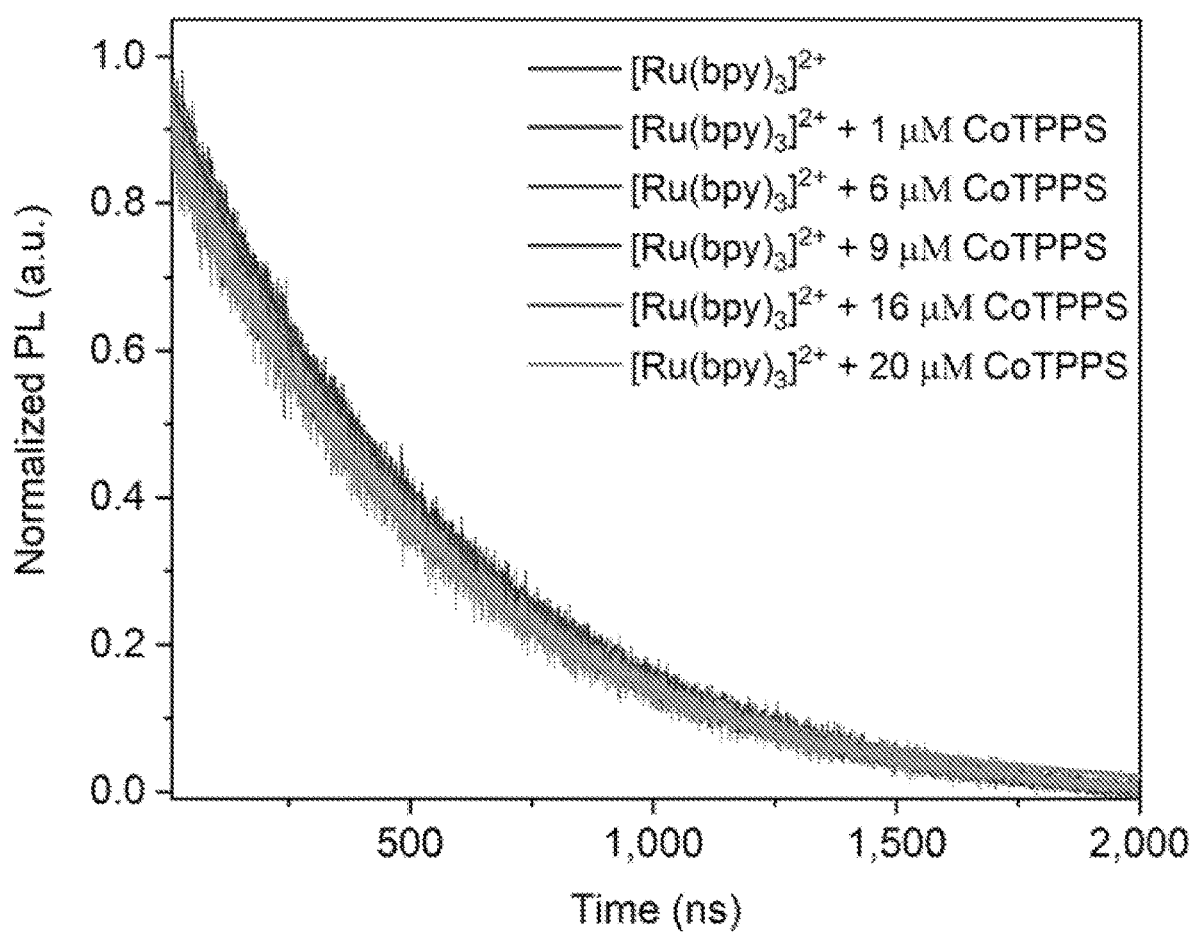
Figure 22C:
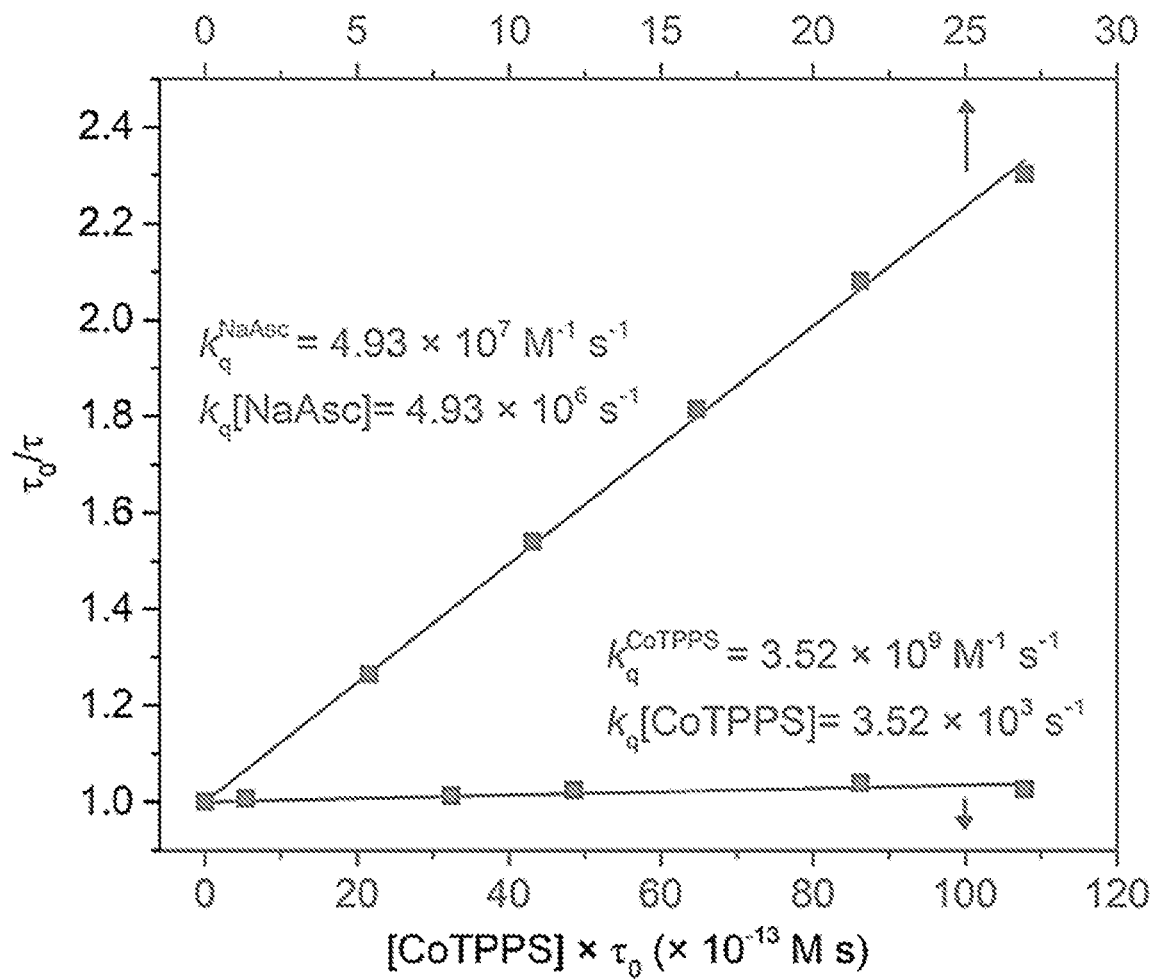

FIGS. 22A-C show PL quenching experiments. FIG. 22A: Decay of the PL of $[Ru(bpy)_3]^{2+}$ without (blue) and with added 0.01-0.05 M NaAsc (cyan to green). FIG. 22B: Decay of the PL of $[Ru(bpy)_3]^{2+}$ without (blue) and with added 1-10 µM CoTPPS (purple to pink). FIG. 22C: Modified Stern-Volmer quenching plot of the $[Ru(bpy)_3]^{2+}$ lifetimes as a function of the product of the $[Ru(bpy)_3]^{2+}$ lifetime in absence of quencher ($\tau_0$) with different [CoTPPS] (red) and [NaAsc] (grey) and correspondent bimolecular rate constants and quenching rates.

Figure 23A:
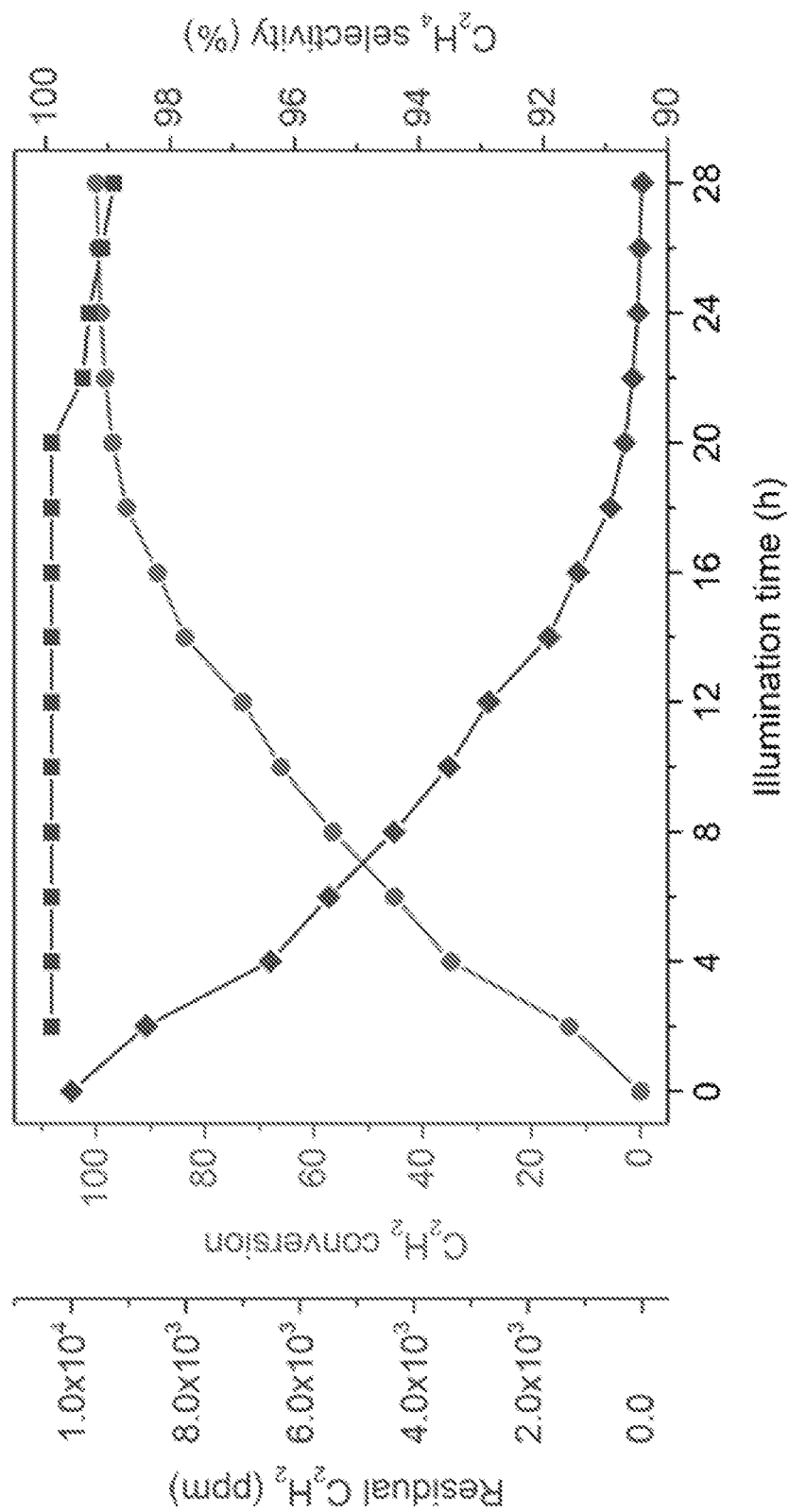
Figure 23B:
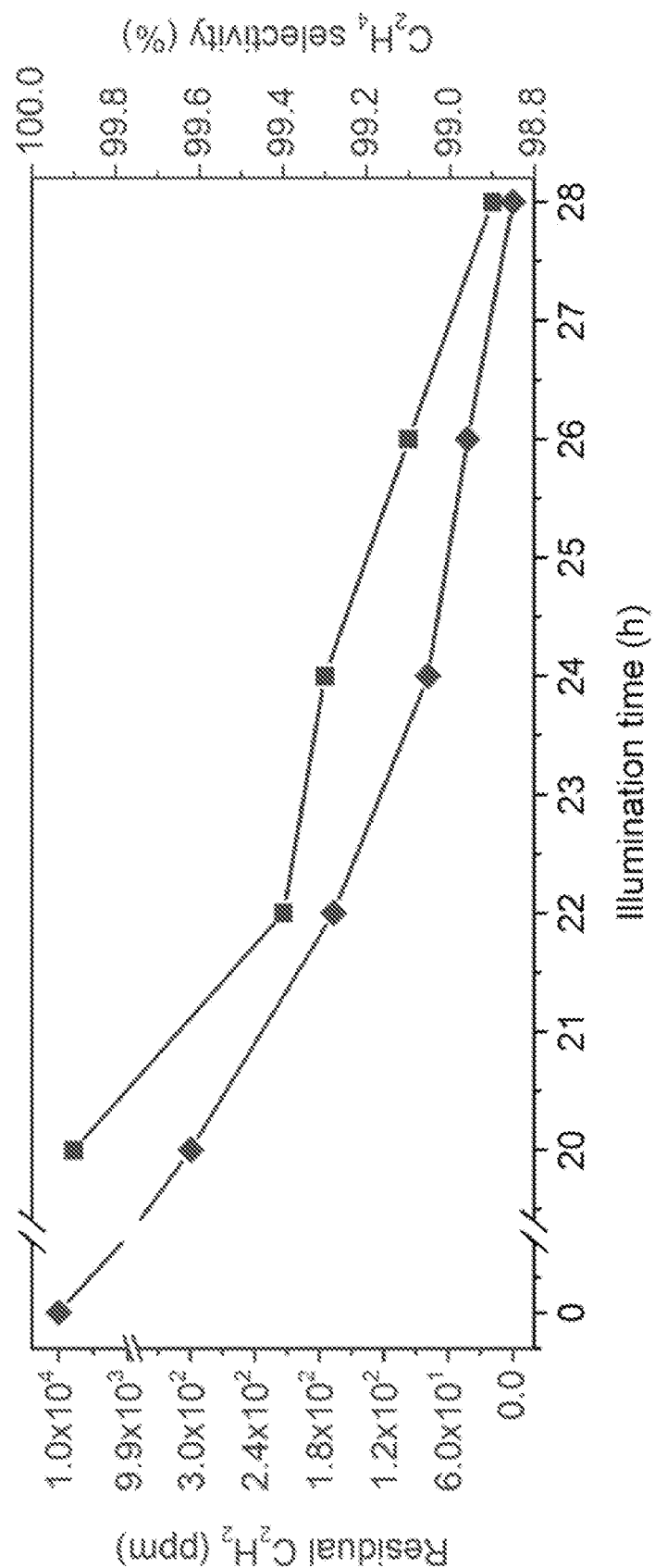

FIGS. 23A-23B show photoreduction of the ethylene/acetylene mixture. FIG. 23A: $C_2H_2$ conversion (red), residual $C_2H_2$ concentration (wine) and selectivity for $C_2H_4$ (blue) as a function of irradiation time (at 450 nm) by the $[Ru(bpy)_3]^{2+}$/CoTPPS system containing 500 µM $[Ru(bpy)_3]^{2+}$, 25 µM CoTPPS, 0.1 M NaAsc and 0.1 M $NaHCO_3$ under $C_2H_2/C_2H_4$ (1 vol. % $C_2H_2$, 30 vol. % $C_2H_4$, He balance) mixture using GC-FID. The pH was 8.4 before bubbling with $C_2H_2/C_2H_4$ mixture. FIG. 23B: Zoomed plot from A to better display the residual $C_2H_2$ concentration (wine) and the selectivity for $C_2H_4$ (blue) (108 ppm of $C_2H_6$ are detected after 28 h of irradiation).

Figure 24:
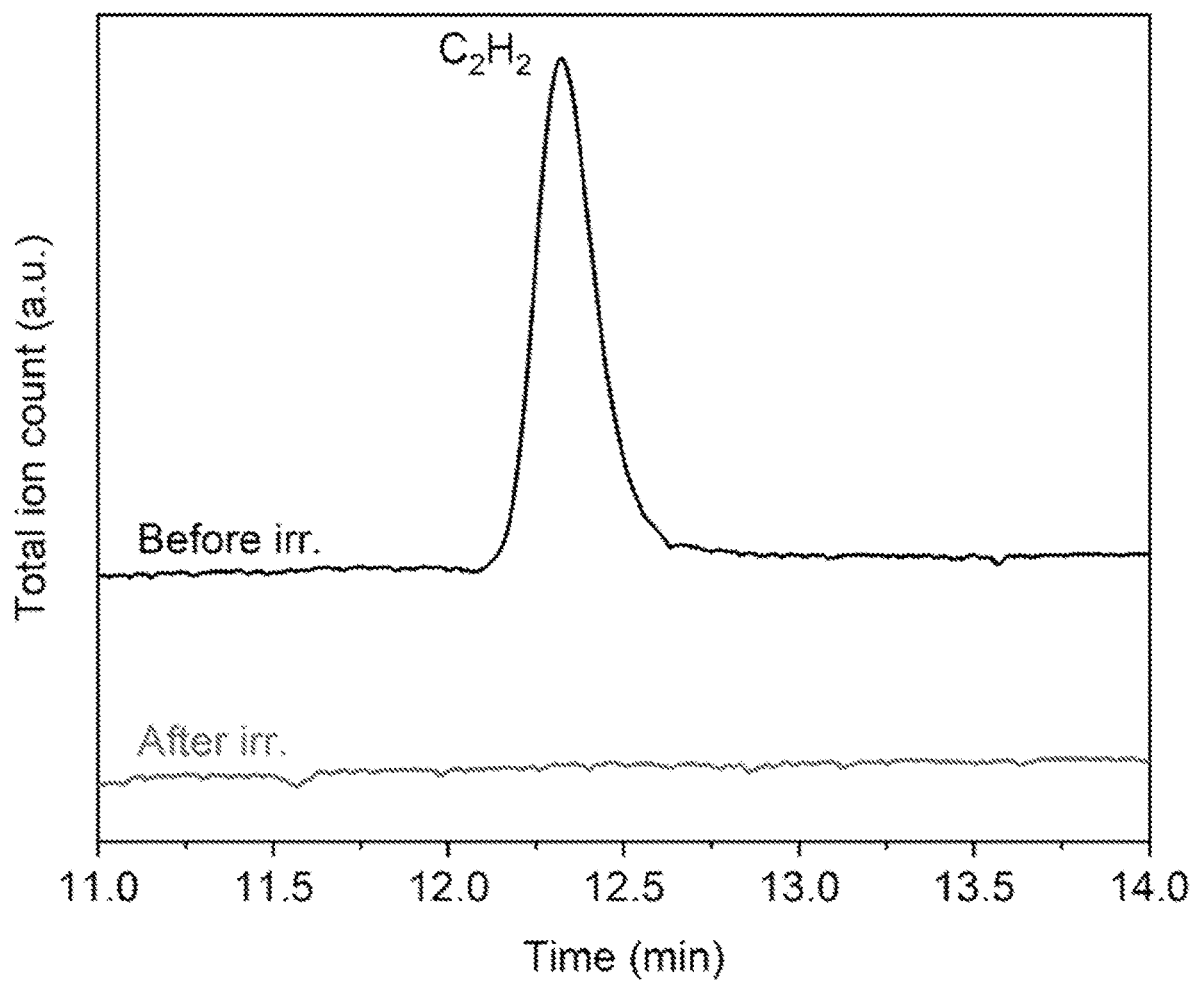

FIG. 24 shows typical GC-FID chromatograms of acetylene observed before and after photoreduction of the ethylene/acetylene mixture. Gas chromatograms (retention time of $C_2H_2$) with total ion count before (black) and after (red) irradiation (450 nm) for 28 h of the $[Ru(bpy)_3]^{2+}$/CoTPPS system containing 500 µM $[Ru(bpy)_3]^{2+}$, 25 µM CoTPPS, 0.1 M NaAsc and 0.1 M $NaHCO_3$ under $C_2H_2/C_2H_4$ (1 vol. % $C_2H_2$, 30 vol. % $C_2H_4$, He balance) mixture. The pH was 8.4 before bubbling with $C_2H_2/C_2H_4$ mixture.

Figure 25A:
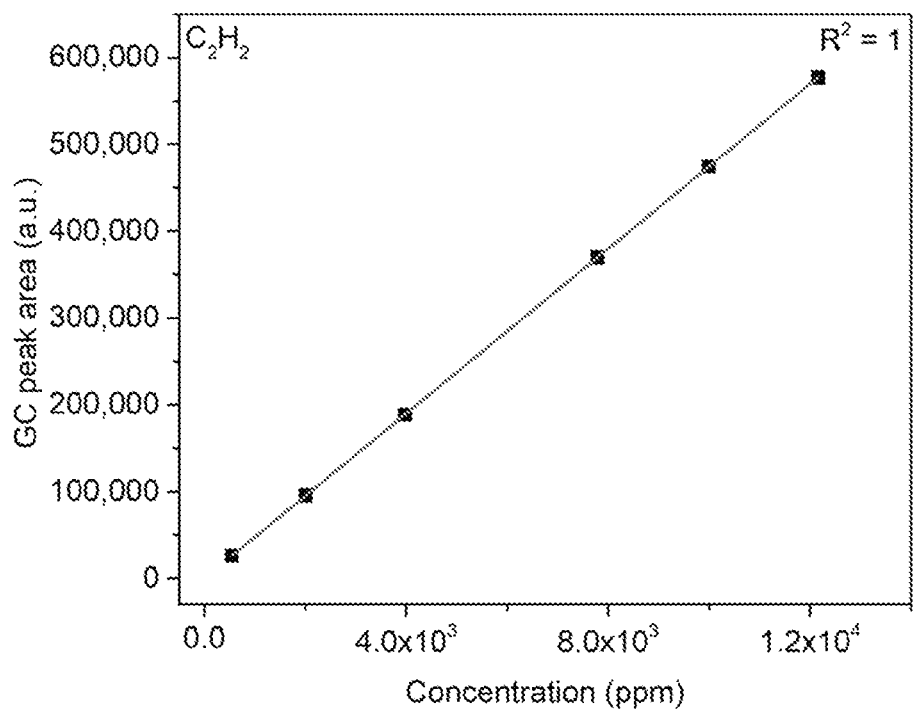
Figure 25B:
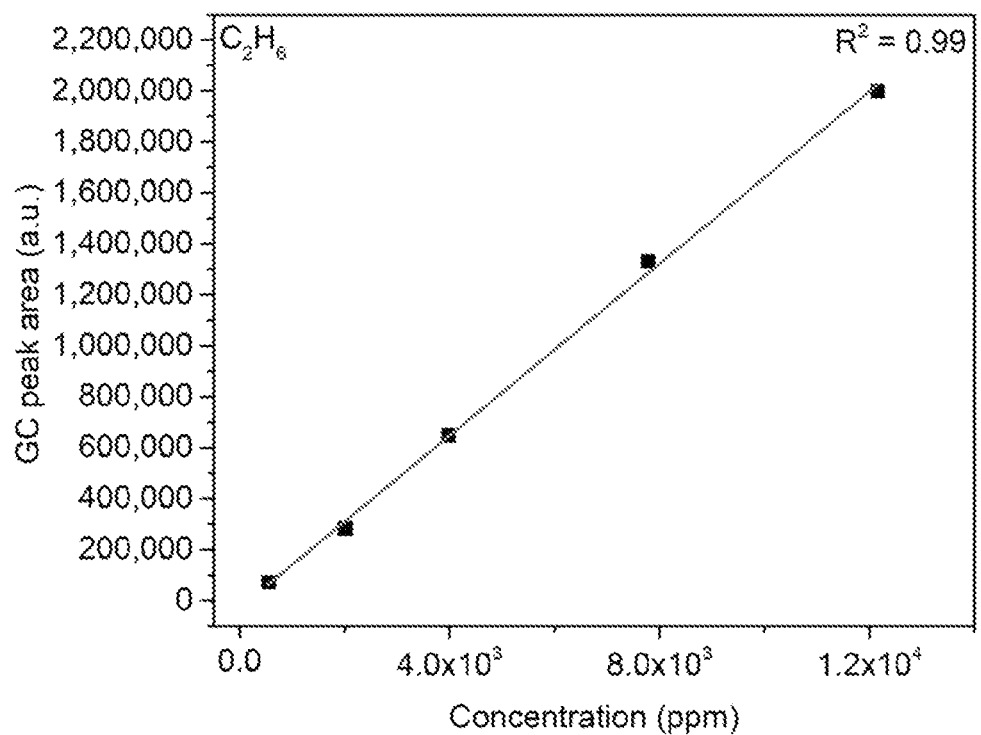

FIGS. 25A-25B show calibration curves for gas chromatography quantification of products for the photoreduction of the ethylene/acetylene mixture using GC-FID. FIG. 25A: Calibration curve for $C_2H_2$ with the corresponding coefficient of linear correlation ($R^2$). FIG. 25B: Calibration curve for $C_2H_6$ with the corresponding coefficient of linear correlation ($R^2$).

Figure 26A:
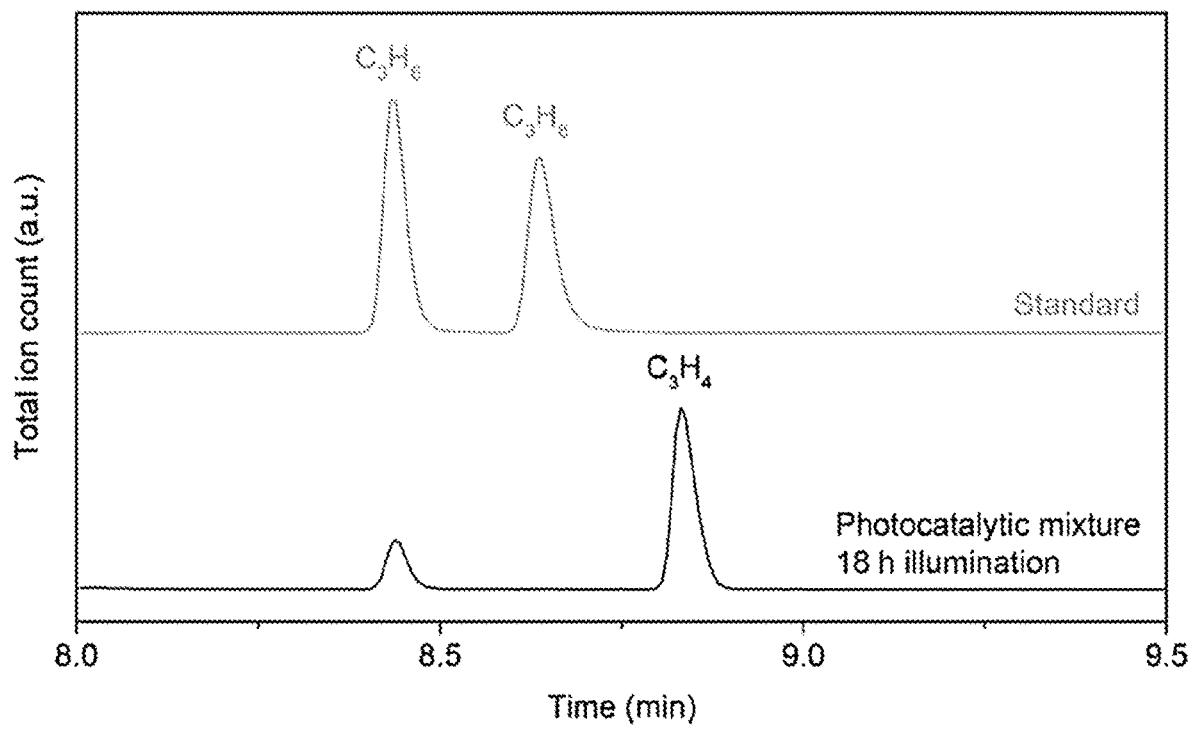
Figure 26B:
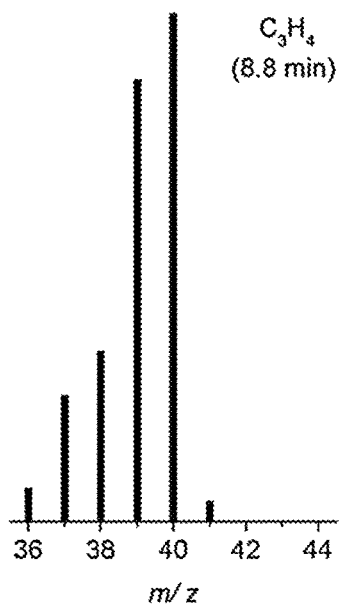
Figure 26C:
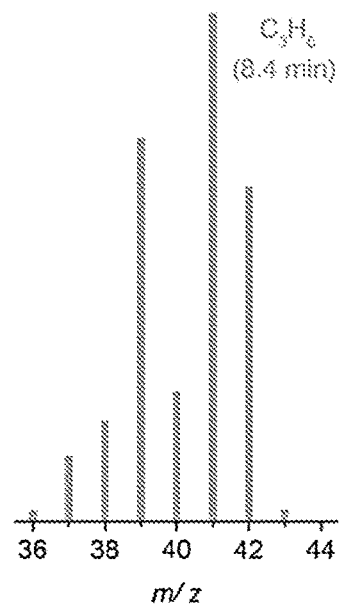
Figure 26D:
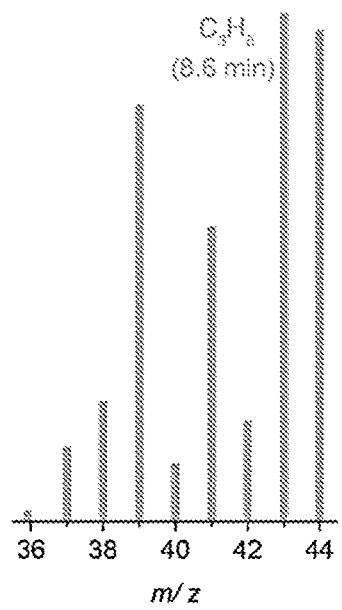

FIGS. 26A-26 D show typical GC-MS chromatograms and mass spectra observed for the photoreduction reaction of propyne. FIG. 26A: Gas chromatograms (retention times of $C_3H_6$, $C_3H_8$ and $C_3H_4$) with total ion count of $C_3H_6$ standard (2 vol. %) (orange), $C_3H_8$ standard (2 vol. %) (orange), and a $C_3H_4$ (5 vol. %) headspace from a sample of $H_2O$ solution containing 50 µM $[Ru(bpy)_3]^{2+}$, 1 µM CoTPPS, 0.1 M NaAsc and 0.1 M $NaHCO_3$ irradiated at 450 nm (140 mW·cm$^{-2}$) for 18 h (black). The pH was 8.4 before bubbling with He and injecting $C_3H_4$ (≥99 vol. % Sigma) to reach 5 vol. %. FIGS. 26B-26D: Mass spectra of $C_3H_4$, $C_3H_6$, and $C_3H_8$, respectively.

DETAILED DESCRIPTION

Disclosed herein are compositions and methods for the light-driven photocatalytic reduction of acetylene to ethylene in water and at room temperature, which achieves ≥99% selectivity under both non-competitive (≥99.5 vol. % acetylene; e.g. no ethylene co-feed) and competitive (1 vol. % $C_2H_2$, 30 vol. % $C_2H_4$, He balance; e.g. ethylene co-feed) conditions, and near 100% conversion under the latter industrially relevant conditions. This method is based on the use of cobalt salts or complexes as catalyst and a photosensitizer. The method disclosed herein is based on two components: a cobalt porphyrin catalyst and tris(bipyridine) ruthenium or a metal free carbon nitride sensitizer. This light-driven photocatalytic process enables high acetylene-to-ethylene conversion with high selectivity (very low ethane production) using visible light and water rather than heat and hydrogen. Hydrogen gas feedstock, precious metal catalyst, and high temperature are required in benchmark industrial thermal reduction systems. The compositions and methods provide a new, cost-competitive, and sustainable alternative to traditional energy-intensive thermochemical routes.

Definitions

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

The term "alkane" or "alkane compound," as used herein, means a straight or branched, saturated hydrocarbon compound. Representative examples of alkane compounds include, but are not limited to, ethane, propane, and butane.

The term "alkene" or "alkene compound," as used herein, means a straight or branched hydrocarbon compound containing at least one carbon-carbon double bond. The double bond(s) may be located at any positions with the hydrocarbon chain. Representative examples of alkene compounds include, but are not limited to, ethylene, propylene, and butylene (e.g., α-butylene).

The term "alkyne" or "alkyne compound," as used herein, means a straight or branched hydrocarbon compound containing at least one carbon-carbon triple bond. The triple bond(s) may be located at any positions with the hydrocarbon chain. Representative examples of alkyne compounds include, but are not limited to, acetylene, propyne, and butyne (e.g., 1-butyne).

Methods

Disclosed herein are methods for synthesizing an alkene compound from an alkyne compound, via a photocatalytic reduction reaction. For example, in some embodiments, acetylene is reduced to ethylene. The energy for the reduction reaction is supplied by light, and no external heating sources, electrical bias, special electrodes, or electrolyte solutions are required. Advantageously, the reduction reaction can be performed at ambient temperature and the hydrogens for the reduction reaction are supplied by water. Experimental results shown in the Examples confirm that the source of ethylene is acetylene, and that protons used for the reduction of acetylene to ethylene are supplied by water molecules.

Accordingly, disclosed herein is a method of synthesizing an alkene compound from an alkyne compound, comprising: providing a first mixture comprising a cobalt(III) porphyrin compound, a photosensitizer, a reducing agent, and water; adding an alkyne compound to the first mixture to form a reaction mixture; and illuminating the reaction mixture with light.

The first mixture includes a cobalt(III) porphyrin compound, such as [{meso-tetra(4-sulfonatophenyl)porphyrinato}cobalt(III)] (CoTPPS) or [{meso-tetra(4-carboxyphenyl)porphyrinato}cobalt(III)] (CoTCPP). The structures of these compounds are illustrated below. They can be purchased from commercial sources or can be synthesized according to methods known in the art. For example, CoTPPS can be prepared according to: Call et al.

*ACS Catal.* 9, 4867-4874 (2019), which is herein incorporated by reference in its entirety.

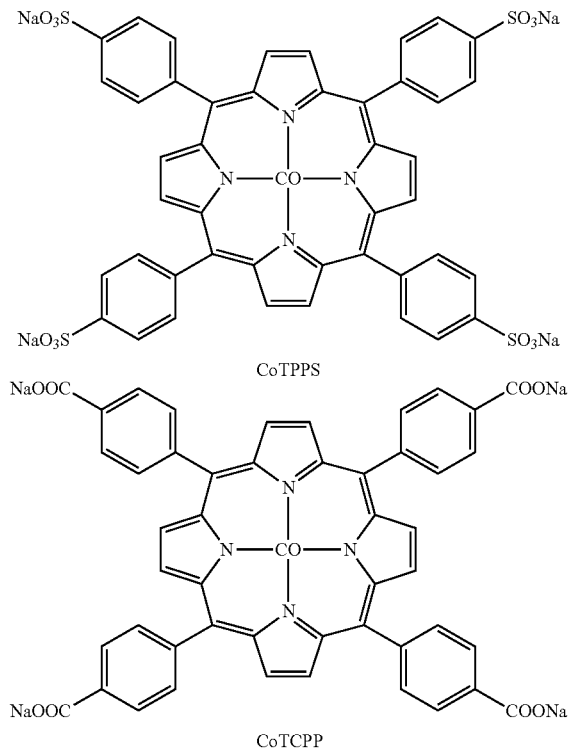

CoTPPS

CoTCPP

The cobalt(III) porphyrin compound (e.g., CoTPPS or CoTCPP) can be included in the first mixture at a concentration of about 0.10 μM to about 50 μM, or about 1.0 μM to about M, e.g., about 1.0 μM, about 2.0 μM, about 3.0 μM, about 4.0 μM, about 5.0 μM, about 6.0 μM, about 7.0 μM, about 8.0 μM, about 9.0 μM, about 10 μM, about 11 μM, about 12 μM, about 13 μM, about 14 μM, about 15 μM, about 16 μM, about 17 μM, about 18 μM, about 19 μM, about 20 μM, about 21 μM, about 22 μM, about 23 μM, about 24 μM, or about 25 μM.

The first mixture also includes a reducing agent. In some embodiments, the reducing agent is sodium ascorbate. In some embodiments, the reducing agent comprises a mixture of sodium ascorbate and triethanolamine. The reducing agent can be present at a concentration of about 0.01 M to about 0.50 M, or about 0.05 M to about 0.25 M, e.g., about 0.05 M, about 0.06 M, about 0.01 M, about 0.08 M, about 0.09 M, about 0.10 M, about 0.11 M, about 0.12 M, about 0.13 M, about 0.14 M, about 0.15 M, about 0.16 M, about 0.17 M, about 0.18 M, about 0.19 M, about 0.20 M, about 0.21 M, about 0.22 M, about 0.23 M, about 0.24 M, or about 0.25 M. In some embodiments, the reducing agent is present in the first mixture at a concentration of about 0.10 M.

The first mixture also includes a photosensitizer, such as tris(2,2'-bipyridyl)dichlororuthenium(II) or mesoporous graphitic carbon nitride. In some embodiments, the photosensitizer is tris(2,2'-bipyridyl)dichlororuthenium(II). When the photosensitizer is tris(2,2'-bipyridyl)dichlororuthenium (II)), it can be present at a concentration of about 50 μM to about 500 μM, or about 50 μM to about 300 μM, e.g., about 50 μM, about 75 μM, about 100 μM, about 125 μM, about 150 μM, about 175 μM, about 200 μM, about 225 μM, about 250 μM, about 275 μM, about 300 μM, about 350 μM, about 400 μM, about 450 μM, or about 500 μM. In some embodiments, the tris(2,2'-bipyridyl)dichlororuthenium(II) is present at a concentration of about 250 μM. In some embodiments, the photosensitizer is mesoporous graphitic carbon nitride. When the photosensitizer is mesoporous graphitic carbon nitride, it can be present in an amount of about 1.0 mg to about 5.0 mg, e.g., about 2.5 mg.

In some embodiments, the first mixture further comprises a buffer, such as a bicarbonate buffer. In some embodiments, the first mixture has a pH of about 8.0 to about 11.0. In some embodiments, the first mixture has a pH of about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, about 10.1, about 10.2, about 10.3, about 10.4, about 10.5, about 10.6, about 10.7, about 10.8, about 10.9, or about 11.0. In some embodiments, the first mixture has pH of about 8.4. In some embodiments, the first mixture has pH of about 10.6.

In some embodiments, the alkyne compound used in the methods is a $C_2$-$C_4$ alkyne compound, and is reduced to the corresponding $C_2$-$C_4$ alkene compound. For example, in some embodiments, the alkyne compound is acetylene and the corresponding alkene compound is ethylene. In other embodiments, the alkyne compound is propyne and the corresponding alkene compound is propylene.

The method includes a step of adding an alkyne compound to the first mixture. In some embodiments, such as when the alkyne compound is in gaseous form, the method can be conducted in a reaction vessel such as a vial, a beaker, a flask, or a chemical reactor (e.g., a research reactor, a commercial reactor, an industrial reactor, or the like), and the alkyne compound can be added to the first mixture by replacing the gas in the headspace above the first mixture with the alkyne compound. In some embodiments, the alkyne compound is added by bubbling it through the first mixture. In some embodiments, the gaseous alkyne compound is added to the reaction mixture at a pressure of about 1 atm.

The methods include a step of illuminating the reaction mixture with visible light. In some embodiments, the method comprises illuminating the mixture with light for about 6 hours to about 96 hours. For example, the mixture may be illuminated for about 6 hours, about 12 hours, 18 hours, about 24 hours, about 30 hours, about 36 hours, about 48 hours, about 60 hours, about 72 hours, or about 96 hours, or any range therebetween. In some embodiments, the light is white light. In some embodiments, the light is blue light (e.g., at about 450 nm). In some embodiments, the method comprises illuminating the reaction mixture with a light-emitting diode (LED), such as a white LED or a blue LED.

In some embodiments, the reaction vessel is of the appropriate scale for the particular application (e.g., <1 L, 1 L, 2 L, 5 L, 10 L, 20 L, 50 L 100 L, 200 L, 500 L, 1000 L, or more, or ranges therebetween). In some embodiments, a chemical reactor is a batch-style reactor, tank reactor, continuous stirred-tank reactor (CSTR), a plug flow reactor, a semi-batch reactor, etc. In some embodiments, a reactor comprises a window or translucent/transparent portion to allow illumination with the appropriate wavelength of light. In some embodiments, a reactor is transparent to the appropriate wavelength of light. In some embodiments, a reactor comprises an internal light source for illumination.

The method is generally conducted at ambient temperature (i.e., room temperature, which is typically about 20° C.) In some embodiments, the method is conducted at a temperature of about 18 to about 24° C.

The methods disclosed herein can produce an alkene compound with high selectivity over the corresponding alkane compound. For example, in some embodiments, the methods produce the alkene compound with greater than about 95% selectivity over the corresponding alkane compound, e.g., greater than about 96%, greater than about 97%, greater than about 98%, or greater than about 99% selectivity. In some embodiments, when the alkyne compound is acetylene, the method produces ethylene with greater than about 95%, greater than about 96%, greater than about 97%, greater than about 98%, or greater than about 99% selectivity over ethane.

In some embodiments, the methods disclosed herein produce an alkene compound from the corresponding alkyne compound with a turnover number (TON) of more than 500, e.g., more than 600, more than 700, more than 800, more than 900, more than 1000, more than 1100, more than 1200, more than 1300, more than 1400, more than 1500, more than 1600, more than 1700, more than 1800, more than 1900, or more than 2000. For example, in some embodiments, the methods disclosed herein produce ethylene from acetylene with a TON of about 1000 to about 2000, or higher.

Alternate methods of carrying out the reaction are also contemplated as part of the present disclosure. For example, in some embodiments, such as those in which [{meso-tetra(4-carboxyphenyl)porphyrinato}cobalt(III)] (CoTCPP) is the catalyst, the cobalt(III) porphyrin compound could be anchored to an electrode to exploit the catalytic cycle in a photoelectrochemical cell and the reducing agent may not be required.

Compositions

Also disclosed herein are compositions comprising a mixture of components that can be used for the photocatalytic reduction of alkynes to alkenes. For example, disclosed herein is a composition comprising a cobalt(III) porphyrin compound, a photosensitizer, a reducing agent, and water.

The composition includes a cobalt(III) porphyrin compound, such as CoTPPS or CoTCPP. In some embodiments, the cobalt (III) porphyrin compound is CoTPPS. The cobalt (III) porphyrin compound can be included in the composition at a concentration of about 0.10 µM to about 50 µM, or about 1.0 µM to about 25 µM, e.g., about 1.0 µM, about 2.0 µM, about 3.0 µM, about 4.0 µM, about 5.0 µM, about 6.0 µM, about 7.0 µM, about 8.0 µM, about 9.0 µM, about 10 µM, about 11 µM, about 12 µM, about 13 µM, about 14 µM, about 15 µM, about 16 µM, about 17 µM, about 18 µM, about 19 µM, about 20 µM, about 21 µM, about 22 µM, about 23 µM, about 24 µM, or about 25 µM.

The composition also includes a reducing agent. In some embodiments, the reducing agent is sodium ascorbate. In some embodiments, the reducing agent comprises a mixture of sodium ascorbate and triethanolamine. The reducing agent can be present in the composition at a concentration of about 0.01 M to about 0.50 M, or about 0.05 M to about 0.25 M, e.g., about 0.05 M, about 0.06 M, about 0.01 M, about 0.08 M, about 0.09 M, about 0.10 M, about 0.11 M, about 0.12 M, about 0.13 M, about 0.14 M, about 0.15 M, about 0.16 M, about 0.17 M, about 0.18 M, about 0.19 M, about 0.20 M, about 0.21 M, about 0.22 M, about 0.23 M, about 0.24 M, or about 0.25 M. In some embodiments, the reducing agent is present in the composition at a concentration of about 0.10 M.

The composition also includes a photosensitizer, such as tris(2,2'-bipyridyl)dichlororuthenium(II) or mesoporous graphitic carbon nitride. In some embodiments, the photosensitizer is tris(2,2'-bipyridyl)dichlororuthenium(II). When the photosensitizer is tris(2,2'-bipyridyl)dichlororuthenium(II), it can be present at a concentration of about 50 µM to about 500 µM, or about 50 µM to about 300 µM, e.g., about 50 µM, about 75 µM, about 100 µM, about 125 µM, about 150 µM, about 175 µM, about 200 µM, about 225 µM, about 250 µM, about 275 µM, about 300 µM, about 350 µM, about 400 µM, about 450 µM, or about 500 µM. In some embodiments, the tris(2,2'-bipyridyl)dichlororuthenium(II) is present at a concentration of about 250 µM. In some embodiments, the photosensitizer is mesoporous graphitic carbon nitride. When the photosensitizer is mesoporous graphitic carbon nitride, it can be present in an amount of about 1.0 mg to about 5.0 mg, e.g., about 2.5 mg. While this amount is used in specific examples disclosed herein, one skilled in the art will appreciate that this amount would be increased as the scale of the reaction increases.

The composition further comprises water. In some embodiments, the composition further comprises a buffer, such as a bicarbonate buffer. In some embodiments, the composition has a pH of about 8.0 to about 11.0. In some embodiments, the composition has a pH of about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, about 10.1, about 10.2, about 10.3, about 10.4, about 10.5, about 10.6, about 10.7, about 10.8, about 10.9, or about 11.0. In some embodiments, the composition has pH of about 8.4. In some embodiments, the composition has pH of about 10.6.

In some embodiments, the composition further comprises an alkyne compound. In some embodiments, the alkyne compound is a $C_2$-$C_4$ alkyne compound. In some embodiments, the alkyne compound is selected from acetylene and propyne. In some embodiments, the alkyne compound is acetylene.

The following examples further illustrate aspects of the disclosure but, of course, should not be construed as in any way limiting its scope.

EXAMPLES

Safety Warning. It should be noted that acetylene is an extremely flammable gas. Buildup of acetylene vapors can result in fire or explosions if triggered by sparks. Acetylene may displace oxygen and cause rapid suffocation. In a suitable experimental setup, such as the one used for the examples provided herein, the acetylene cylinder was fitted with CGA 510 regulator equipped with flashback arrestor and connected, through stainless steel tubing and flow regulator, to a purging station that was placed inside the fumehood. A soap solution was painted on fittings and joints to inspect for leaks, until no bubble formation was observed. There was no electrical equipment in the fumehood. Additionally, propyne is also a compressed gas that is extremely flammable, may displace oxygen (causing suffocation) and may cause respiratory irritation. In a suitable experimental setup, such as the one used for the examples provided herein, in a fumehood, vials were purged first with helium and then propyne (an aluminum cylinder equipped with stainless steel valve and hose adapter) was injected via gas-tight syringe.

Materials. Sodium ascorbate (NaAsc, Spectrum Chemical, 99%), triethanolamine (TEOA, Sigma-Aldrich, ≥99.5%), sodium bicarbonate ($NaHCO_3$, Fisher Chemicals, ACS grade), sodium borohydride ($NaBH_4$, Sigma-Aldrich, ≥96%), dehydroascorbic acid (DHA, Sigma-Aldrich), 4-hydroxy-TEMPO (Sigma-Aldrich, 97%), tris(2,2'-bipyridyl) dichlororuthenium(II) hexahydrate (Sigma-Aldrich, 99.95%), cobalt nanoparticles (cobalt(II,III) oxide, 99.5%, <50 nm, Sigma-Aldrich), mercury (Hg, Aldrich, ≥99.9%), [{meso-tetra(4-sulfonatophenyl)porphyrinato}copper(II)] (Frontier Scientific), [{meso-tetra(4-sulfonatophenyl) porphyrinato}iron(III)] chloride (Frontier Scientific) and [{meso-tetra(4-sulfonatophenyl)porphyrinato}manganese (III)] chloride (Frontier Scientific) were used as received. Ultrapure water (>18.25 MΩ·cm) was used for the experiments. [{meso-tetra(4-sulfonatophenyl)porphyrinato}cobalt (III)]hydrate (Call, A. et al. Highly Efficient and Selective Photocatalytic $CO_2$ Reduction to CO in Water by a Cobalt Porphyrin Molecular Catalyst. *ACS Catal.* 9, 4867-4874 (2019)), [{meso-tetra(4-carboxyphenyl) porphyrinato}cobalt(III)] chloride (Lin et al. *Angew. Chemie Int. Ed.* 55, 13739-13743 (2016)), [{meso-tetra(4-carboxyphenyl)porphyrinato}nickel(II)] (Liu et al. *Angew. Chemie Int. Ed.* 60, 13463-13469 (2021); Zoltan et al. *Spectrochim. Acta Part A Mol. Biomol. Spectrosc.* 135, 747-756 (2015)), and mesoporous graphitic carbon nitride (mpg-CN; Ghosh et al. *Science* 365, 360-366 (2019)) were synthesized according to previously reported procedures.

Photocatalytic Reactions. For photocatalytic experiments, generally, an aqueous solution (2.0 mL) containing CoTPPS catalyst (1-25 μM), sensitizer (50-500 μM $[Ru(bpy)_3]^{2+}$ or 2.5 mg mpg-CN), and sacrificial donor (0.1 M NaAsc or 0.2 M TEOA+0.05 M NaAsc) was purged with acetylene or acetylene/ethylene mixture and illuminated with blue (450 nm) or white LED light (140-200 mW·cm$^{-2}$). Samples were prepared in a 9.0 mL screw cap vial (03-338C, Fisher Scientific) equipped with a micro stir bar (7 mm, Fisher Scientific) and sealed with silicone/PTFE septum (TS-12713, Thermo Scientific) and cap (open top, TS-13216, Thermo Scientific). Vials were then purged, through a flow regulator (at 15 mm), either for (i) 10 minutes with He (or Ar) followed by 5 minutes with $C_2H_2$ (≥99.5 vol. %, Airgas) or (ii) 15 minutes with He followed by injecting $C_3H_4$ (350 μL with gas-tight Hamilton syringe of ≥99 vol. % $C_3H_4$, Sigma-Aldrich) or (iii) 15 minutes with Ar (UHP, Airgas) or (iv) 15 minutes with $C_2H_2$ (5 vol. %, He balance, Airgas) or (v) 15 minutes with $C_2H_4/C_2H_2$ mixture (1 vol. % $C_2H_2$, 30 vol. % $C_2H_4$, He balance, Airgas) by using steel needles inserted through the septum as inlet (inside the solution) and outlet (to the headspace). After purging for the time specified above, the pressure of the headspace was then equilibrated to 1 atm. The vials were then illuminated using a homebuilt photoreactor made of royal blue (450 nm) LEDs (Cree XLamp XP-E2 Color High Power LED Star, LEDsupply.com) or white light (Cree XLamp XT-E 5000K, LEDsupply.com) with a light intensity of 140 mW·cm$^{-2}$ (measured using an Optical Power Meter PM100D with Optical Sensor S120VC from Thorlabs). Each vial was suspended on top of a single LED, equipped with a lens, using a homebuilt sample holder. The vials were continuously stirred at 500 rpm during the irradiation.

Figure 3A:
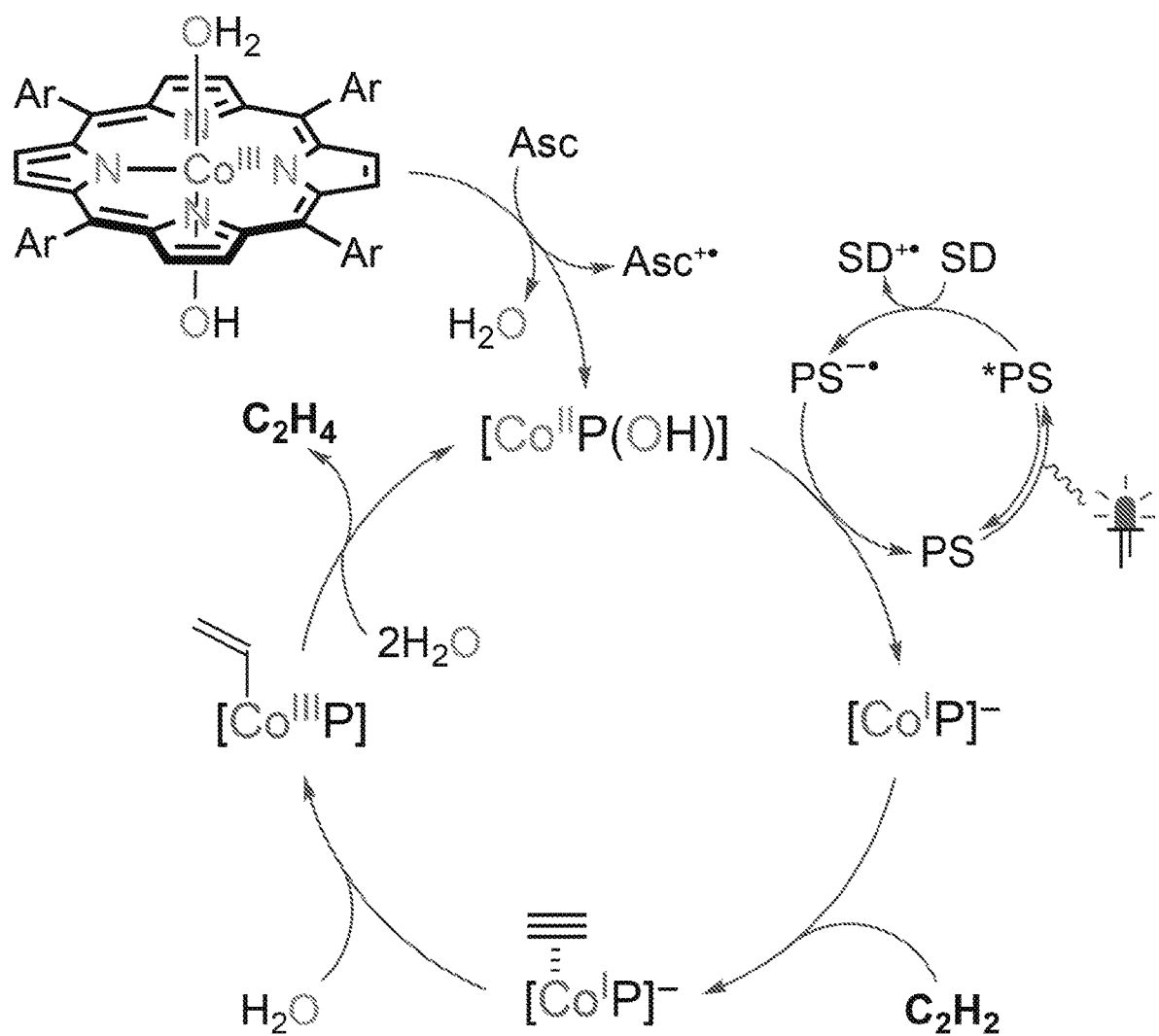
FIGS. 3A-3E show a mechanistic analysis for the photoreduction of acetylene to ethylene.
Figure 3B:
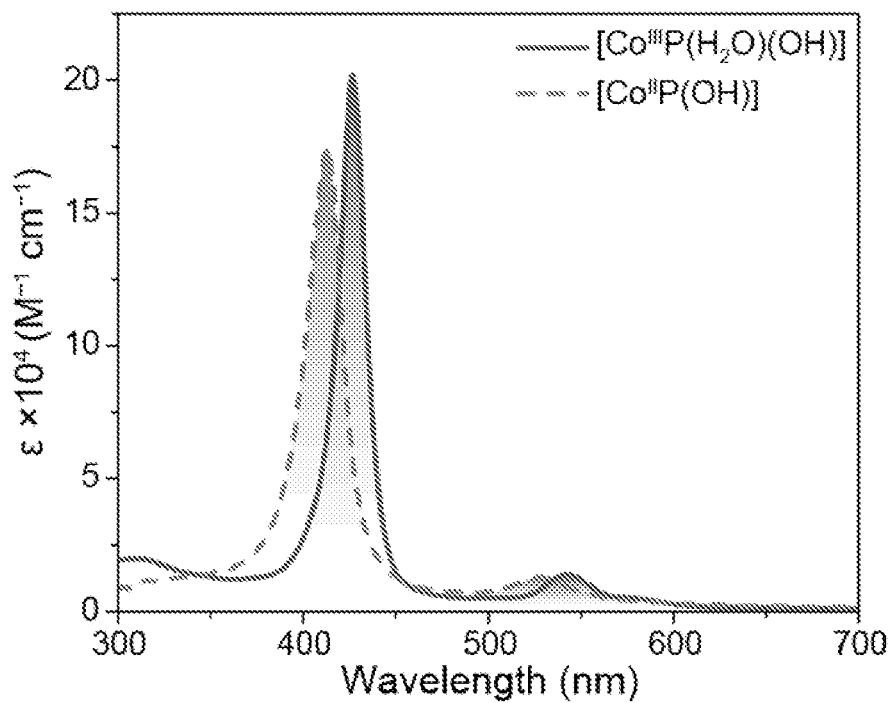
Figure 3C:
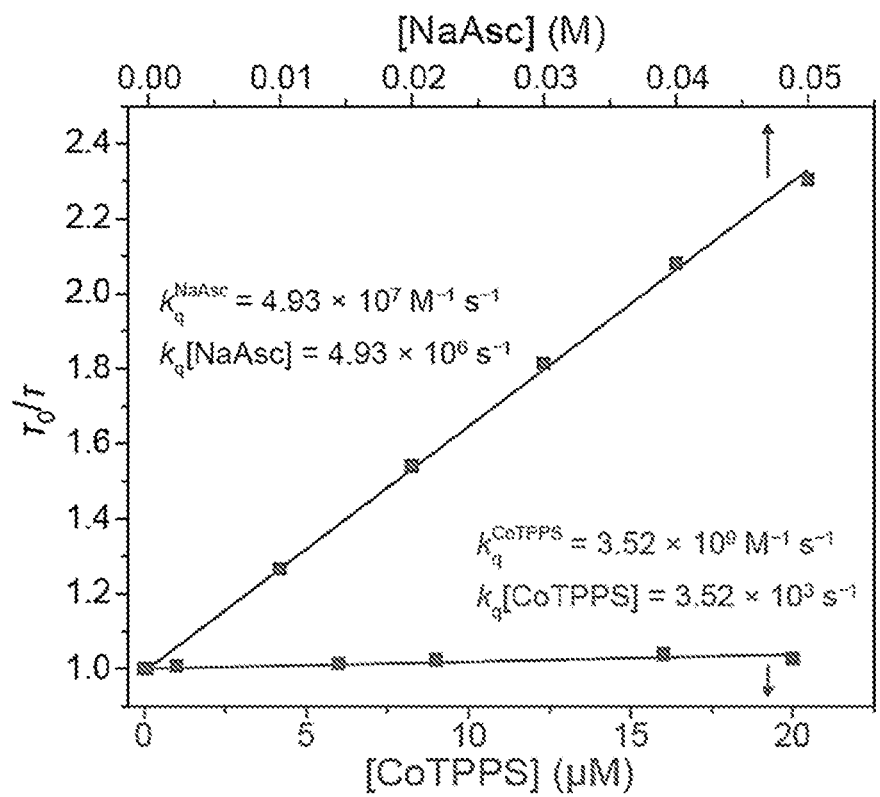
Figures 3D, 3E:
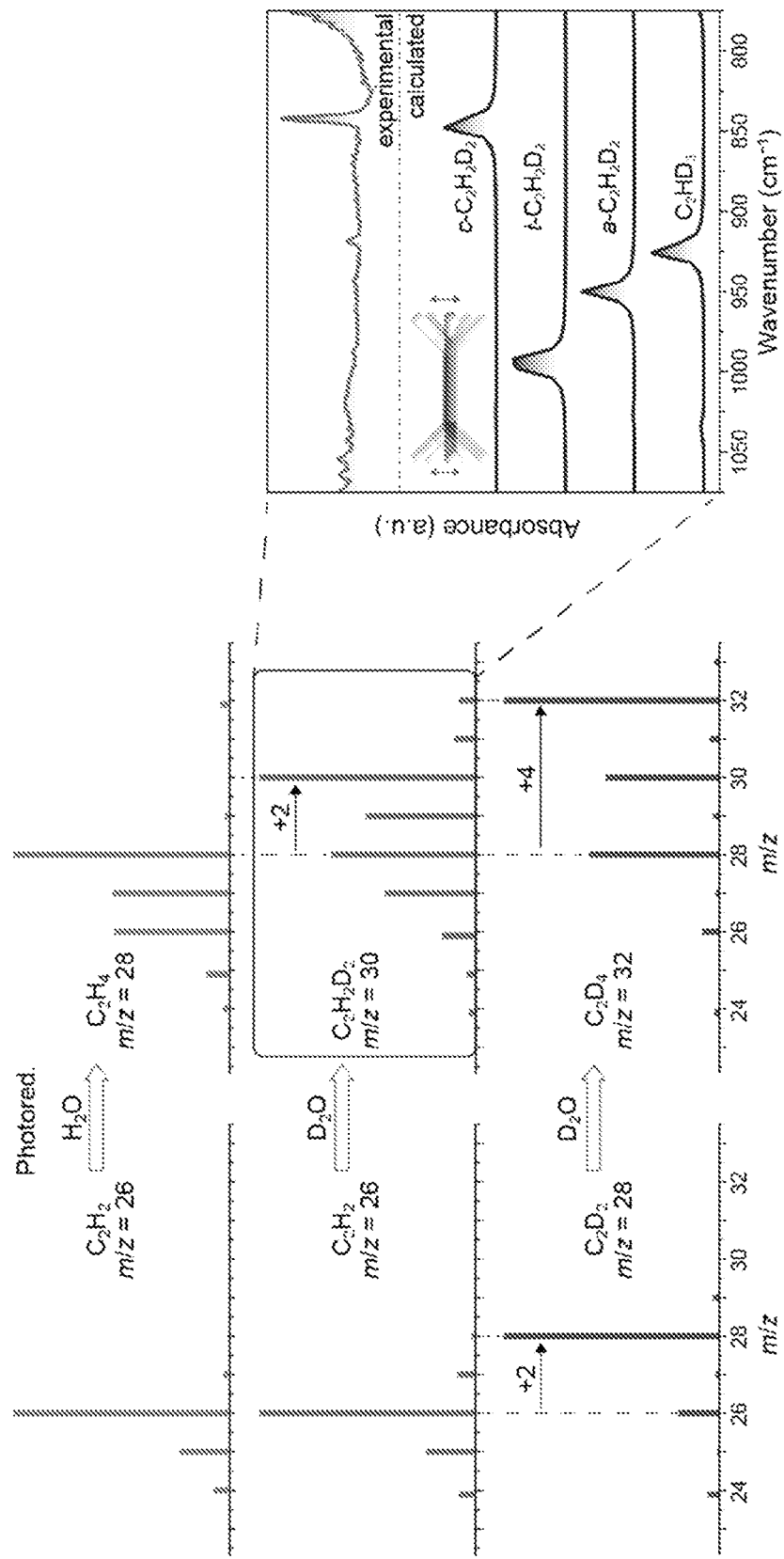

The samples of FIG. 3D were: (i) a 2.0 mL $C_2H_2$ (5 vol. %, He balance)-purged $H_2O$ solution containing 50 μM $[Ru(bpy)_3]^{2+}$, 1 μM CoTPPS, 0.1 M NaAsc and 0.1 M NaHCO$_3$ upon irradiation at 450 nm (140 mW·cm$^{-2}$) for 30 minutes. The pH was 6.0 before bubbling with $C_2H_2$; (ii) a 1.0 mL $C_2H_2$ (5 vol. %, He balance)-purged $D_2O$ solution containing 100 μM $[Ru(bpy)_3]^{2+}$, 2 μM CoTPPS and 0.2 M NaAsc upon irradiation at 450 nm (140 mW·cm$^{-2}$) for 30 minutes. The pH was 6.0 before bubbling with $C_2H_2$; (iii) a 2.0 mL $C_2H_2$ (5 vol. %, He balance)-purged $D_2O$ solution containing 50 μM $[Ru(bpy)_3]^{2+}$, 1 μM CoTPPS, 0.1 M NaAsc and 0.1 M NaHCO$_3$ that was kept in the dark for 12 hours and then irradiated at 450 nm (140 mW·cm$^{-2}$) for 6 hours. The pH was 8.4 before bubbling with $C_2H_2$.

Figure 4:
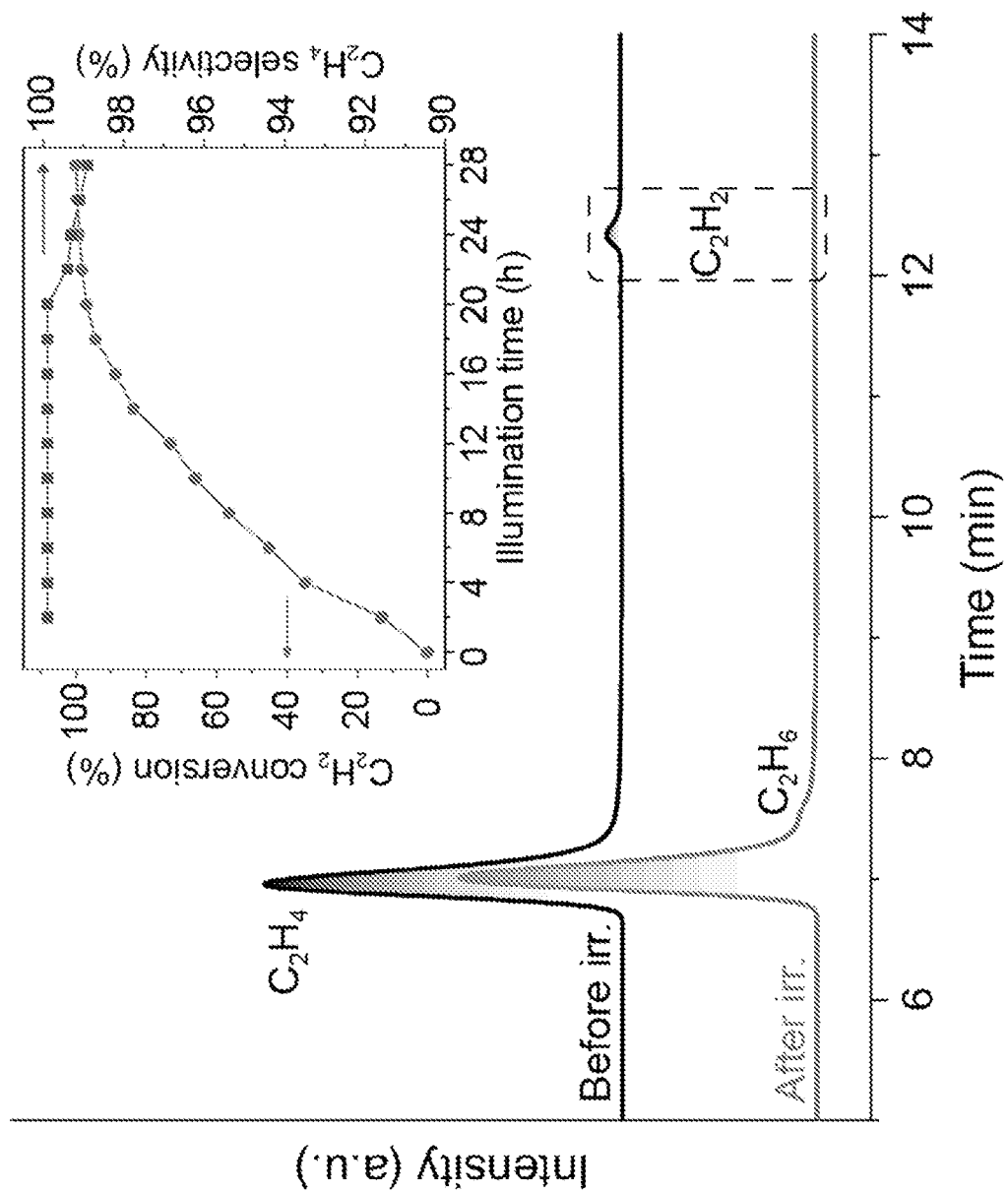
FIG. 4 shows typical GC-MS chromatograms observed before and after photoreduction of the ethylene/acetylene mixture. Gas chromatograms (elution order is $C_2H_4$, $C_2H_6$ and $C_2H_2$) detected with flame ion detection before and after irradiation (450 nm) for 28 h of the $[Ru(bpy)_3]^{2+}$/CoTPPS system containing 25 µM CoTPPS, 500 µM $[Ru(bpy)_3]^{2+}$, 0.1 M NaAsc and 0.1 M NaHCO$_3$ under $C_2H_2/C_2H_4$ (1 vol. % $C_2H_2$, 30 vol. % $C_2H_4$, He balance) mixture. The inset shows $C_2H_2$ conversion and $S_{C2H4}$ as a function of irradiation time (h) by the $[Ru(bpy)_3]^{2+}$/CoTPPS system under $C_2H_2/C_2H_4$ mixture.

The sample of FIG. 4 is a 4.0 mL $C_2H_2/C_2H_4$ (1 vol. % $C_2H_2$, 30 vol. % $C_2H_4$, He balance)-purged $H_2O$ solution containing 500 μM $[Ru(bpy)_3]^{2+}$, 25 μM CoTPPS, 0.1 M NaAsc and 0.1 M NaHCO$_3$ upon irradiation at 450 nm (200 mW·cm$^{-2}$) for 28 h. The pH was 8.4 before bubbling with the $C_2H_2/C_2H_4$ mixture.

Chromatographic detection of gases. GC-MS experiments were performed on an Agilent Technologies 6850 Network GC system coupled with a 5975C VL MSD with Triple-Axis Detector. The GC was equipped with a HP-PLOT Q column, the inlet temperature was 250° C., the He carrier gas flow was 1.2 mL·min$^{-1}$ at a pressure of 4.30 psi. For the detection of ethylene, acetylene, and ethane the oven temperature was kept at 45° C. for 4.50 min, and then heated to 200° C. using a 30° C.·min$^{-1}$ ramp (total run time 9.67 min). For the detection of propylene, propane and propyne, the oven temperature was kept at 45° C. for 4.50 min, and then heated to 220° C. using a 30° C.·min$^{-1}$ ramp, and kept at 220° C. for 2 min (total run time 12.33 min). Headspace samples were manually injected using gas-tight Hamilton sample-lock syringes (50-250 μL). The calibration curve for $C_2H_4$ was collected by injecting known quantities of a gas mixture standard containing $C_2H_4$ (2 vol. % standard, He balance, Airgas). $C_2H_4$ is reported as "trace" for samples in the photoreduction of $C_2H_2$ (≥99.5 vol. %, Airgas) that showed ethylene below the intercept of the calibration curve (7 nmol). The calibration curve for $C_2H_6$ was collected by injecting known quantities of a gas mixture standard containing $C_2H_6$ (100 and 4200 ppm). The selectivity for $C_2H_4$ is reported as ≥99.9% when no quantifiable $C_2H_6$ and $H_2$ are detected in the gas chromatograms. TON ($C_2H_4$) and selectivity for ethylene ($S_{C2H4}$) for the photoreduction of $C_2H_2$ (≥99.5 vol. %, Airgas) were calculated as follows:

$$TON_{C_2H_4} = \frac{\text{mol } C_2H_4}{\text{mol } CoTPPS}$$

$$S_{C_2H_4}(\%) = \frac{\text{mol } C_2H_4}{\text{mol } C_2H_4 + \text{mol } C_2H_6 + \text{mol } H_2} \times 100$$

A gas mixture standard containing $C_3H_6$ (2 vol. % standard, He balance, Airgas) and $C_3H_8$ (2 vol. % standard, He balance, Airgas) was injected as standard for the detection of propylene and propane. Experiments were performed at least in duplicate.

For the detection and quantification of acetylene and ethane in the photoreduction of the $C_2H_4/C_2H_2$ mixture (1 vol. % $C_2H_2$, 30 vol. % $C_2H_4$, He balance, Airgas) a custom-built Shimadzu GC-2014 gas chromatography system equipped with flame ionization detector (FID) was used. The column used was HayeSep T (1/16", 7.5 m), argon carrier gas flowing at 7.5 mL·min$^{-1}$ min at constant pressure of 2.5-2.7 bars, and the FID detector kept at 250° C. The oven temperature was kept at 35° C. for 9.0 min, and then heated to 85° C. using a 40° C.·min$^{-1}$ ramp, and kept at 85° C. for 4.0 min (total run time 17.0 min). Calibration curves for $C_2H_2$ and $C_2H_6$ were collected by injecting known quantities of a gas mixture standard (TOGAS 4200 ppm standard and 1% $C_2H_2$ in $C_2H_4$ and He). Experiments were performed at least in duplicate. The intercept of the calibration curves for $C_2H_2$ and $C_2H_6$ crosses zero to guarantee accuracy when the gas concentration is as low as few ppm. Injections were performed via gas-tight Hamilton syringes (10-25 μL). $C_2H_2$ conversion ($C_{C2H2}$) and selectivity for ethylene ($S_{C2H4}$) for the photoreduction of the $C_2H_4/C_2H_2$ mixture were calculated as follows:

$$C_{C_2H_2}(\%) = \frac{[C_2H_2]_{feed} - [C_2H_2]_x}{[C_2H_2]_{feed}} \times 100$$

$$S_{C_2H_4}(\%) = \frac{[C_2H_2]_{feed} - [C_2H_2]_x}{[C_2H_2]_{feed} - [C_2H_2]_x + [C_2H_6]} \times 100$$

where $[C_2H_2]_{feed}$ represents the acetylene concentration in the feed ($1\times10^4$ ppm) and $[C_2H_2]_x$ and $[C_2H_6]$ are the concentrations of acetylene and ethane in the product. The change in ethylene concentration cannot be accurately measured because of the excess of ethylene in the gas feed and therefore is not used for calculating the selectivity.

Analyses of $H_2$ gas evolved in the headspace during the photocatalysis were performed with a custom-built Shimadzu GC-2014 gas chromatography system equipped with a thermal conductivity (TCD) detector. $H_2$ production was quantitatively detected using MS-5A (1/16", 2.5 m) and HayeSep T (1/16", 7.5 m) columns. The temperature was held at 100° C. for the TCD detector and at 40° C. for the oven. The carrier gas was argon flowing at 8.5 mL·min$^{-1}$, at constant pressure of 3.8-4.0 bars. Injections (100 µL) were performed via an autosampler (AOC 6000) equipped with a gas-tight syringe (SGE autosampler syringe). Calibration curve for $H_2$ was collected by injecting known quantities of $H_2$ (5 vol. %, standard, Ar balance, Airgas). Experiments were performed at least in duplicate.

Chromatographic detection of liquids. GC-MS experiments were performed on an Agilent Technologies 6850 Network GC system coupled with a 5975C VL MSD with Triple-Axis Detector. The GC was equipped with a HP-PLOT Q column, the inlet temperature was 250° C., the He carrier gas flow was 1.2 mL·min$^{-1}$ at a pressure of 4.30 psi. For the detection of liquids, the oven temperature was kept at 45° C. for 4.50 min, and then heated to 200° C. using a 30° C.·min$^{-1}$ ramp, and kept at 200° C. for 7 min (total run time 16.67 min).

$H_2O_2$ detection. Detection of the hydrogen peroxide ($H_2O_2$) was performed using horse radish peroxidase (HRP, Sigma-Aldrich) and 3,3',5,5'-tetramethylbenzidine (TMB) assay in a citrate-acetate buffer as previously reported (Josephy et al. *J. Biol. Chem.* 257, 3669-3675 (1982). $H_2O_2$ can be quantified by using extinction coefficient values for the TMB dimer, and cross-checked with a calibration curve made by measuring solutions of known $H_2O_2$(Sigma-Aldrich) concentration (Jakešová et al. *Adv. Funct. Mater.* 26, 5248-5254 (2016). Specifically, L of a TMB DMSO solution (1.0 mg mL$^{-1}$) was added to 3.0 mL of enzyme buffer solution in a cuvette (one citrate-acetate tablet in 50 mL of mQ $H_2O$ containing 1.70 mg of HRP enzyme), followed by addition of aliquots (50 µL) from the photocatalysis solution (kept under dark or irradiated for 6 h) and the absorbance at 650 nm was monitored by UV-Vis absorbance spectroscopy. No $H_2O_2$ was detected.

Measurement of quantum yields. The quantum yield of a photochemical process is calculated as the number of defined events occurring per photon absorbed by the system at a specific wavelength. The $\Phi_{C_2H_4}(\%)$ was therefore calculated according to the following equation:

$$\Phi_{C_2H_4}(\%) = \frac{\text{number of } C_2H_4 \text{ molecules} \times 2}{\text{number of photons absorbed}} \times 100$$

To calculate the fraction of photons absorbed, the amount of absorbed light was determined at the beginning of the photocatalytic experiments from (at least) three independent readings of the measured power at the top of the reaction vessel (an Optical Power Meter PM100D with Optical Sensor S120VC from Thorlabs was used). The reaction vessel contained a 2.0 mL solution of aq. NaAsc (0.1 M) and aq. NaHCO$_3$ (0.1 M) to account for the reflection loss at the glass/air interface. The number of photons absorbed was calculated taking the photon wavelength equal to 450 nm, an incident light power of 140 mW·cm$^{-2}$ and considering an illuminated area of 1.767 cm 2. Under these conditions, 2.0 mL of an aqueous solution containing 50 µM [Ru(bpy)$_3$]$^{2+}$, 1 µM CoTPPS, 0.1 M NaAsc and 0.1 M NaHCO$_3$ absorbed 63% of incident photons, while 2.0 mL of an aqueous solution containing 500 µM [Ru(bpy)$_3$]$^{2+}$, 25 µM CoTPPS, 0.1 M NaAsc and 0.1 M NaHCO$_3$ absorbed 96% of incident photons. The number of molecules of $C_2H_4$ was determined from the moles of $C_2H_4$ in the sample headspace (obtained by GC-MS measurements) from three independent experiments (at 6 h of irradiation). The $\Phi_{C_2H_4}$ for the 50 and 500 µM [Ru(bpy)$_3$]$^{2+}$ samples were calculated to be 0.03% and 0.11%, respectively.

Absorption spectroscopy. UV-Vis absorption spectra were recorded on an Ocean Optics spectrometer (DH-2000-BAL UV-Vis-NIR light source and QE-Pro detector) or a Varian Cary 5000 spectrometer. Sealable quartz cuvettes (Starna Cells with septum cap) equipped with a micro stir bar were used for the reduction of Co(III) porphyrin to Co(II) porphyrin (FIG. 12) and for photostability studies (FIG. 14), and the solutions were prepared and degassed as described for the photocatalytic systems. Irradiation was 450 nm LED (140 mW·cm$^{-2}$). Blank solutions (0.1 M aq. NaHCO$_3$ and 0.1 M aq. NaAsc) purged with He and/or $C_2H_2$ were used as baseline.

Fluorescence spectroscopy and fluorescence quenching. Fluorescence spectra were collected on a Fluorolog-3 spectrofluorometer (Horiba Jobin Yvon). For the fluorescence quenching experiments, aqueous solutions of 50 µM [Ru(bpy)$_3$]$^{2+}$ in 0.1 M NaHCO$_3$ containing various concentrations of NaAsc or CoTPPS were purged for 10 minutes with He followed by 5 minutes with $C_2H_2$ (≥99.5 vol. %). The lifetimes were measured in a custom-built microscope equipped with a piezo scanner (NanoPI, Physik Instrumente), an APD detector (MicroPhoton Devices), and a photon counting board (PicoHarp300, PicoQuant) where correlation times between the excitation pulses and detected photons were recorded. The excitation pulses were synchronized from a 450 nm, 70 ps pulsed diode laser at a repetition rate of 500 kHz (Picoquant) and focused with a long working distance objective (0.7 NA, 100×, Mitutoyo), and the detected fluorescence was filtered with a 475 nm long-pass dichroic (Chroma) and a 495 nm long-pass filter (Thorlabs). The quenching rate constant (kg) was calculated according to the Stern-Volmer equation:

$$\frac{\tau_0}{\tau} = 1 + k_q \times \tau_0 \times [Q]$$

where $\tau_0$ and $\tau$ are the lifetime of [Ru(bpy)$_3$]$^{2+}$ in absence ($\tau_0$=539 ns) and in presence of quencher (Q) and [Q] is the molar concentration of the quencher ([NaAsc]=0.01-0.05 M, [CoTPPS]=1-20 µM). The measured bimolecular rate constants are $k_q^{NaAsc}$=4.93×10$^7$ M$^{-1}$·s$^{-1}$ and $k_q^{CoTPPS}$=3.52×10$^9$ M$^{-1}$·s$^{-1}$, which correspond to quenching rate $k_q$[NaAsc]=4.93×10$^6$ s$^{-1}$ and $k_q$[CoTPPS]=3.52×10$^3$ s$^{-1}$ for the concentrations of these species ([NaAsc]=0.1 M, [CoTPPS]=1 µM) used in the catalytic reaction mixtures.

Electrochemical characterization. Cyclic voltammetry (CV) and square-wave voltammetry (SWV) were performed on a CHI660D potentiostat at room temperature, employing a standard three-electrode single-compartment cell: glassy carbon electrode (GCE, CH Instruments, d=3 mm) as working electrode, a Pt wire as counter electrode and Ag/AgCl (3 M aq. KCl) as reference electrode. Working and reference electrodes were polished on a felt pad with 0.3 or 0.05 μm $Al_2O_3$ suspensions, sonicated in deionized water for about 30 seconds and washed/dried before each experiment; the Pt wire was flame-cleaned. A blank scan was recorded before each sample (scan rate=50 mV·s$^{-1}$). The aqueous solutions of CoTPPS, NaAsc and $[Ru(bpy)_3]^{2+}$ containing $NaHCO_3$ (0.1 M) were prepared in mQ $H_2O$ (0.1 M KCl as supporting electrolyte) and degassed with Ar for 15 minutes. After recording the CV (scan rate was 50 mV·s$^{-1}$) or SWV scans, the same solutions were purged with $C_2H_2$ (≥99.5 vol. %).

FT-IR spectroscopy. Gas-phase IR measurements were performed on a Nicolet iS50 Fourier Transformed Infrared Spectrometer and a custom-built transmission cell for flowing gases. The gas cell has a gas path of 10 cm, and an internal volume of about 3.5 mL. The cell inlet was modified with an ultra-Torr Swagelok fitting which is capped with a silicone septum. The cell outlet leads to exhaust or a vacuum pump via two on/off valves. The leak rate of the cell, measured in a fully evacuated and closed state, is about $10^{-2}$ torr·sec$^{-1}$. For the measurements, the cell was first evacuated, and a single beam spectrum was collected. Then, the valve to the pump was closed, and 5.0 mL of sample gas was injected with an air-tight syringe—the sample was a headspace of 30 min photoreduction from a 5.0 mL solution in a 20 mL GC vial containing 100 μM $[Ru(bpy)_3]^{2+}$, 2 μM CoTPPS, 0.2 M NaAsc in $D_2O$ (pH 6.0). The FT-IR spectra were acquired against the reference spectrum obtained in vacuum.

Theoretical calculations. Calculations were carried out with the Gaussian16 package[9] and all structures were fully optimized without any symmetry constraints at the DFT level. The calculations were performed using the hybrid GGA functional B3LYP, using the 6-31+G(d,p) basis set. Previously, this level of theory has been shown to accurately predict gas-phase IR frequencies (Katari et al. *Chem.-A Eur. J.* 23, 8414-8423 (2017)). For each stationary point, a vibrational frequency calculation was carried out at the same level of theory to characterize their nature as minima. Lorentzian line shapes, with a full width at half maximum of 8 cm$^{-1}$, were used to generate the calculated IR spectra. A scaling factor of 0.9759 was used (Katari 2017).

TABLE 1

Photocatalytic and control reactions for $C_2H_2$ to $C_2H_4$ reduction by the $[Ru(bpy)_3]^{2+}$/CoTPPS system

| | | | | TON (selectivity %) | | |
|---|---|---|---|---|---|---|
| Entry | Catalyst | Sensitizer | Reaction conditions | $C_2H_2$ | $C_2H_6$ | $H_2$ |
| 1 | CoTPPS | $[Ru(bpy)_3]^{2+}$ | NaAsc + $NaHCO_3$ | 915 (99.7) | 3 (0.3) | — |
| 2 | CoTPPS | — | NaAsc + $NaHCO_3$ | — | — | n.d. |
| 3 | — | $[Ru(bpy)_3]^{2+}$ | NaAsc + $NaHCO_3$ | — | — | n.d. |
| 4 | CoTPPS | $[Ru(bpy)_3]^{2+}$ | $NaHCO_3$ | — | — | n.d |
| 5 | CoTPPS | $[Ru(bpy)_3]^{2+}$ | NaAsc + $NaHCO_3$ | — | — | n.d. |
| 6 | CoTPPS | $[Ru(bpy)_3]^{2+}$ | NaAsc + $NaHCO_3$ | n.d. | n.d. | 80 |
| 7 | Co NP | $[Ru(bpy)_3]^{2+}$ | NaAsc + $NaHCO_3$ | 63 (>99) | — | n.d. |
| 8 | CoTPPS | $[Ru(bpy)_3]^{2+}$ | $Hg^0$ + NaAsc + $NaHCO_3$ | 814 (>99) | — | n.d. |
| 9 | CoTPPS | $[Ru(bpy)_3]^{2+}$ | NaAsc + DHA + $NaHCO_3$ | 228 (>99) | — | n.d. |
| 10 | CoTPPS | — | $NaBH_4$ + NaHCO; | — | — | n.d. |
| 11 | CoTPPS | — | $NaBH_4$ + $NaHCO_3$ | 10 (4.2) | 1 (0.4) | 229 (95.4) |
| 12 | CoTPPS | $[Ru(bpy)_3]^{2+}$ | NaAsc + $NaHCO_3$ + TEMPO | 930 (>99) | — | n.d. |
| 13 | CoTCPP | $[Ru(bpy)_3]^{2+}$ | NaAsc + $NaHCO_3$ | 577 (>99) | — | n.d. |

Summary of the reaction conditions used for the photocatalytic and control experiments. In a typical run, 2.0 mL of a $C_2H_2$ (≥99.5 vol. %)-purged solution (entries 1-5, 7-13) or Ar-purged solution (entry 6) containing catalyst (1 μM CoTPPS (entries 1-2, 4-6, 8-10, 12), 10 μM Co NP < 50 nm (entry 7), 0.5 mM CoTPPS (entry 11), 1 μM CoTCPP (entry 13)), 50 μM $[Ru(bpy)_3]^{2+}$ (entries 1, 3-9, 12-13), $Hg^0$ (50,000 eq. vs CoTPPS (entry 8)), $NaBH_4$ (250 eq. vs CoTPPS (entries 10-11)), 2.5 mM 4-hydroxy-TEMPO (entry 12), NaAsc (0.1M entries 1-3, 5-8, 12-13, 0.09M entry 9), 0.01M DHA (dehydroascorbic acid, entry 9), 0.1M aq. $NaHCO_3$ (entries 1-13) was irradiated at 450 nm (140 mW · cm$^{-2}$) for 6 h (entries 1-4, 6-9, 12, 13) or was stirred in the dark for 6 h (not irradiated, entries 5, 10, 11).

The pH was measured before bubbling gas as pH = 8.4.

Products were detected via GC-TCD or GC-MS analysis and experiments were performed at least in duplicates (no $C_2H_4$ in entries 2, 4, 5, 10; trace $C_2H_4$ in entry 3, no $C_2H_6$ in entries 2-5, 7-10, 12-13; no $H_2$ in entry 1). The typical uncertainty for TON values is ≤10%.

TABLE 2

Photocatalytic reaction for $C_2H_2$ to $C_2H_4$ reduction through variation of irradiation time by the $[Ru(bpy)_3]^{2+}$/CoTPPS system

| Entry | Time (h) | TON (selectivity %) $C_2H_4$ | $C_2H_6$ |
|---|---|---|---|
| 1 | 3 | 347 (>99.9) | — |
| 2 | 6 | 915 (99.7) | 3 (0.3) |
| 3 | 9 | 1,241 (99.8) | 3 (0.2) |
| 4 | 12 | 1,635 (99.8) | 3 (0.2) |
| 5 | 18 | 1,939 (99.6) | 8 (0.4) |
| 6 | 24 | 1,967 (99.4) | 11 (0.6) |

Summary of the reaction conditions used for the photocatalytic experiment.
In a typical run, 2 mL of a $C_2H_2$ (≥99.5 vol. %)-purged solution containing 1 μM CoTPPS, 50 μM $[Ru(bpy)_3]^{2+}$, 0.1M NaAsc, 0.1M aq. $NaHCO_3$ was irradiated at 450 nm (140 mW · cm$^{-2}$).
The pH was measured before bubbling gas as pH = 8.4.
Products were detected via GC-MS analysis and experiments were performed at least in duplicates (no $C_2H_6$ in entry 1).
The typical uncertainty for TON values is ≤10%

TABLE 3

Photocatalytic and control reactions for $C_2H_2$ to $C_2H_4$ reduction by the mpg-CN/CoTPPS system

| Entry | Catalyst | Sensitizer | Reaction conditions | TON (selectivity %) $C_2H_4$ | $C_2H_6$ | $H_2$ |
|---|---|---|---|---|---|---|
| 1 | CoTPPS | mpg-CN | NaAsc + TEOA | 87 (>99.9) | — | — |
| 2 | CoTPPS | mpg-CN | NaAsc + TEOA | 49 (>99) | — | n.d. |
| 3 | CoTPPS | — | NaAsc + TEOA | — | — | n.d. |
| 4 | — | mpg-CN | NaAsc + TEOA | — | — | n.d. |
| 5 | CoTPPS | mpg-CN | — | — | — | n.d. |
| 6 | CoTPPS | mpg-CN | TEOA | 23 (>99) | — | n.d. |
| 7 | CoTPPS | mpg-CN | NaAsc | — | — | n.d. |
| 8 | CoTPPS | mpg-CN | NaAsc + TEOA | — | — | n.d. |
| 9 | CoTPPS | mpg-CN | NaAse + TEOA | n.d. | n.d. | — |

Summary of the reaction conditions used for the photocatalytic and control experiments. In a typical run, 2 mL of a $C_2H_2$ (≥99.5 vol. %)-purged solution (entries 1-8) or Ar-purged solution (entry 9) containing 10 μM CoTPPS (entries 1-3, 5-9), 2.5 mg mpg-CN (entries 1-2, 4-9), 0.05M NaAsc (entries 1-4, 7-9), 0.2M TEOA (entries 1-4, 6, 8-9), was irradiated at 450 om (140 mW · cm$^{-2}$) for 12 h (entries 1, 3-7, 9) or irradiated with white light (140 mW · cm$^{-2}$) for 12 h (entry 2) or was stirred in the dark for 12 h (not irradiated, entry 8). The pH was measured before bubbling gas as pH = 10.6.
Products were detected via GC-TCD or GC-MS analysis and experiments were performed at least in duplicates (no $C_2H_4$ in entries 3, 5, 7, 8; trace $C_2H_4$ in entry 4, no $C_2H_6$ in entries 1-8; no $H_2$ in entries 1, 9).
The typical uncertainty for TON values is ≤10%.

TABLE 4

Photocatalytic reaction for $C_2H_2$ to $C_2H_4$ reduction through variation of irradiation time by the mpg-CN/CoTPPS system

| Entry | Time (h) | TON (selectivity %) $C_2H_4$ | $C_2H_6$ |
|---|---|---|---|
| 1 | 6 | 46 (>99.9) | — |
| 2 | 12 | 87 (>99.9) | — |
| 3 | 24 | 100 (>99.9) | — |
| 4 | 36 | 120 (>99.9) | — |

Summary of the reaction conditions used for the photocatalytic experiment.
In a typical run, 2 mL of a $C_2H_2$ (≥99.5 vol. %)-purged solution containing 10 μM CoTPPS, 2.5 mg mpg-CN, 0.05M NaAse, 0.2M TEOA, was irradiated at 450 nm (140 mW · cm$^{-2}$).
The pH was measured before bubbling gas as pH = 10.6.
Products were detected via GC-MS analysis and experiments were performed at least in duplicates (no $C_2H_6$ in entries 1-4).
The typical uncertainty for TON values is ≤10%.

TABLE 5

Photocatalytic reactions for $C_2H_2$ to $C_2H_4$ reduction and $H_2$ evolution through variation of pH by the $[Ru(bpy)_3]^{2+}$/CoTPPS system

| Entry | Gas | pH | TON (selectivity %) $C_2H_4$ | $C_2H_6$ | $H_2$ |
|---|---|---|---|---|---|
| 1 | $C_2H_2$ | 6.8 | 696 (83.7) | 9 (1.1) | 126 (15.2) |
| 2 | Ar | 6.8 | n.d. | n.d. | 511 |
| 3 | $C_2H_2$ | 7.4 | 656 (96.2) | 4 (0.6) | 22 (3.3) |
| 4 | Ar | 7.4 | n.d. | n.d. | 102 |
| 5 | $C_2H_2$ | 8.0 | 669 (99.7) | 2 (0.3) | — |
| 6 | Ar | 8.0 | n.d. | n.d. | 40 |

Summary of the reaction conditions used for the photocatalytic experiments.
In a typical run, 2 mL of a $C_2H_2$ (≥99.5 vol. %)-purged solution (entries 1, 3, 5) or Ar-purged solution (entries 2, 4, 6) containing 1 μM CoTPPS, 50 μM $[Ru(bpy)_3]^{2+}$, 0.1M NaAsc, 0.1M aq. $Na_2HPO_4/NaH_2PO_4^{1?}$ was irradiated at 450 nm (140 mW · cm$^{-2}$) for 6 h.
The pH was measured before bubbling gas.
Products were detected via GC-TCD or GC-MS analysis and experiments were performed at least in duplicates (no $H_2$ in entry 5).

The typical uncertainty for TON values is ≤10%.

TABLE 6

Geometric coordinates for ethylenes reported in FIG. 3E.

α-$C_2H_2D_2$

| | | | |
|---|---|---|---|
| C | 0.00000000 | -0.66707800 | 0.00000000 |
| H(Iso = 2) | -0.92442900 | -1.23882900 | 0.00000000 |
| C | 0.00000000 | 0.66707800 | 0.00000000 |
| H | 0.92442900 | 1.23883100 | 0.00000000 |
| H(Iso = 2) | 0.92442000 | -1.23884300 | 0.00000000 |
| H | -0.92442200 | 1.23883800 | 0.00000000 |

TABLE 6-continued

Geometric coordinates for ethylenes reported in FIG. 3E.

$C_2HD_3$

| | | | |
|---|---|---|---|
| C | 0.00000000 | −0.66707800 | 0.00000000 |
| H | −0.92442900 | −1.23882900 | 0.00000000 |
| C | 0.00000000 | 0.66707800 | 0.00000000 |
| H(Iso = 2) | 0.92442900 | 1.23883100 | 0.00000000 |
| H(Iso = 2) | 0.92442000 | −1.23884300 | 0.00000000 |
| H(Iso = 2) | −0.92442200 | 1.23883800 | 0.00000000 | cis-$C_2H_2D_2$

| | | | |
|---|---|---|---|
| C | 0.00000000 | −0.66707800 | 0.00000000 |
| H(Iso = 2) | −0.92442900 | −1.23882900 | 0.00000000 |
| C | 0.00000000 | 0.66707800 | 0.00000000 |
| H | 0.92442900 | 1.23883100 | 0.00000000 |
| H | 0.92442000 | −1.23884300 | 0.00000000 |
| H(Iso = 2) | −0.92442200 | 1.23883800 | 0.00000000 | trans-$C_2H_2D_2$

| | | | |
|---|---|---|---|
| C | 0.00000000 | −0.66707800 | 0.00000000 |
| H(Iso = 2) | −0.92442900 | −1.23882900 | 0.00000000 |
| C | 0.00000000 | 0.66707800 | 0.00000000 |
| H(Iso = 2) | 0.92442900 | 1.23883100 | 0.00000000 |
| H | 0.92442000 | −1.23884300 | 0.00000000 |
| H | −0.92442200 | 1.23883800 | 0.00000000 |

Results and Discussion

Figure 1A:
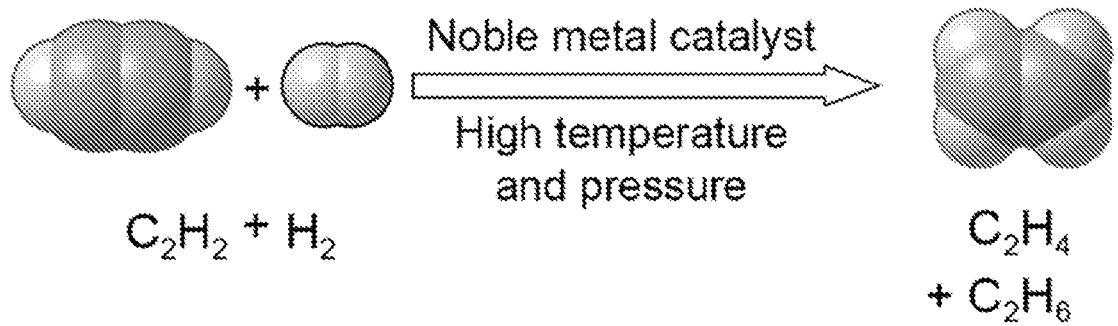
FIGS. 1A-1C show various strategies for producing polymer-grade ethylene.
Figure 1B:
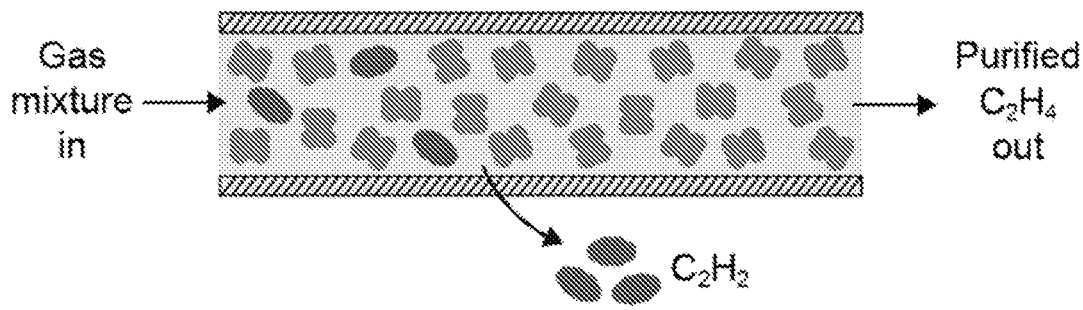
Figure 1C:
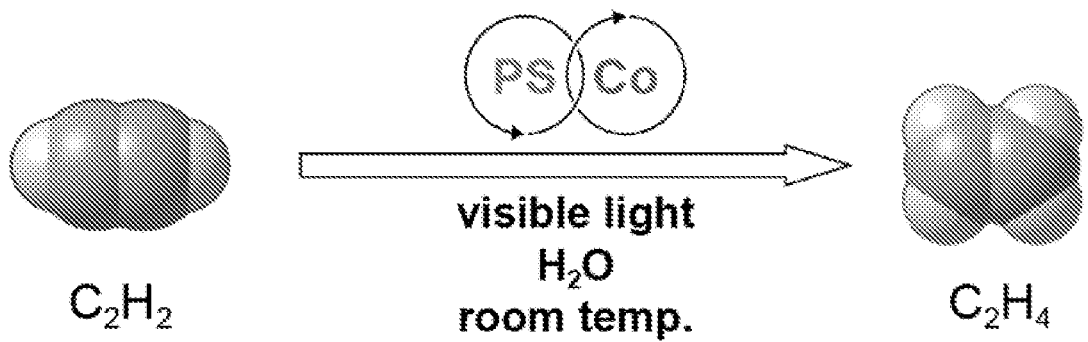
Figure 2A:
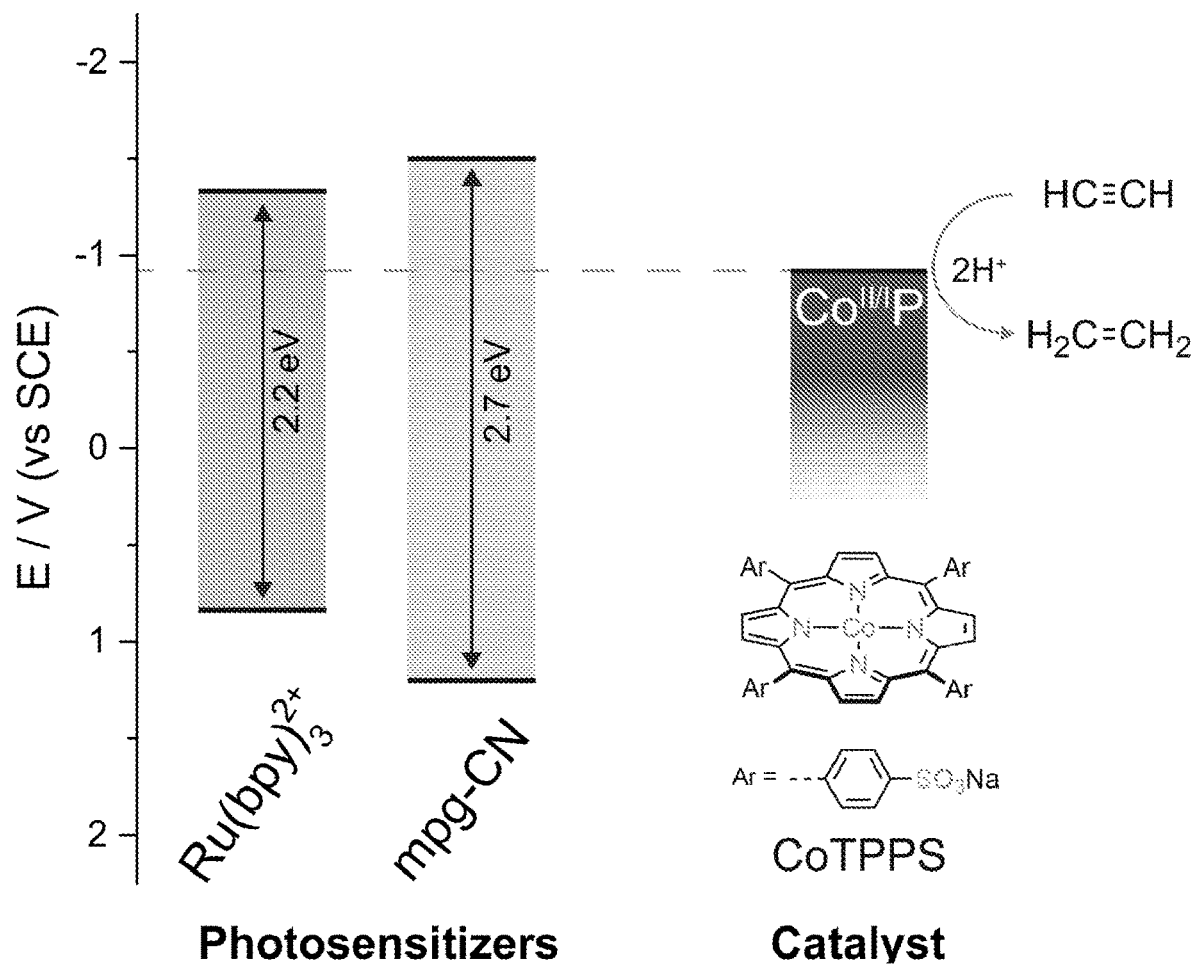
FIGS. 2A-2C show sensitizers and catalysts used for photoreduction of acetylene to ethylene and their performance.
Figure 2B:
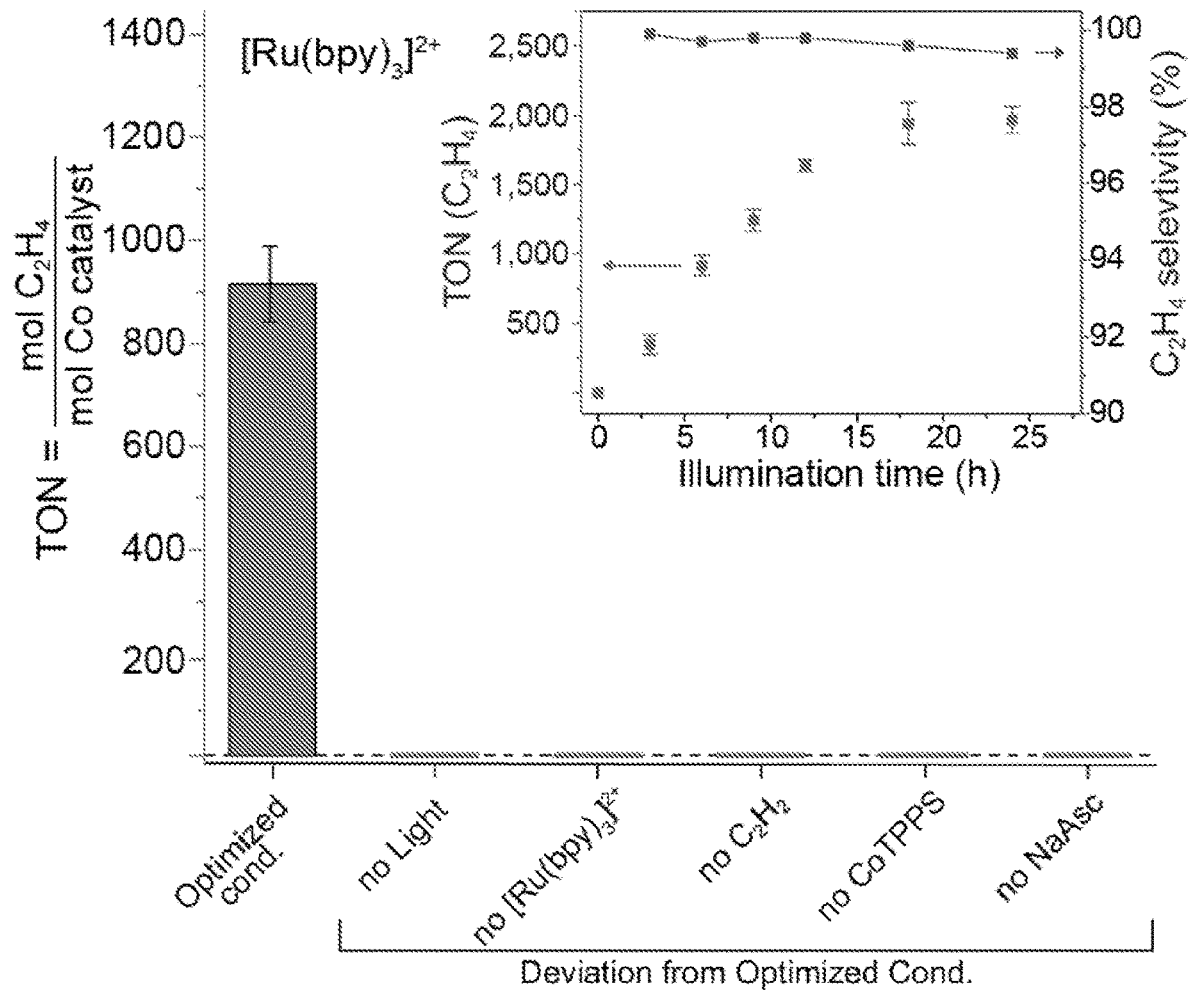
Figure 5A:
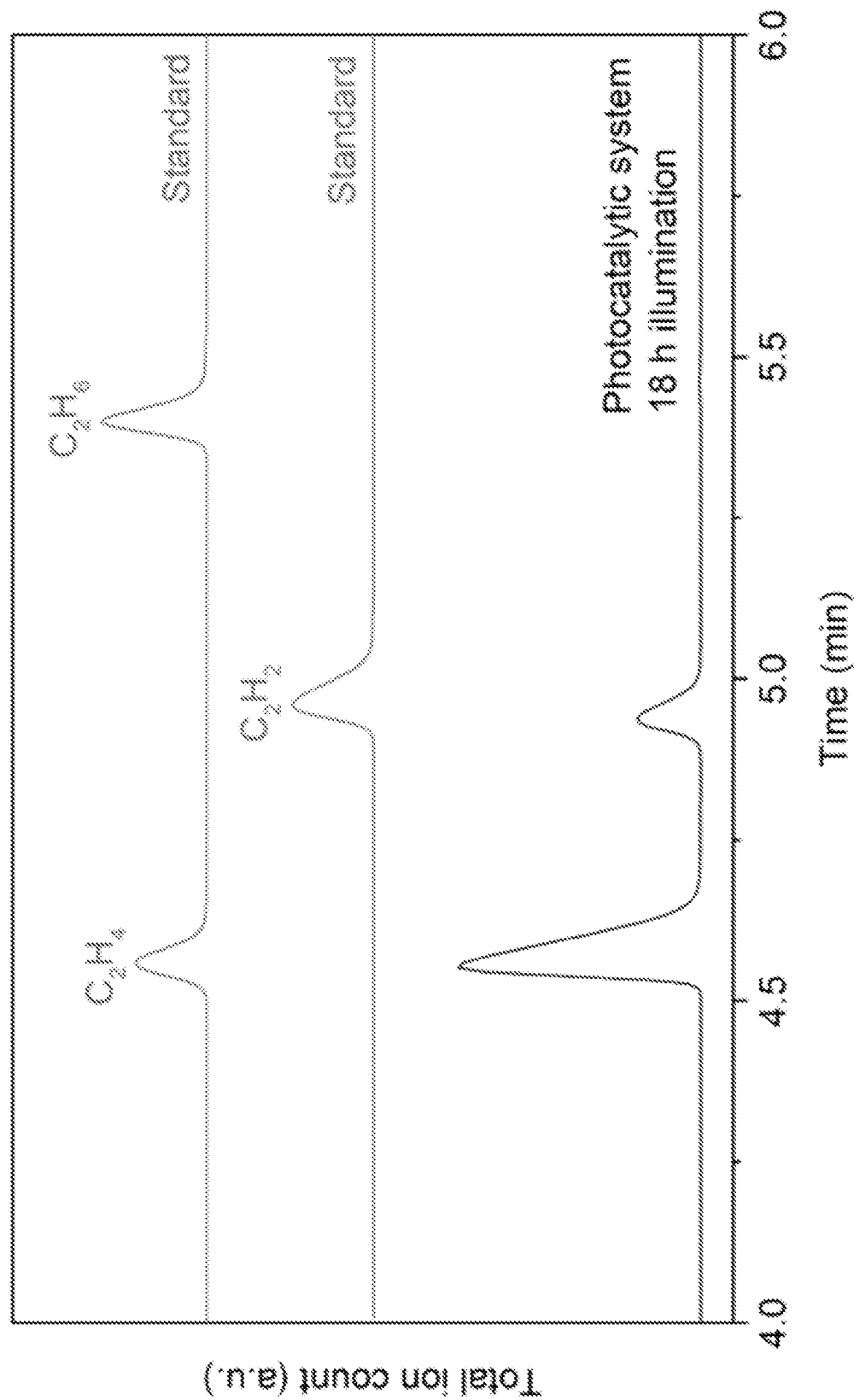
FIGS. 5A-D show typical GC-MS chromatograms and mass spectra observed for the photoreduction reaction of acetylene.
Figures 5B, 5C, 5D:
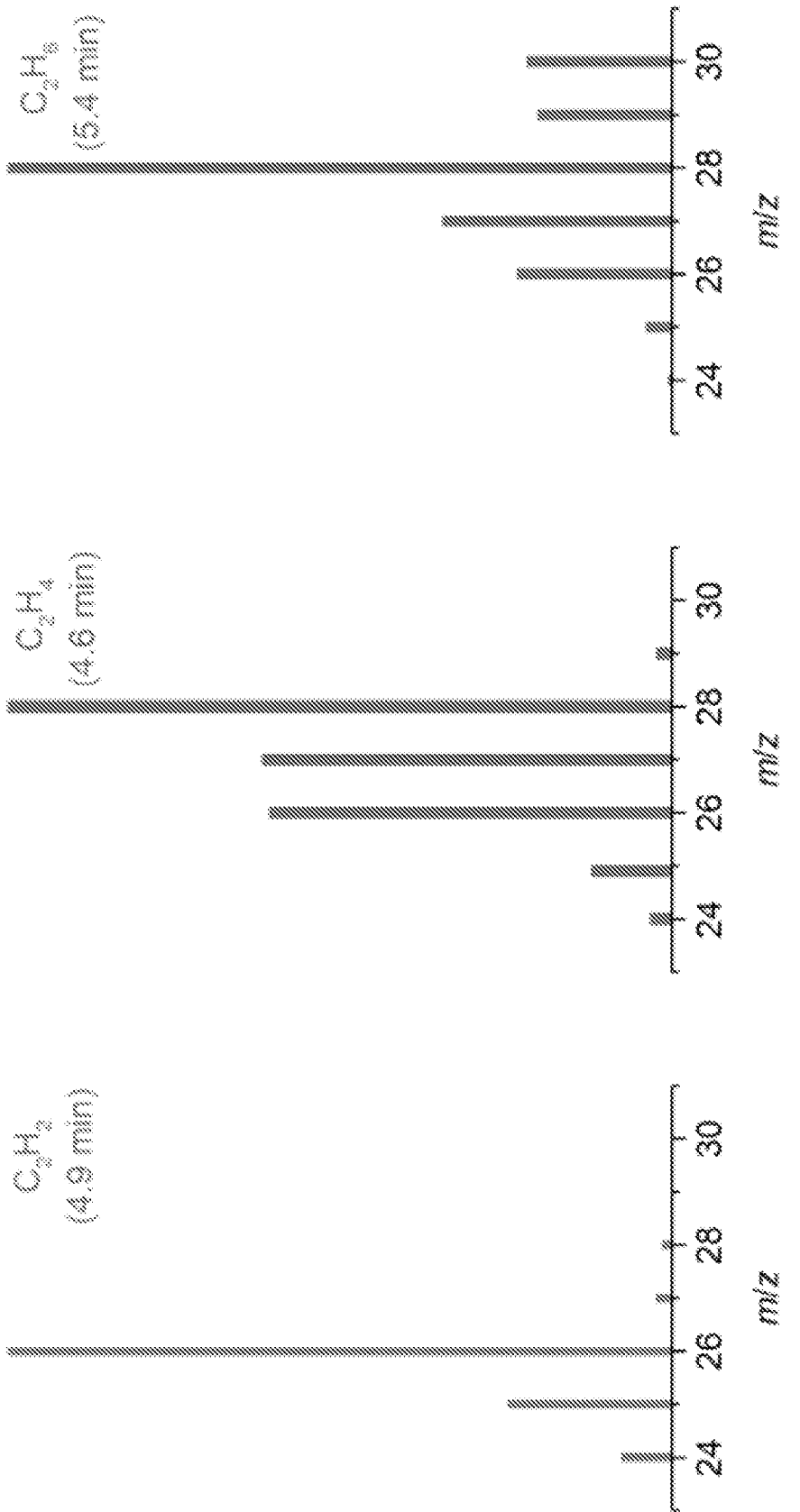
Figure 6A:
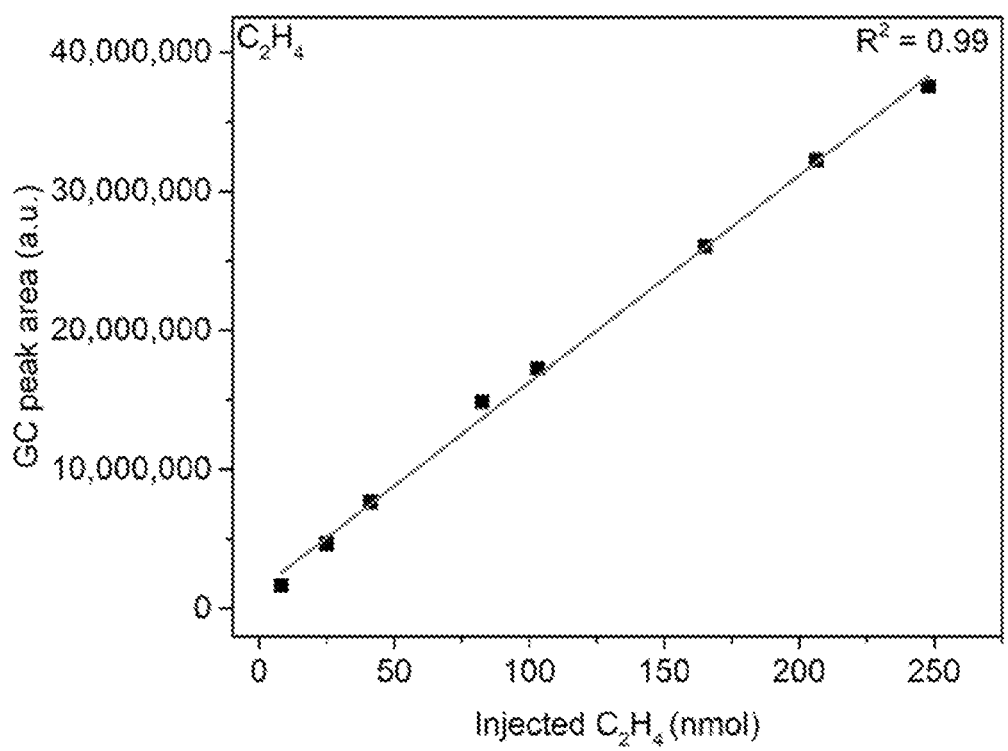
FIGS. 6A-6B show calibration curves for gas chromatography quantification of products for the photoreduction reaction of acetylene using GC-MS.
Figure 6B:
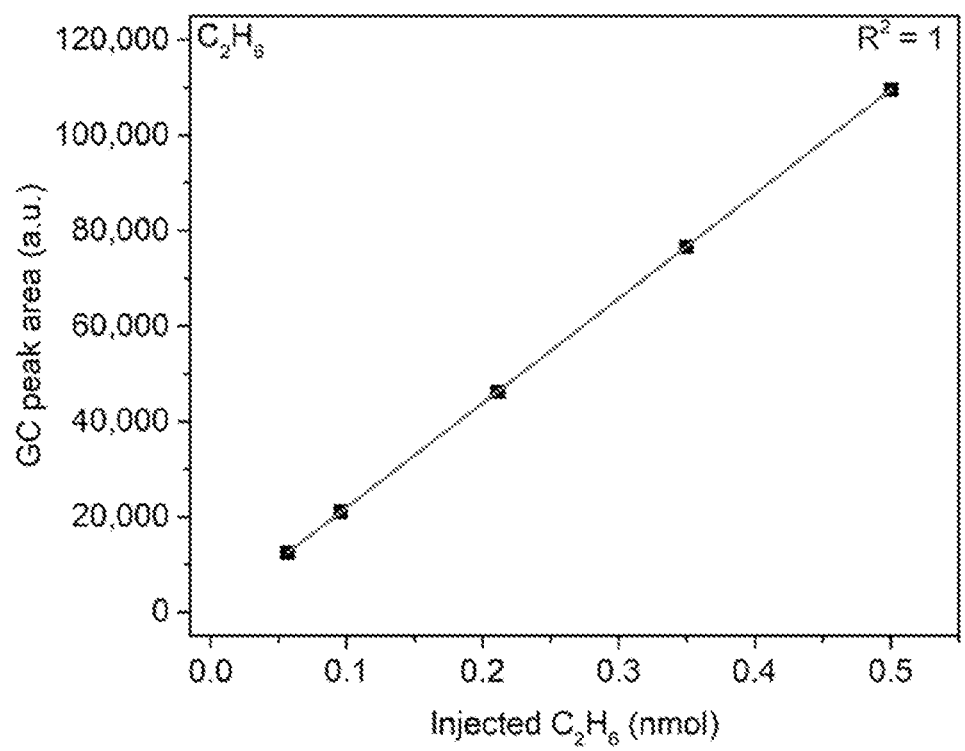
Figure 7:
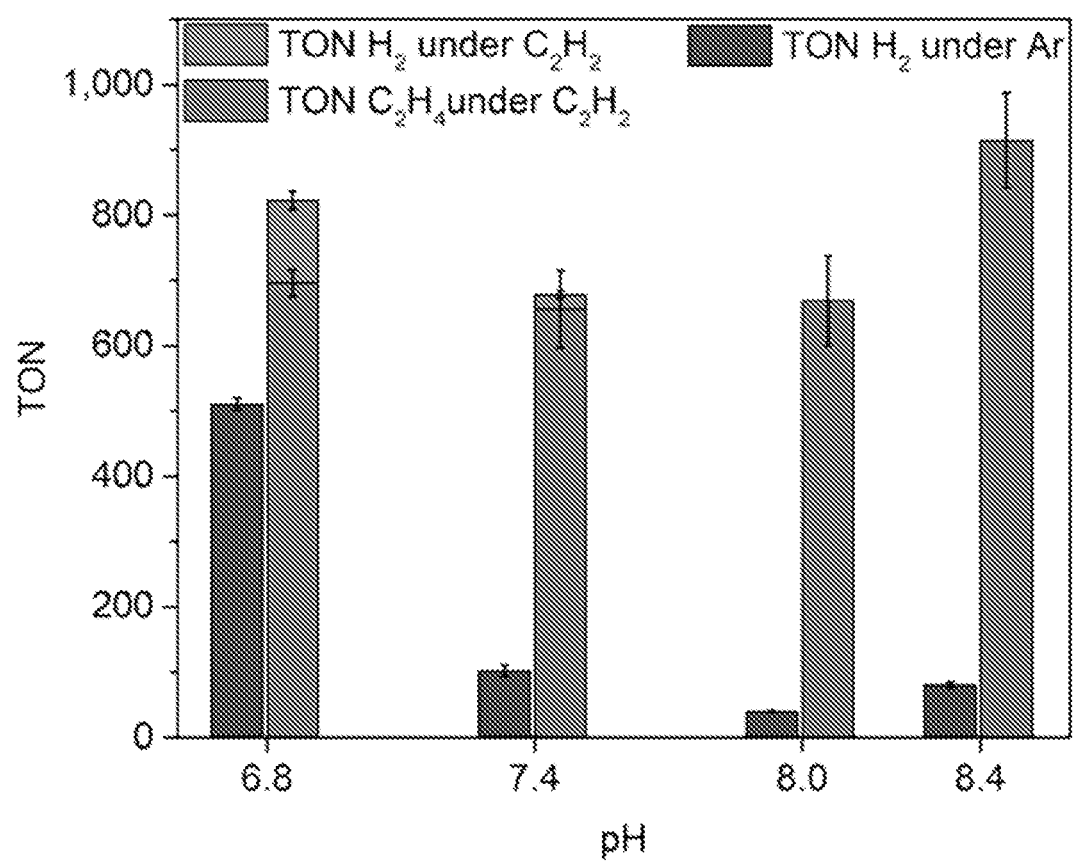
FIG. 7 shows photocatalytic performance through variation of pH. TON ($C_2H_4$) and TON ($H_2$) by the $[Ru(bpy)_3]^{2+}$/CoTPPS system under $C_2H_2$ (≥99.5 vol. %) (red and cyan) or under Ar (blue) irradiated at 450 nm (140 mW·cm$^{-2}$) for 6 h containing 50 µM $[Ru(bpy)_3]^{2+}$, 1 µM CoTPPS, 0.1 M NaAsc. The pH measured before bubbling gas is 6.8, 7.4, 8.0 (using 0.1 M $Na_2HPO_4$/$NaH_2PO_4$ buffers) or 8.4 (using 0.1 M NaHCO$_3$). Error bars indicate standard error of the mean, calculated from two to three runs.
Figure 8A:
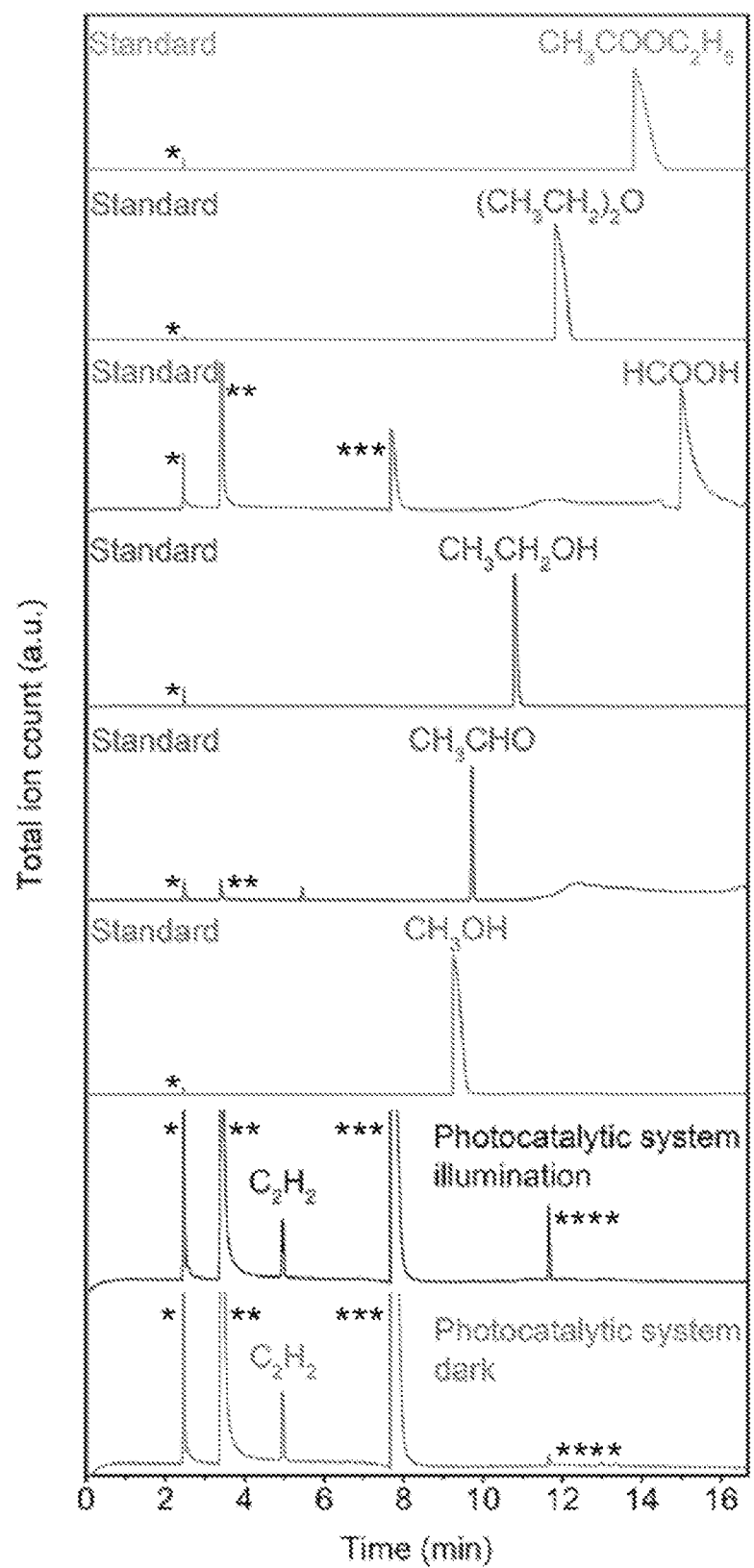
FIGS. 8A-8H show typical GC-MS chromatograms and mass spectra of the liquid samples observed for the photoreduction reaction of acetylene.
Figure 8B:
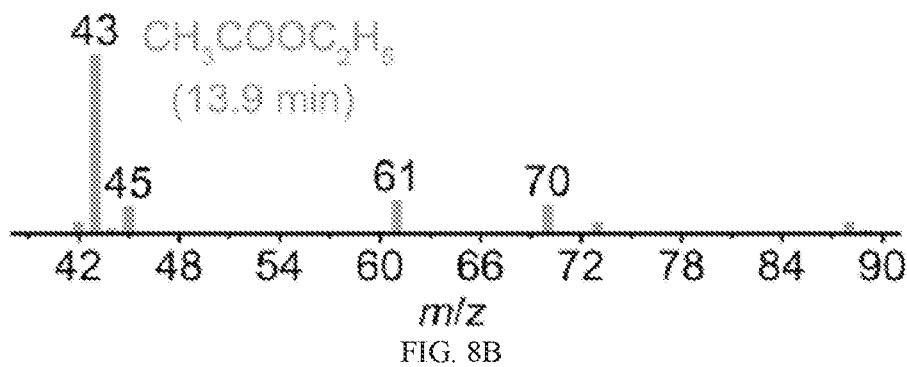
Figure 8C:
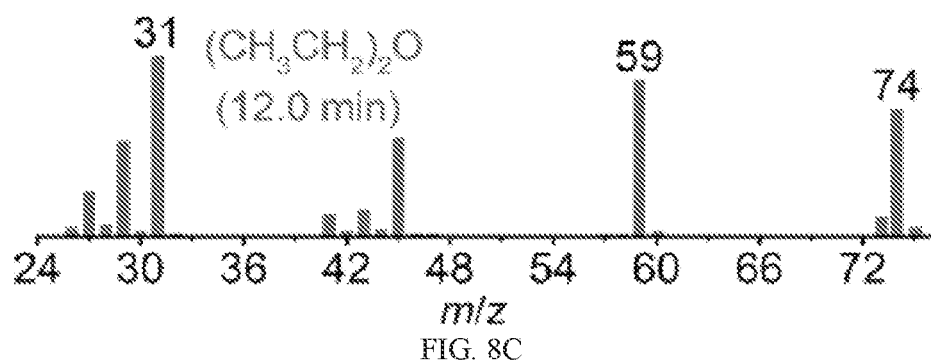
Figure 8D:
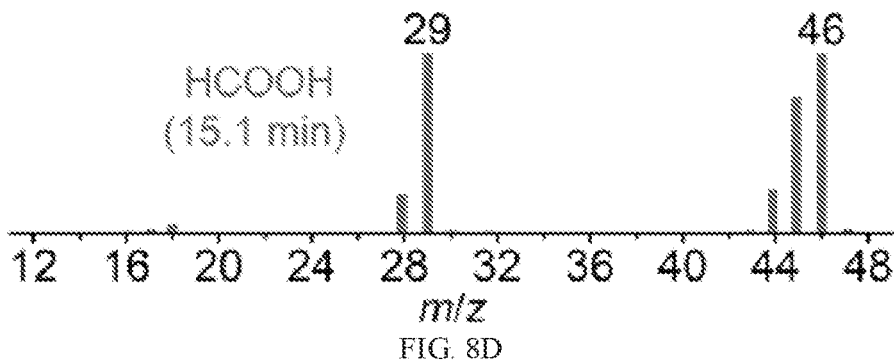
Figure 8E:
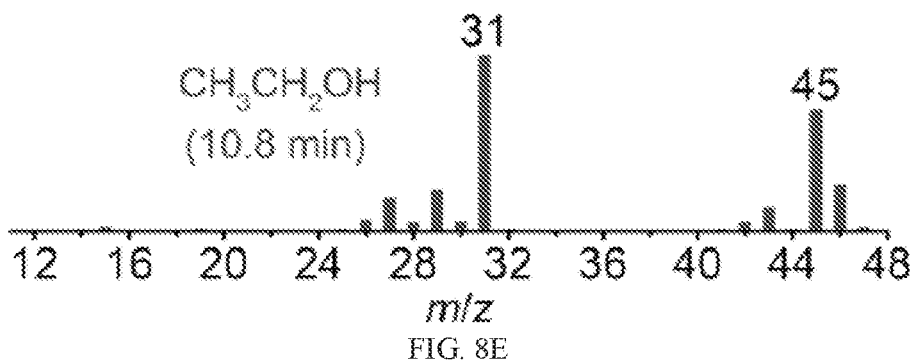
Figure 8F:
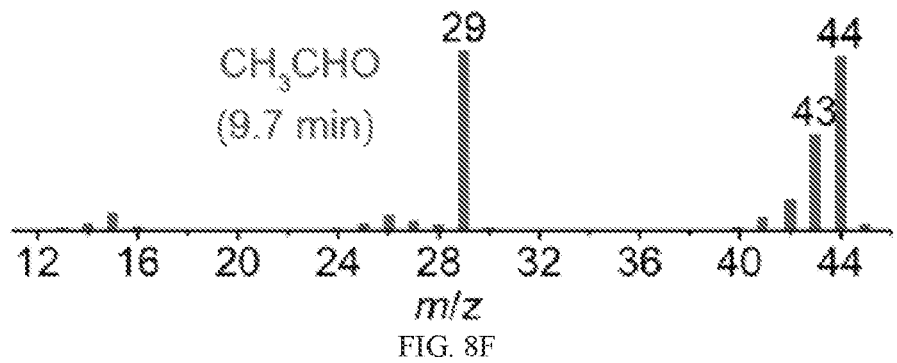
Figure 8G:
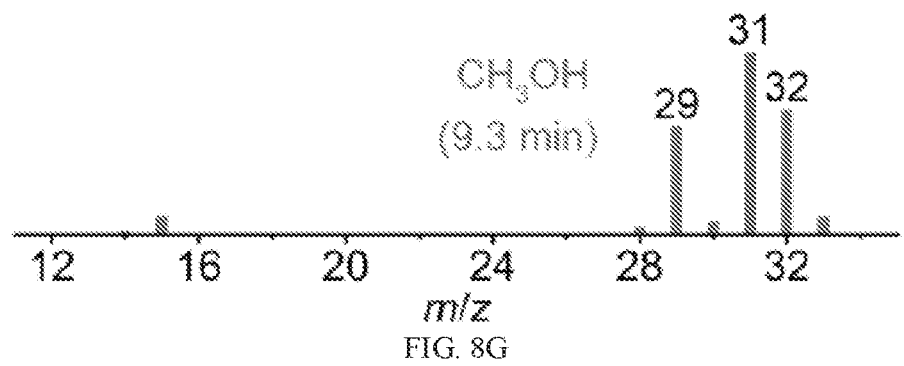
Figure 8H:
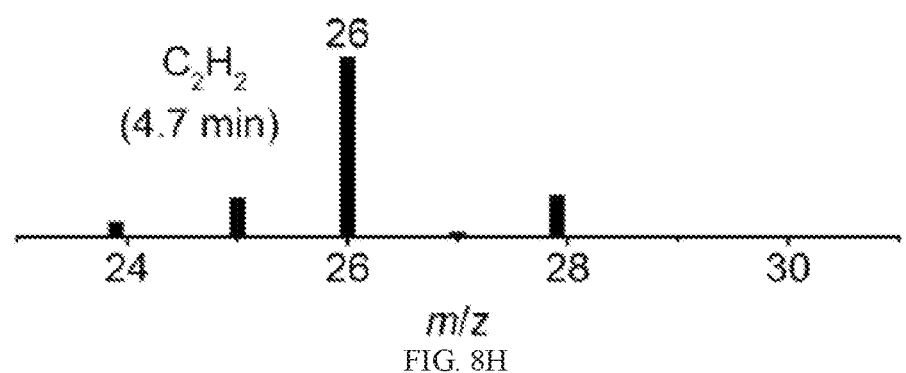
Figure 9:
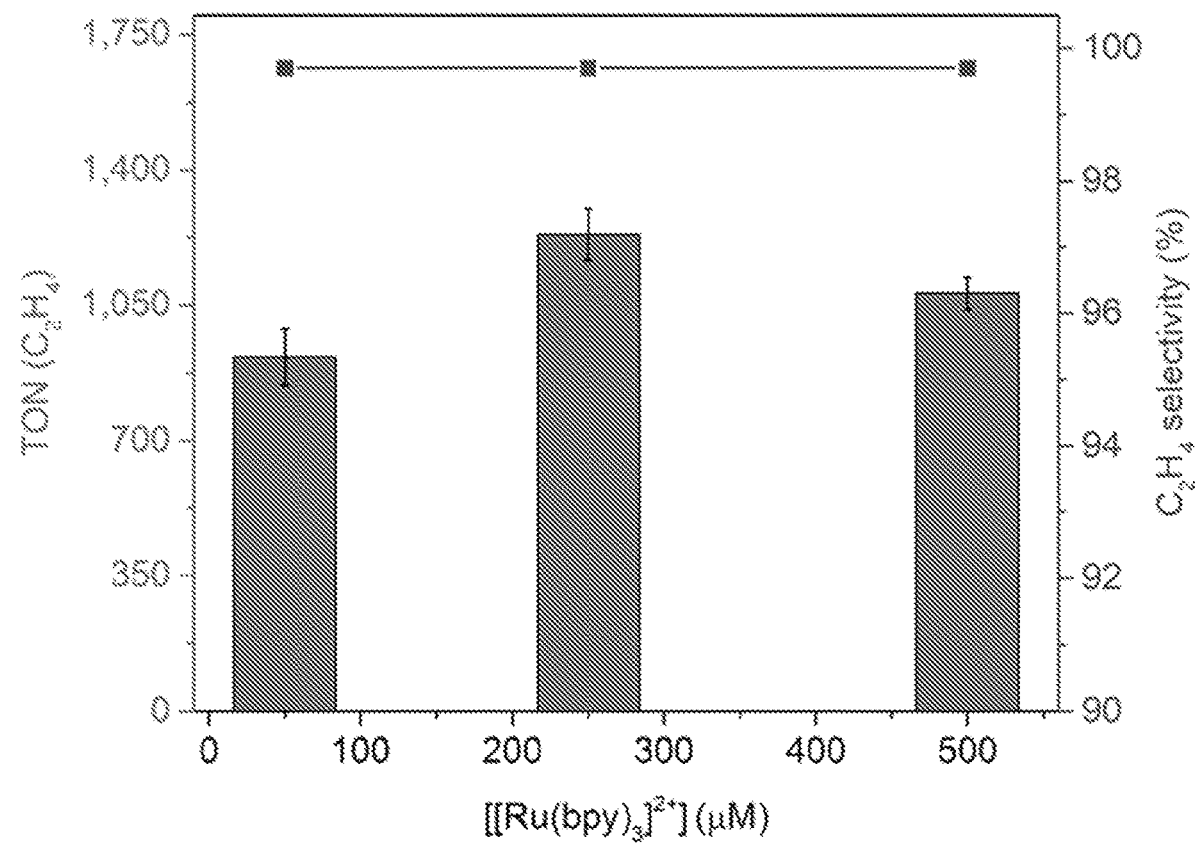
FIG. 9 shows photocatalytic performance through variation of [[Ru(bpy)$_3$]$^{2+}$]. Optimizations of TON (C$_2$H$_4$) and selectivity for C$_2$H$_4$ by the [Ru(bpy)$_3$]$^{2+}$/CoTPPS system under C$_2$H$_2$ (≥99.5 vol. %) irradiated at 450 nm (140 mW·cm$^{-2}$) for 6 h through variation of [[Ru(bpy)$_3$]$^{2+}$] in the presence of 1 μM CoTPPS, 0.1 M NaAsc and 0.1 M NaHCO$_3$. The pH measured before bubbling gas is 8.4. Error bars indicate standard error of the mean, calculated from two to three runs.
Figure 10:
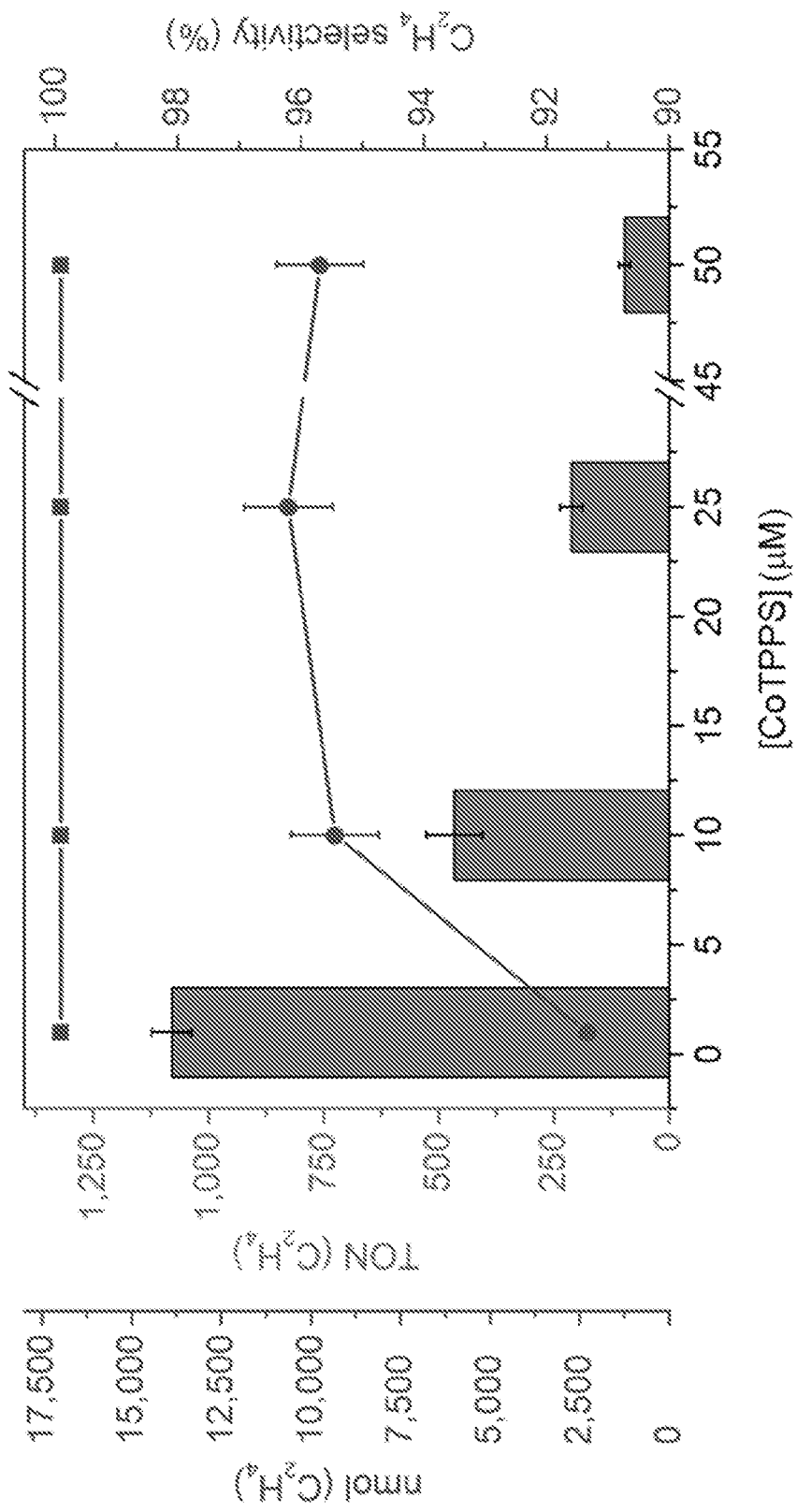
FIG. 10 shows photocatalytic performance through variation of [CoTPPS]. Optimizations of TON (C$_2$H$_4$), amount of C$_2$H$_4$ (nmol C$_2$H$_4$) produced and selectivity for C$_2$H$_4$ by the [Ru(bpy)$_3$]$^{2+}$/CoTPPS system under C$_2$H$_2$ (≥99.5 vol. %) irradiated at 450 nm (140 mW·cm$^{-2}$) for 6 h through variation of [CoTPPS] in the presence of 500 μM [Ru(bpy)$_3$]$^{2+}$, 0.1 M NaAsc and 0.1 M NaHCO$_3$. The pH measured before bubbling gas is 8.4. Error bars indicate standard error of the mean, calculated from two to three runs.
Figure 11:
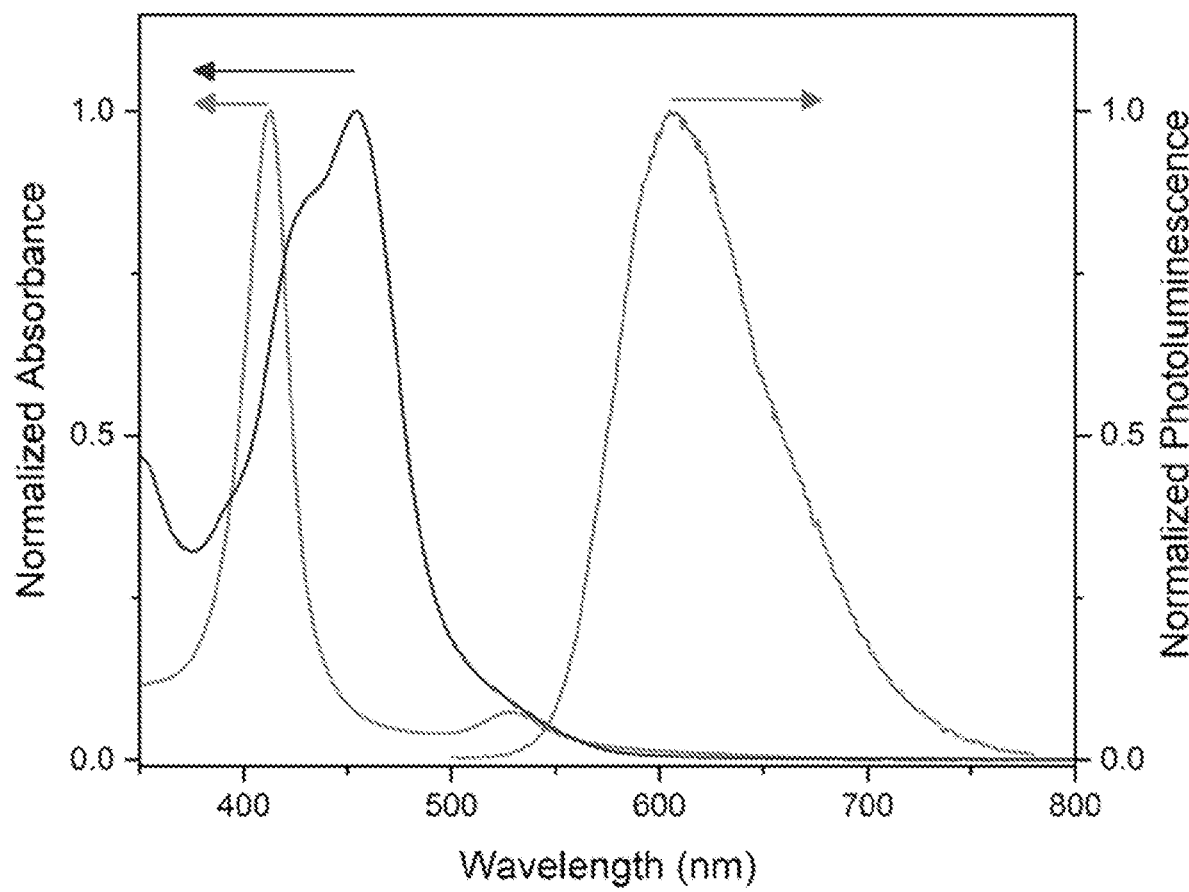
FIG. 11 shows spectral features of CoTPPS and [Ru(bpy)$_3$]$^{2+}$. Normalized absorption spectra of 2.0 mL C$_2$H$_2$ (≥99.5 vol. %)-purged H$_2$O containing CoTPPS (magenta) or [Ru(bpy)$_3$]$^{2+}$ (blue) in 0.1 M NaAsc and 0.1 M NaHCO$_3$. Normalized photoluminescence spectrum of 2.0 mL C$_2$H$_2$ (≥99.5 vol. %)-purged H$_2$O containing [Ru(bpy)$_3$]$^{2+}$ (green) in 0.1 M NaAsc and 0.1 M NaHCO$_3$. The pH was 8.4 before bubbling gas.
Figure 12A:
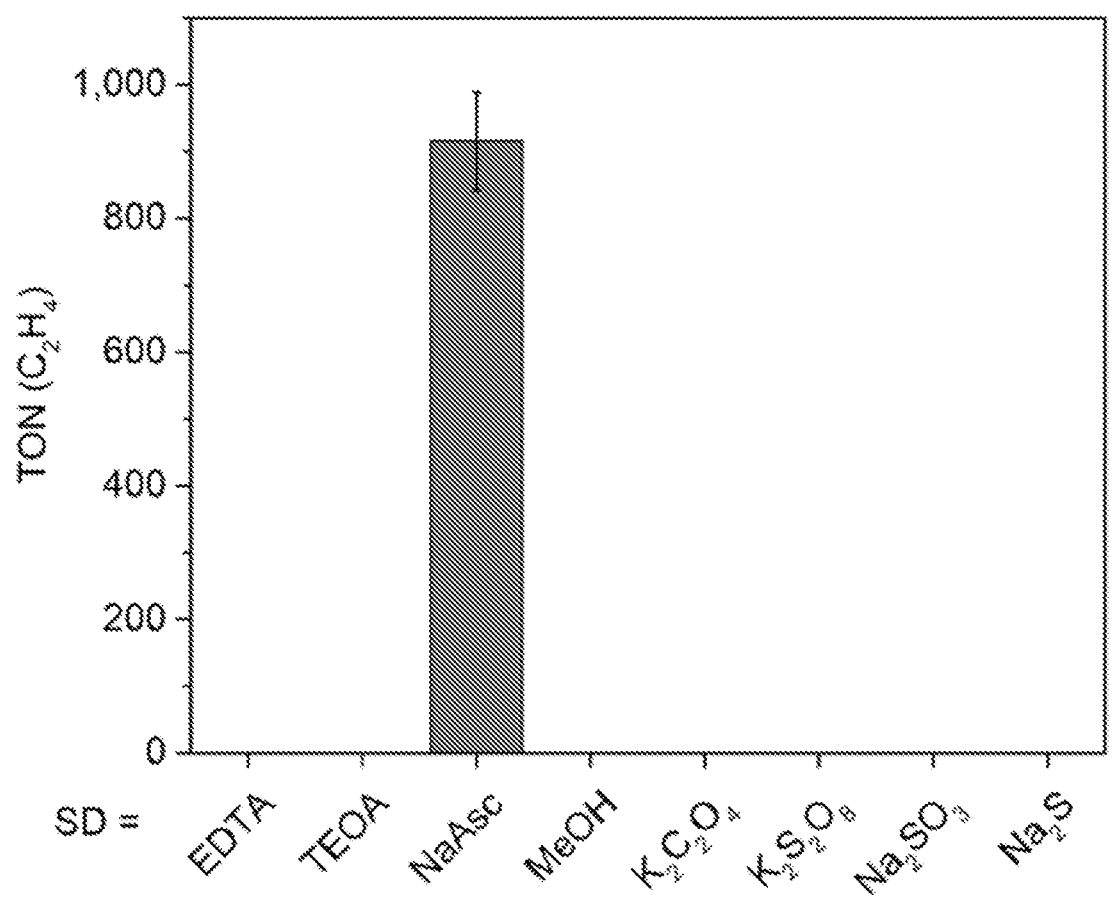
FIGS. 12A-12B show photocatalytic performance through variation of sacrificial donor (SD).
Figure 12B:
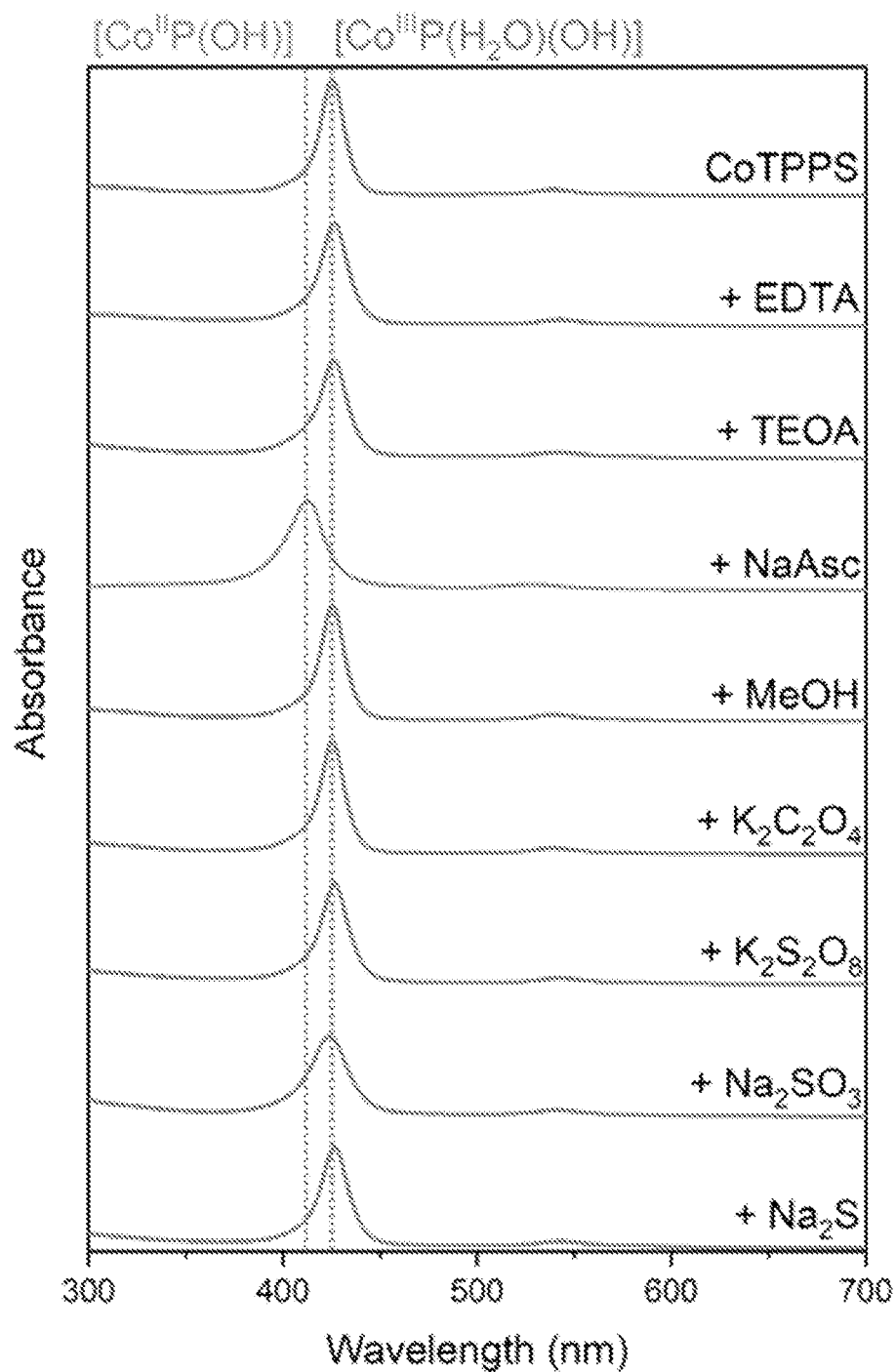
Figure 13A:
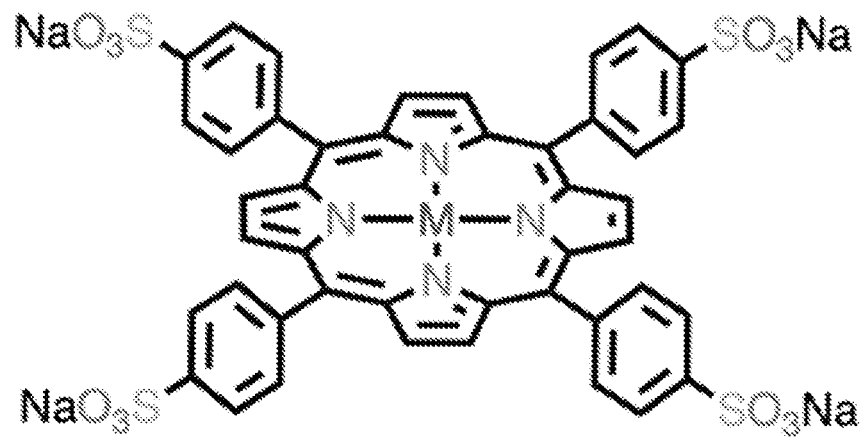
FIGS. 13A-13B show photocatalytic performance through variation of TPPS catalyst.
Figure 13B:
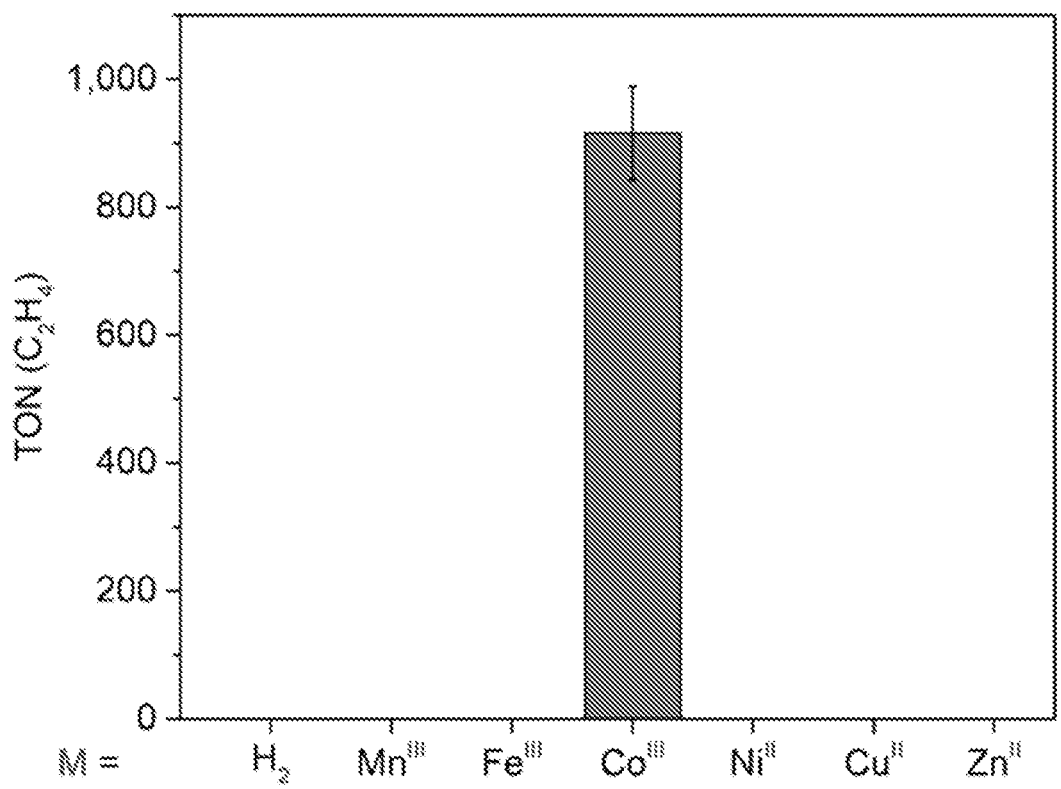
Figure 14A:
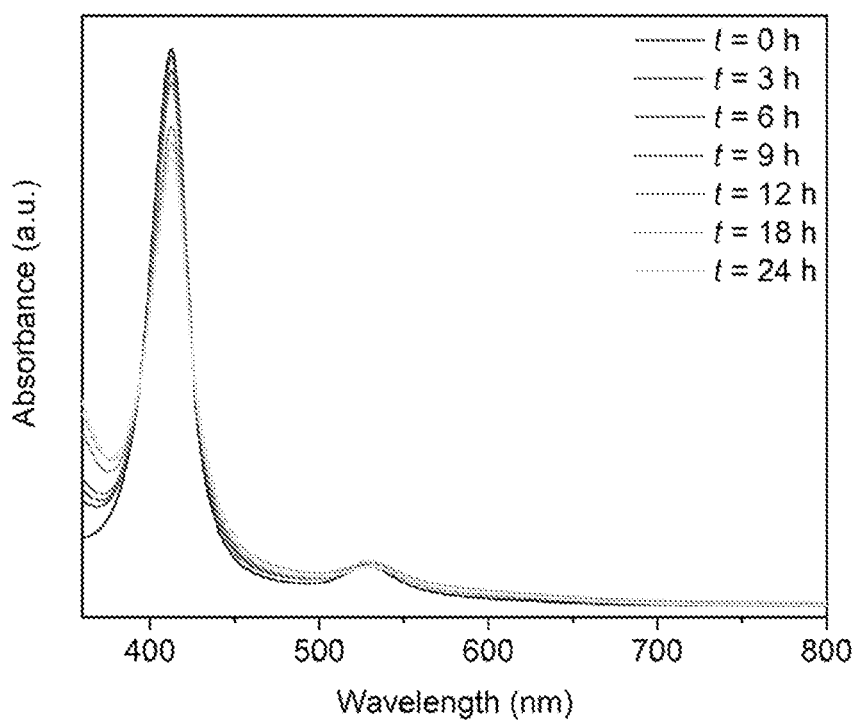
FIGS. 14A-14D show evolution of the absorption spectrum of [Ru(bpy)$_3$]$^{2+}$ and CoTPPS with irradiation time.
Figure 14B:
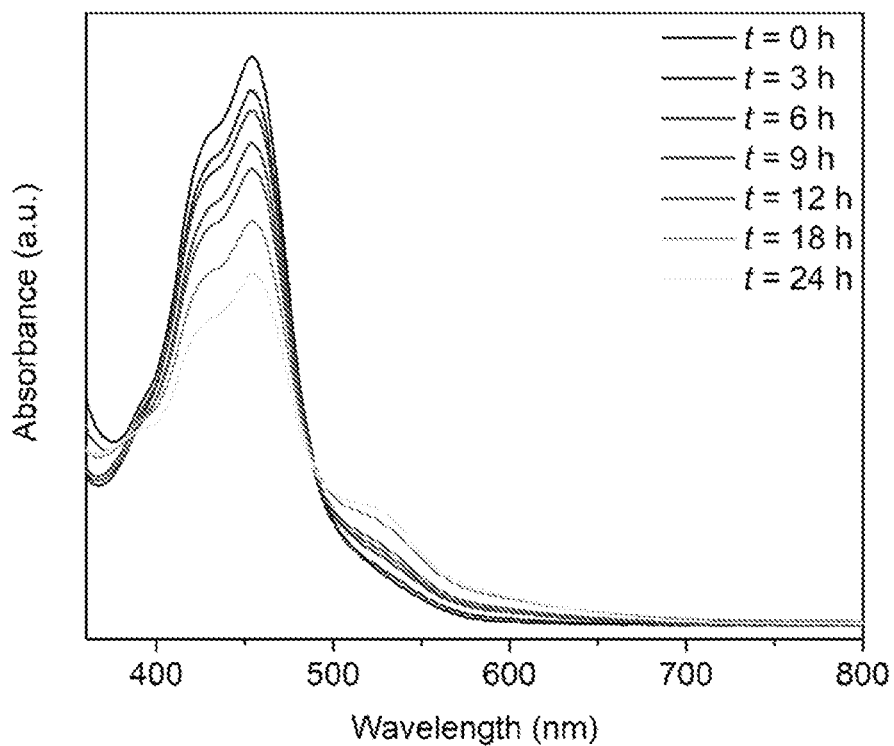
Figure 14C:
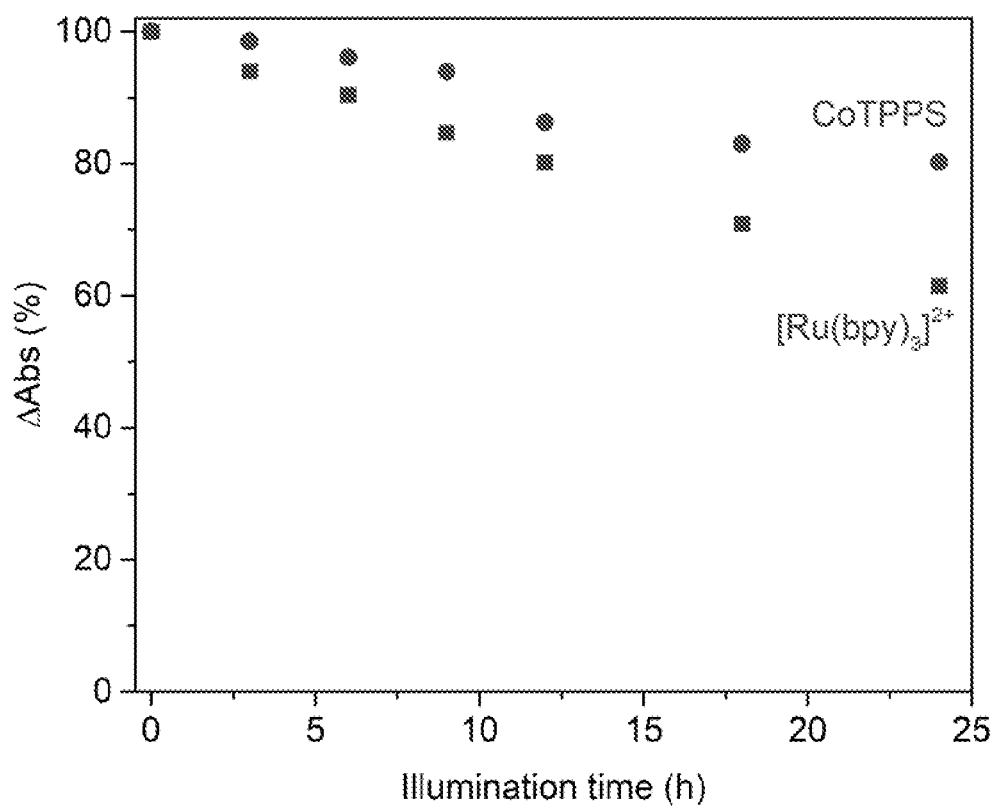
Figure 14D:
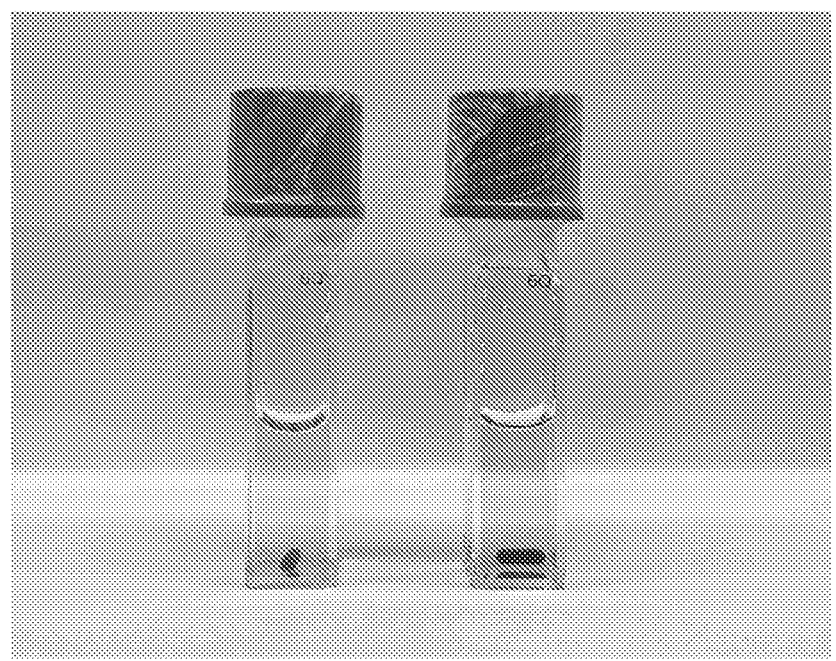

The three-component catalytic reaction mixture used herein contains 1 μM CoTPPS catalyst, 50 μM [Ru(bpy)$_3$]$^{2+}$ sensitizer, and 0.1 M sodium ascorbate (NaAsc) sacrificial reductant in an aqueous bicarbonate buffer (pH 8.4, in order to disfavor competitive proton reduction). In a typical run, 2.0 mL of this mixture (aq) was illuminated under 1 atm $C_2H_2$ (≥99.5 vol. %) using a 450 nm light-emitting diode (LED, 140 mW·cm$^{-2}$). Illumination for 24 h produced $C_2H_4$ with selectivity for ethylene over ethane ($S_{C2H4}$) of 99.4% and TON=1,967, which confirms the catalytic nature of the reaction (inset in FIG. 2B, FIGS. 5-6, Table 1, entry 1, and Table 2). No other gases (e.g., $H_2$) or liquid products were detected (FIG. 7, FIG. 8, and Table 1, entry 1). Upon increasing the concentration of [Ru(bpy)$_3$]$^{2+}$ by a factor of five to 250 μM, the TON ($C_2H_4$) increased by ~35% with $S_{C2H4}$=99.7% after 6 h of illumination; further increase of [[Ru(bpy)$_3$]$^{2+}$] did not increase the amount of produced $C_2H_4$(FIG. 9). The amount of $C_2H_4$ produced increased with the concentration of catalyst and stopped increasing above [CoTPPS] ~25 μM (FIG. 10 and FIG. 11). No $C_2H_4$ is produced in the absence of sensitizer, catalyst, sacrificial donor, light or $C_2H_2$ feedstock (FIG. 2b and Table 1, entries 2-6). Additionally, no $C_2H_4$ is produced in the presence of other commonly employed sacrificial donors (FIG. 12) or of metal-free or other metals porphyrins (FIG. 13). When photoreduction reaction was performed with cobalt nanoparticles (as opposed to CoTPPS), the TON decreased dramatically, and when mercury was added to the CoTPPS system, the TON was not meaningfully affected (Table 1, entries 7 and 8). These control experiments unequivocally prove that this reaction is primarily homogeneous and photocatalytic, powered by [Ru(bpy)$_3$]$^{2+}$-sensitized CoTPPS.

Figure 15:
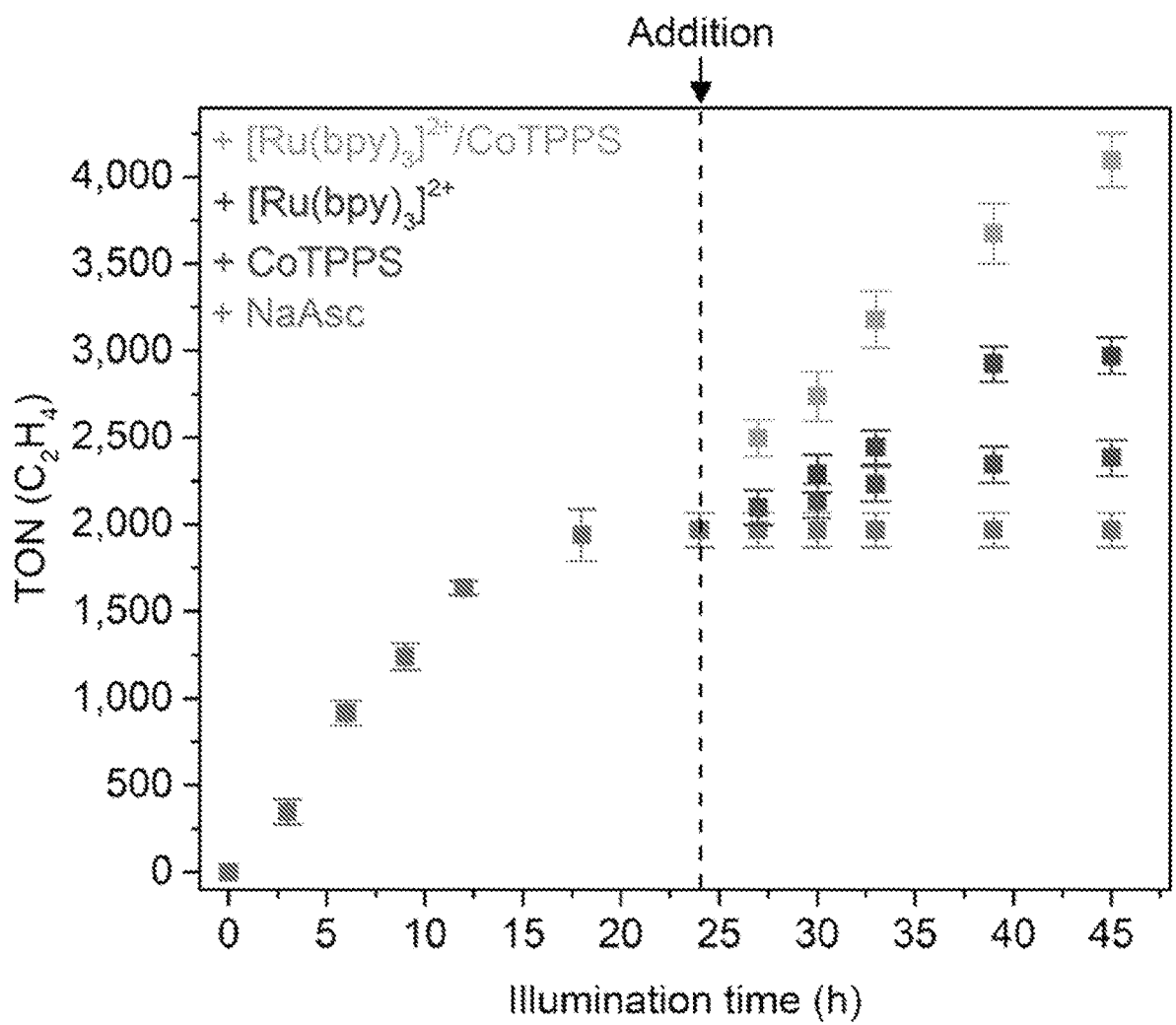
FIG. 15 shows readdition experiments showing recovery of C$_2$H$_4$ production. TON (C$_2$H$_4$) by the [Ru(bpy)$_3$]$^{2+}$/CoTPPS system under C$_2$H$_2$ (≥99.5 vol. %) irradiated at 450 nm (140 mW·cm$^{-2}$) as a function of irradiation time containing 50 μM [Ru(bpy)$_3$]$^{2+}$, 1 μM CoTPPS, 0.1 M NaAsc and 0.1 M NaHCO$_3$ upon readdition of 50 μM [Ru(bpy)$_3$]$^{2+}$/1 μM CoTPPS (orange), 50 μM [Ru(bpy)$_3$]$^{2+}$ (blue), 1 μM CoTPPS (purple), 0.1 M NaAsc (green). The pH measured before bubbling gas is 8.4. Error bars indicate standard error of the mean, calculated from two to three runs.

Ethylene production saturated after 24 h (inset in FIG. 2B) due to degradation of both [Ru(bpy)$_3$]$^{2+}$ and CoTPPS (FIG. 14), probably by the oxidized sacrificial reductant, dehydroascorbic acid, which also inhibits catalysis when added directly to the reaction mixture (Table 1, entry 9). Accordingly, experiments show recovery of the initial activity by re-addition of the initial amount of [Ru(bpy)$_3$]$^{2+}$ and CoTPPS, partial recovery of the initial activity by re-addition of the initial amount of either [Ru(bpy)$_3$]$^{2+}$ or CoTPPS, and no recovery of the initial activity by re-addition of the initial amount of NaAsc only (FIG. 15).

Figure 16:
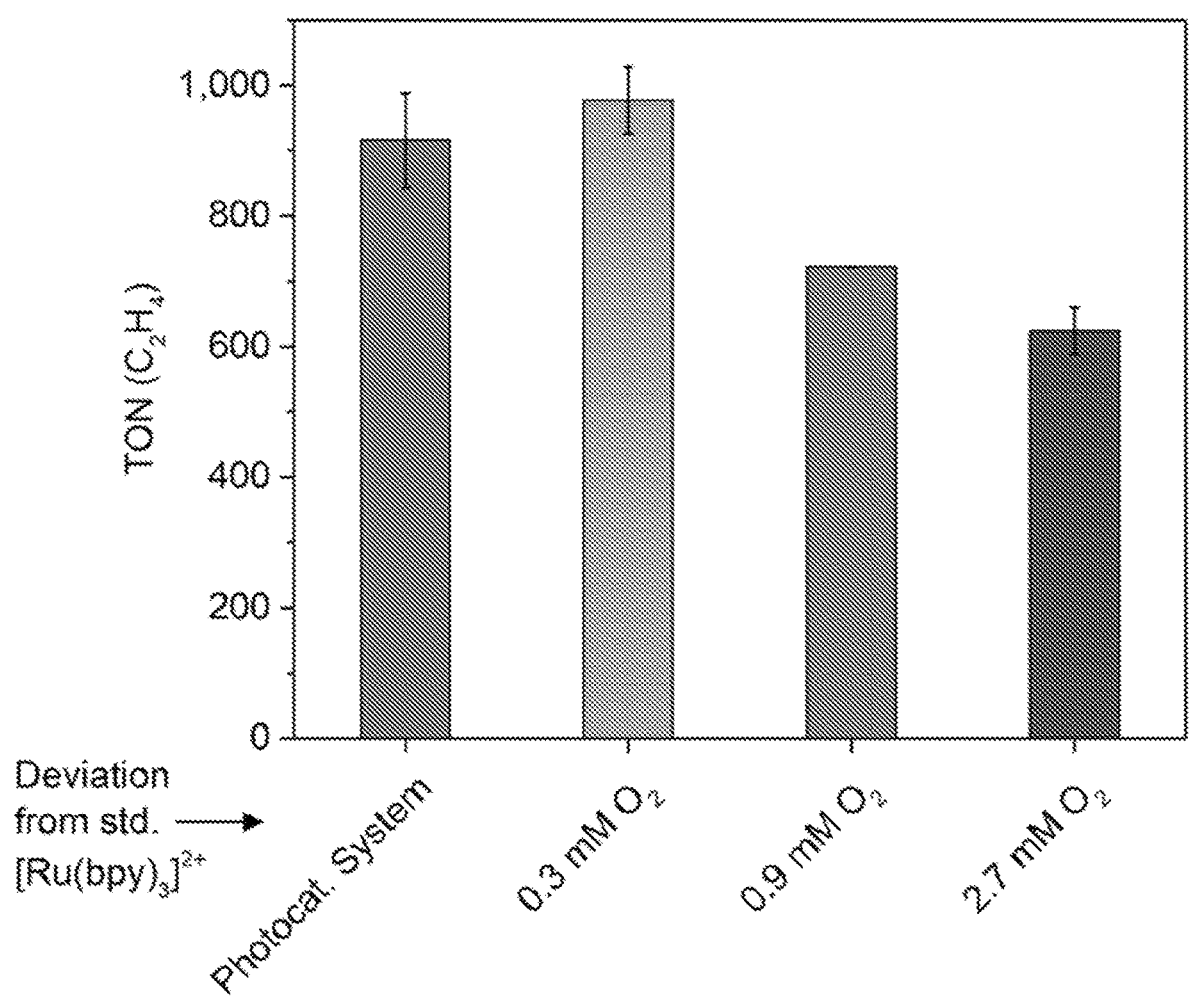
FIG. 16 shows photocatalytic performance in presence of O$_2$. TON (C$_2$H$_4$) by the [Ru(bpy)$_3$]$^{2+}$/CoTPPS system under C$_2$H$_2$ (≥99.5 vol. %) irradiated at 450 nm (140 mW·cm$^{-2}$) for 6 h containing 50 μM [Ru(bpy)$_3$]$^{2+}$, 1 μM CoTPPS, 0.1 M NaAsc and 0.1 M NaHCO$_3$ (red) and with different initial concentration of O$_2$ added in the headspace (blue) after bubbling gas. The pH measured before bubbling gas is 8.4. Error bars indicate standard error of the mean, calculated from two to three runs.
Figure 17:
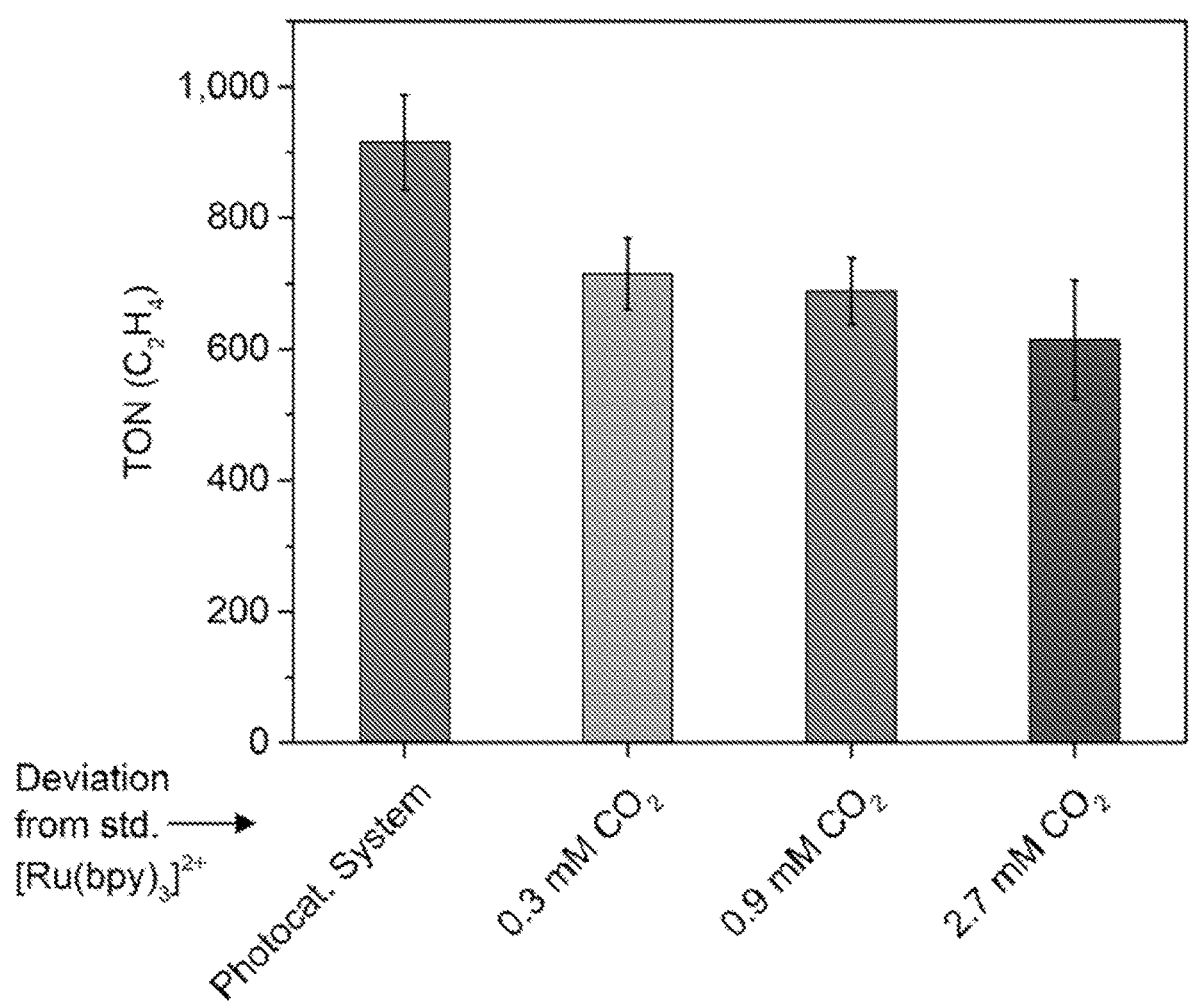
FIG. 17 shows photocatalytic performance in presence of CO$_2$. TON (C$_2$H$_4$) by the [Ru(bpy)$_3$]$^{2+}$/CoTPPS system under C$_2$H$_2$ (≥99.5 vol. %) irradiated at 450 nm (140 mW·cm$^{-2}$) for 6 h containing 50 μM [Ru(bpy)$_3$]$^{2+}$, 1 μM CoTPPS, 0.1 M NaAsc and 0.1 M NaHCO$_3$ (red) and with different initial concentration of CO$_2$ added in the headspace (blue) after bubbling gas. The pH measured before bubbling gas is 8.4. Error bars indicate standard error of the mean, calculated from two to three runs.
Figure 18:
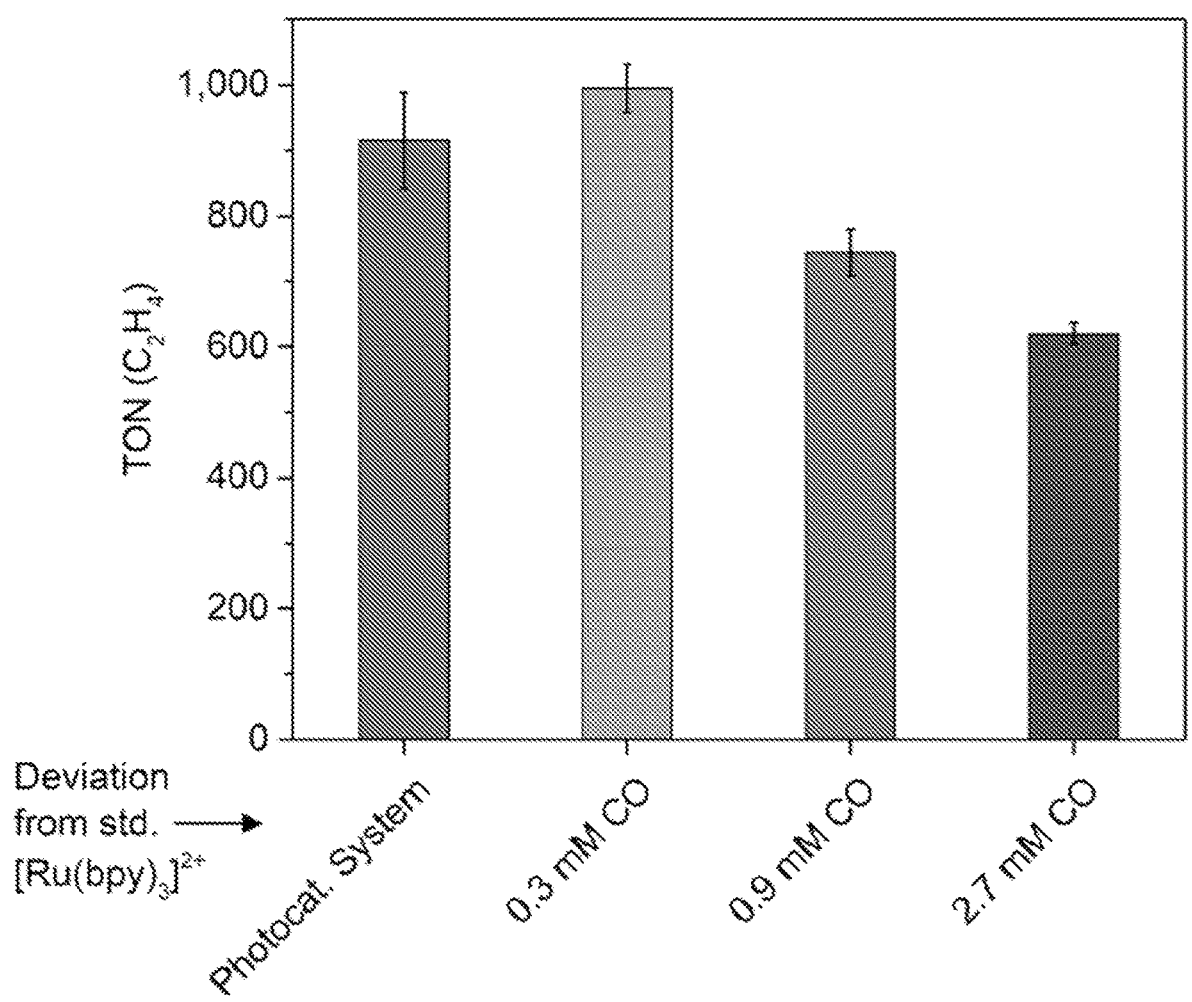
FIG. 18 shows photocatalytic performance in presence of CO. TON (C$_2$H$_4$) by the [Ru(bpy)$_3$]$^{2+}$/CoTPPS system under C$_2$H$_2$ (≥99.5 vol. %) irradiated at 450 nm (140 mW·cm$^{-2}$) for 6 h containing 50 μM [Ru(bpy)$_3$]$^{2+}$, 1 μM CoTPPS, 0.1 M NaAsc and 0.1 M NaHCO$_3$ (red) and with different initial concentration of CO added in the headspace (blue) after bubbling gas. The pH measured before bubbling gas is 8.4. Error bars indicate standard error of the mean, calculated from two to three runs.

The photocatalytic activity of this acetylene reduction system was tolerant to presence of various gases, including $O_2$, $CO_2$, and CO (FIGS. 16-18), the latter two of which are typically present as impurities. CO absorbs to the active sites of conventional hydrogenation catalysts and acts as an inhibitor; tolerance to these adventitious adsorbates highlights this system's potential advantages over traditional catalysts in an industrial setting.

Figure 2C:
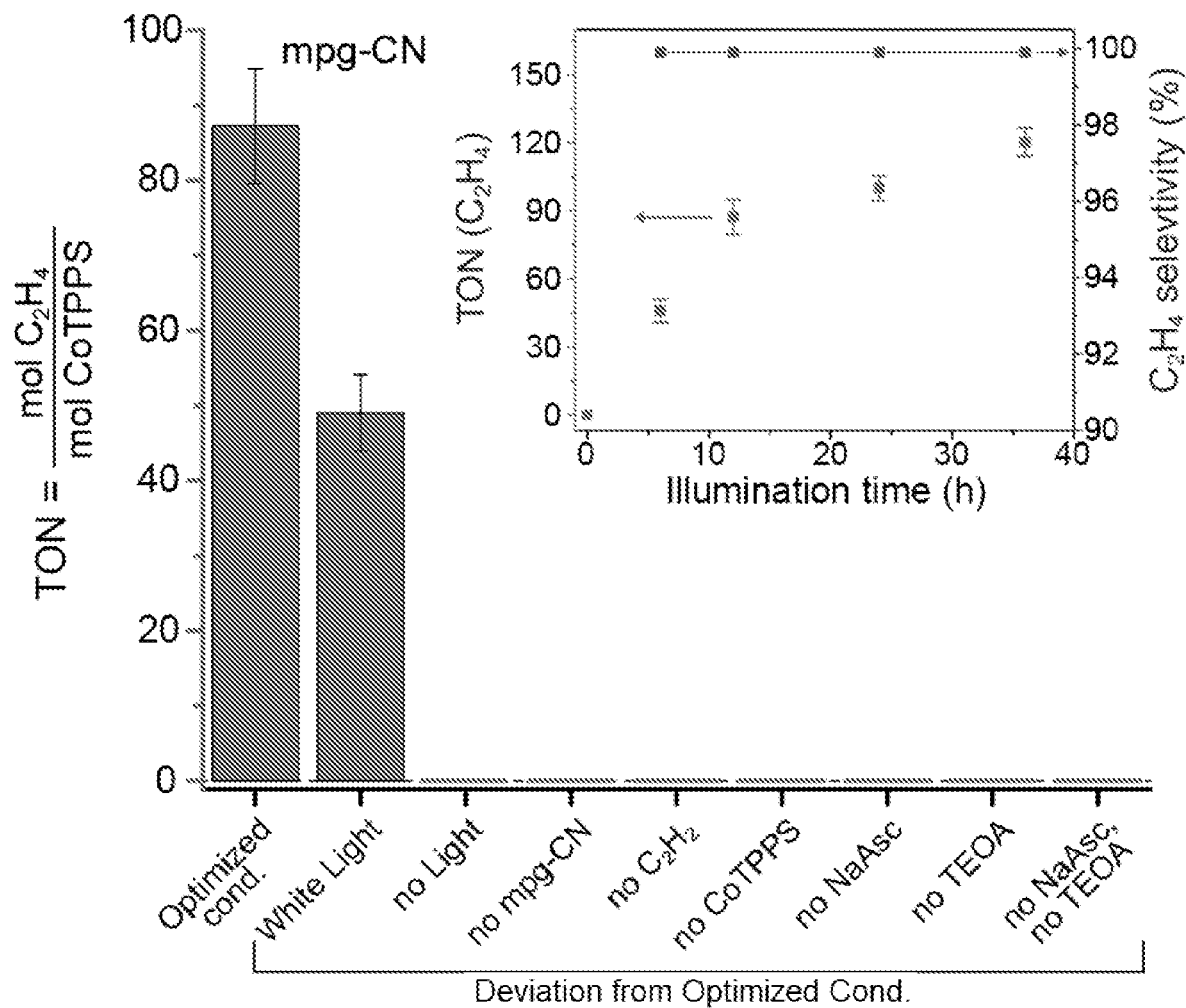

The [Ru(bpy)$_3$]$^{2+}$ photosensitizer can be replaced with the organic semiconductor mpg-CN, which is a broadband absorber and can be prepared at only a few dollars per kg from readily available starting material. A system containing 10 μM CoTPPS, 2.5 mg mpg-CN and 0.05 M NaAsc+0.2 M TEOA under $C_2H_2$ (≥99.5 vol. %) in water (pH 10.6) produced $C_2H_4$ with TON=87, $S_{C2H4}$>99.9% after 12 h of illumination with a 450 nm LED, and TON=49, $S_{C2H4}$>99% after 12 h of illumination with white light irradiation (140 mW·cm$^{-2}$) (FIG. 2C, Tables 3 and 4).

A major advantage of the CoTPPS system with respect to sustainability is that it does not require an external feed of $H_2$, the source of protons/hydrogens was further investigated. The three-component system did not evolve any detectable $H_2$ (FIG. 7 and Table 1, entry 1), so it is extremely unlikely that in situ production of $H_2$ is a source of hydrogen here. When experiments were conducted in $H_2O$ and using $C_2H_2$ (5 vol. %, He balance) as feedstock, gas chromatography/mass spectrometry (GC-MS) analysis identified $C_2H_4$ (m/z=28) as the reaction product (FIG. 3D). When the photoreduction was instead performed in $D_2O$ solvent, the formation of $C_2D_4$ (m/z=32) from $C_2D_2$ (m/z=28) was observed (FIG. 3D), produced by exchange between the feedstock $C_2H_2$ and $D_2O$, which was pre-equilibrated before illumination. These two experiments prove unambiguously that not only is acetylene the precursor for the observed $C_2H_4$, but also the protons added to make the $C_2H_4$ reduction product originate from the water solvent.

Figure 19:
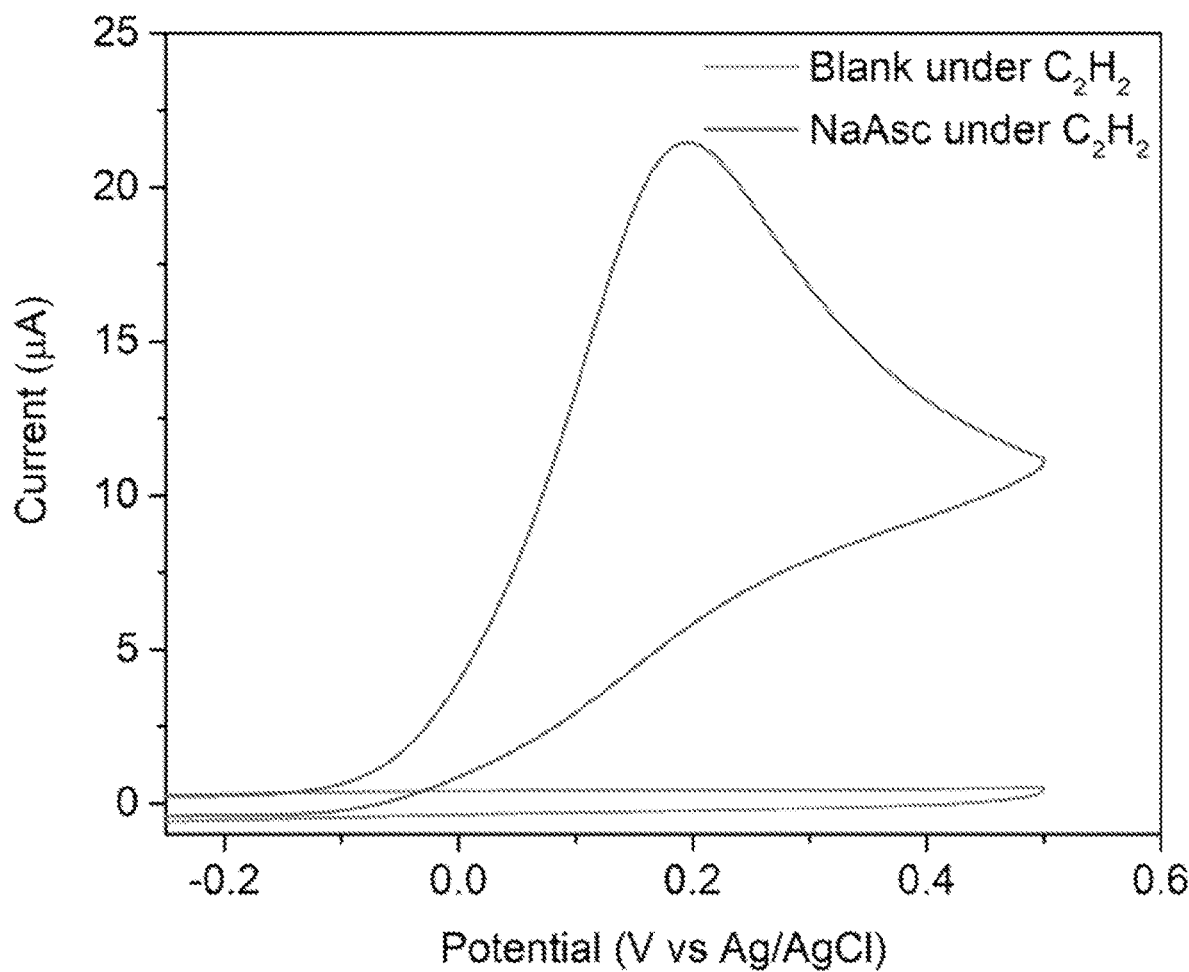
FIG. 19 shows electrochemical characterization of NaAsc. Cyclic voltammogram of 1 mM NaAsc in H$_2$O containing 0.1 M NaHCO$_3$ (pH 8.4) supported with 0.1 M KCl and purged with C$_2$H$_2$ (≥99.5 vol. %) (red).
Figure 20:
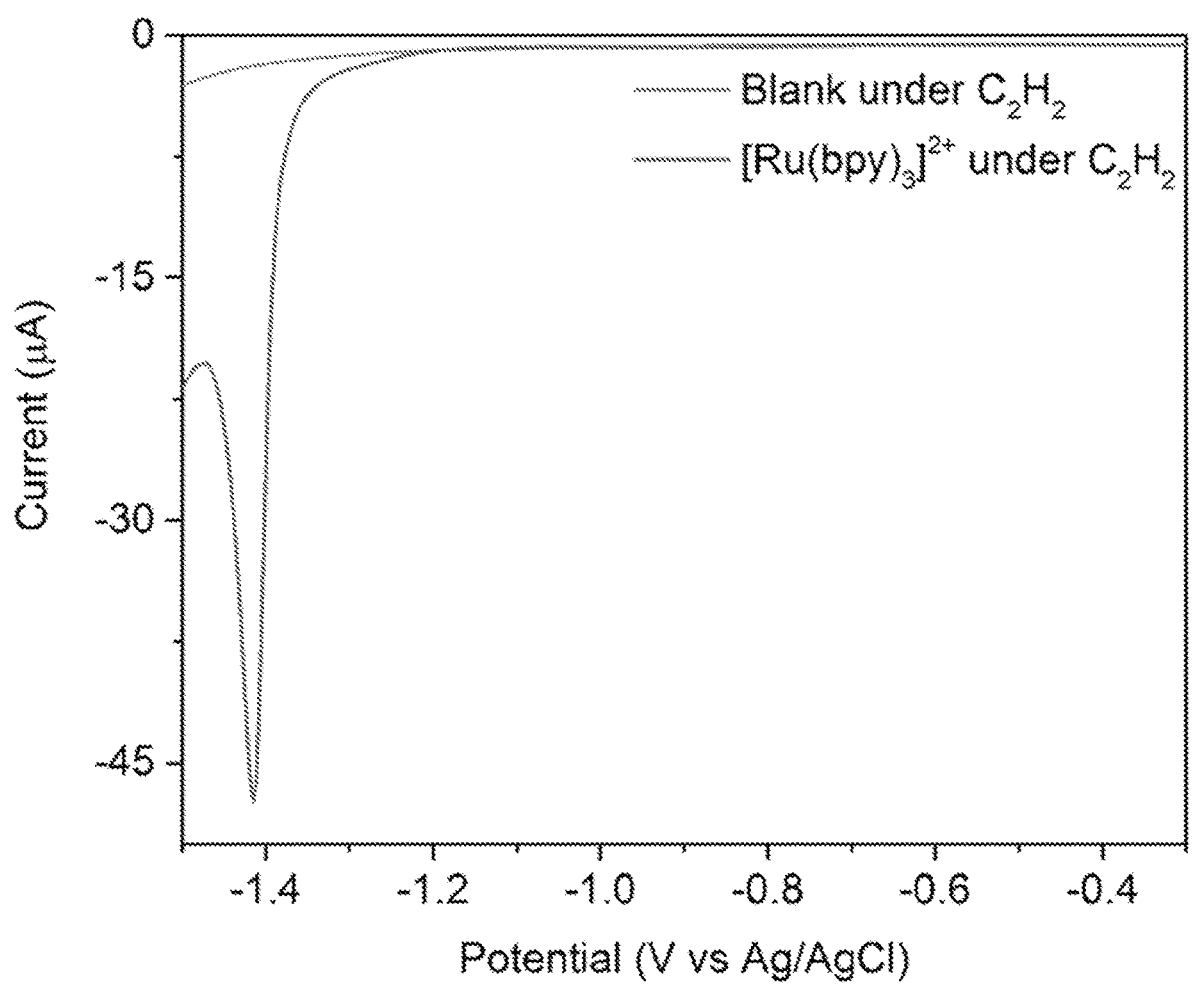
FIG. 20 shows electrochemical characterization of [Ru(bpy)$_3$]$^{2+}$. Square-wave voltammogram of 1 mM [Ru(bpy)$_3$]$^{2+}$ in H$_2$O containing 0.1 M NaHCO$_3$ (pH 8.4) supported with 0.1 M KCl and purged with C$_2$H$_2$ (≥99.5 vol. %) (red).
Figure 21:
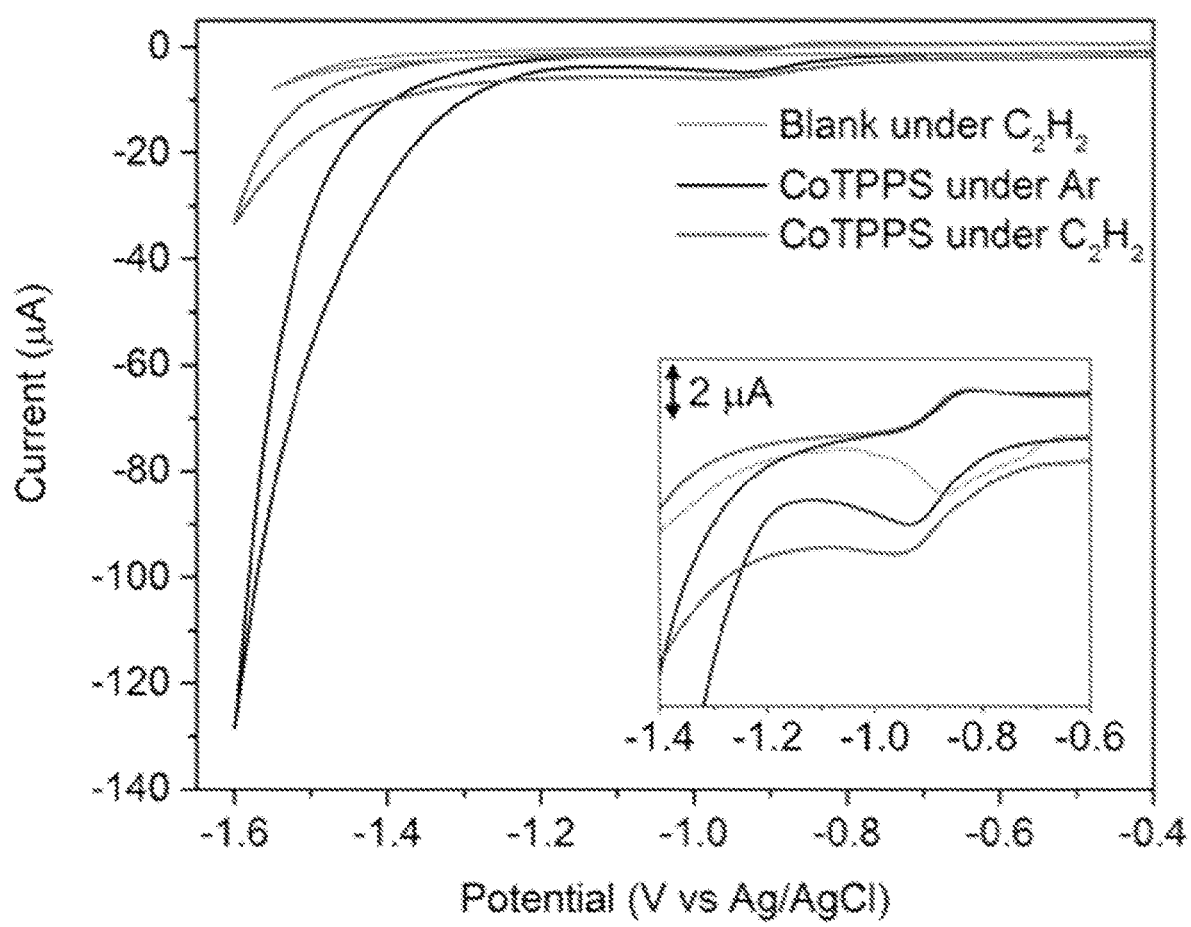
FIG. 21 shows electrochemical characterization of CoTPPS. Cyclic voltammograms of 0.5 mM CoTPPS in H$_2$O containing 0.1 M NaHCO$_3$ (pH 8.4) supported with 0.1 M KCl and purged with Ar (black) or C$_2$H$_2$ (≥99.5 vol. %) (red). (Inset) Zoomed cyclic voltammograms of 0.5 mM CoTPPS in H$_2$O containing 0.1 M NaHCO$_3$ (pH 8.4) supported with 0.1 M KCl and purged with Ar (black) or C$_2$H$_2$ (≥99.5 vol. %) (red) and square-wave voltammogram of 0.5 mM CoTPPS in $H_2O$ containing 0.1 M $NaHCO_3$ (pH 8.4) supported with 0.1 M KCl and purged with $C_2H_2$ (≥99.5 vol. %) (red dotted line) to better display $Co^{II}TPPS/[Co^{I}TPPS]^-$.

Based on these experimental results and the literature, a probable mechanism for the visible-light-driven reduction of $C_2H_2$ to $C_2H_4$ is diagrammed in FIG. 3A. The shift of the CoTPPS Soret band from 426 nm to 412 nm upon addition of NaAsc indicates that the starting [Co$^{III}$P(H$_2$O)(OH)] species is reduced spontaneously to [Co$^{II}$P(OH)] by NaAsc (FIG. 3B and FIG. 19). The importance of this reduction step is underscored by the observation that the starting [Co$^{III}$P(H$_2$O)(OH)] species is not reduced spontaneously to [Co$^{II}$P(OH)] by the other sacrificial donors and consequently no $C_2H_4$ production was observed when NaAsc was replaced with those donors (FIG. 12). Following light absorption by [Ru(bpy)$_3$]$^{2+}$ (PS), the emission of the excited state [Ru(bpy)$_3$]$^{2+*}$ photosensitizer (PS*) is quenched by hole transfer to NaAsc to form [Ru(bpy)$_2$ (bpy$^-$)]+(PS$^-$), followed by electron transfer from PS$^-$ ($E_p$=−1.42 V vs Ag/AgCl) to [Co$^{II}$P(OH)] ($E_{1/2}$=−0.87 V vs. Ag/AgCl) to form the low valent [Co$^I$P]$^-$ species (FIGS. 20 and 21). The order of charge transfer reactions was determined by measuring the bimolecular rate constants for quenching of the photoluminescence of PS* by Stern-Volmer analysis (FIG. 3C and FIG. 22). These data show that photoinduced hole transfer to NaAsc is a factor of 1,000 faster than photoinduced electron transfer to CoTPPS. The nucleophilic attack by Co(I) species on one of the carbon atoms of the electrophilic $C_2H_2$, via a π complex, is followed by a rapid addition of a proton from water. In the final segments of the photocatalytic cycle (FIG. 3A), a second protonation of the Co—C bond by water yields $C_2H_4$ and [Co$^{II}$P(OH)] and re-starts the cycle.

It was confirmed that the Co(I) species is the active site to which $C_2H_2$ binds by adding $NaBH_4$, which is known to reduce the Co(III) of the CoTPPS to Co(I), to a CoTPPS solution without photosensitizer or light. Acetylene was converted to ethylene under these conditions, although $H_2$ is the major product (Table 1, entries 10 and 11).

A mechanism was ruled out in which the major intermediate under these experimental conditions is the cobalt hydride intermediate [$Co^{III}$—H], which would generate from the reaction of [$Co^IP$]⁻ with water and would then coordinate $C_2H_2$ and release $C_2H_4$ after a second protonation step. Based on a previous report of $H_2$ evolution using a CoTPPS catalyst at pH<8 in a phosphate buffer (Beyene et al. *Sustain. Energy Fuels* 2, 2036-2043 (2018)), formation of [$Co^{III}$—H] is believed to be disfavored due to the pH of the bicarbonate system (8.4, whereas the acid-base equilibrium constant between Co(I) and Co(III)—H is $pK_a$=7.7) because the three-component system at pH≥8 did not evolve any detectable $H_2$ under $C_2H_2$ (FIG. 7, Table 1, entry 1, and Table 5). $H_2$ was detected when the sample at pH≥8 was purged with Ar instead of $C_2H_2$ (FIG. 7, Table 1, entry 6 and Table 5). Although this result could indicate that $C_2H_4$ and $H_2$ products evolve from the same [$Co^{III}$—H]intermediate, $C_2H_4$ production and $H_2$ evolution do not share the same pH profile (FIG. 7, Table 1, entries 1,6 and Table 5), suggesting that the common [$Co^{III}$—H]intermediate is not the major pathway for the photoreduction to $C_2H_4$. It was observed that, while $C_2H_4$ production is relatively constant over the pH range 6.8-8.4 (FIG. 7 and Table 1, entry 1 and Table 5), $H_2$ evolution is more significant at more acidic pH and decreases at more basic pH when the sample was purged with Ar instead of $C_2H_2$ (FIG. 7 and Table 1, entry 6 and Table 5). Also ruled out was the presence of radical intermediates because $C_2H_4$ formation was not affected by adding the radical trap TEMPO to the reaction mixture (Table 1, entry 12).

The geometry of the interaction between $C_2H_2$ and the CoTPPS catalyst was further specified by analyzing the stereoselectivity of the reduction reaction through gas-phase IR spectroscopy of the $C_2H_2D_2$ (m/z=30) product (FIG. 3D) obtained when the photoreduction was performed in $D_2O$ solvent and using $C_2H_2$ (5 vol. %, He balance) as feedstock; The reaction of $C_2H_2$ in $D_2O$ could lead to cis-, trans- or asymmetric-ethylene-$d_2$. The IR spectrum of the gaseous product had an intense absorption peak at 842 cm⁻¹ assigned to the non-planar vibration $\omega_7$ of cis-$C_2H_2D_2$ (FIG. 3E). Another minor peak is attributable to $\omega_8$ $C_2HD_3$ (919 cm⁻¹) from the partially H/D exchanged acetylene substrate, and only barely visible are other two isomers of ethylene (asymmetric-$C_2H_2D_2$ and trans-$C_2H_2D_2$ at 943 and 987 cm⁻¹, respectively) (FIG. 3E). This result shows that the proton additions from water occur predominantly in a syn-manner (on one side of the triple bond of the substrate), which is consistent with the formation of a cis-alkene products from the cobalt(I)-catalyzed reduction of alkynes in alkaline media and consistent with the proposed mechanism.

It is suspected that the high selectivity of the three-component photocatalytic system originates in the better ability of the nucleophilic Co(I) species of the CoTPPS catalyst to coordinate highly electrophilic alkynes than less electrophilic alkenes (Table 5).

Importantly for potential industrial application of this process, the [Ru(bpy)$_3$]²⁺-sensitized CoTPPS system selectively photoreduces acetylene even in the presence of excess of ethylene (1 vol. % $C_2H_2$, 30 vol. % $C_2H_4$, He balance). This ethylene/acetylene mixture is a typical industrial ethylene feed and requires a highly selective catalyst to eliminate ethane production. The system achieved near 100% conversion of $C_2H_2$ from this mixture with 98.9% selectivity for ethylene over ethane after 28 h of illumination (FIG. 4 and FIGS. 23-25). Improving the acetylene solubility in water is anticipated to decrease the illumination time necessary to achieve complete acetylene conversion.

This photocatalytic system is not limited to conversion of acetylene. Illumination of the three-component system ([Ru (bpy)$_3$]²⁺, CoTPPS, NaAsc) and propyne ($C_3H_4$, 5 vol. %, He balance) produced propylene ($C_3H_6$) with >99% selectivity over propane ($C_3H_8$) (FIG. 26). This result demonstrates the suitability of this system for the isolation of a pure industrial propylene stream from propyne, a task not accomplished by steam cracking but necessary for the production of polymer-grade propylene, which together with ethylene accounts for ~80% of global plastic demand.

Finally, CoTPPS can be replaced with a tetracarboxyphenyl cobalt porphyrin (CoTPPC) (Table 1, entry 13), which could be anchored to an electrode to exploit this catalytic cycle in a photoelectrochemical cell avoiding the use of a sacrificial electron donor.

The invention claimed is:

1. A method of synthesizing an alkene compound from an alkyne compound, comprising:
    providing a first mixture comprising a cobalt(III) porphyrin compound, a photosensitizer, a reducing agent, and water;
    adding an alkyne compound to the first mixture to form a reaction mixture; and
    illuminating the reaction mixture with light.

2. The method of claim 1, wherein the cobalt(III) porphyrin compound is selected from [{meso-tetra(4-sulfonatophenyl)porphyrinato}cobalt(III)] and [{meso-tetra(4-carboxyphenyl)porphyrinato}cobalt(III)].

3. The method of claim 2, wherein the cobalt(III) porphyrin compound is [{meso-tetra(4-sulfonatophenyl) porphyrinato}cobalt(III)].

4. The method of claim 1, wherein the first mixture comprises the cobalt(III) porphyrin compound at a concentration of about 0.10 μM to about 50 μM.

5. The method of claim 1, wherein the photosensitizer is selected from tris(2,2'-bipyridyl)dichlororuthenium(II) and mesoporous graphitic carbon nitride.

6. The method of claim 5, wherein the photosensitizer is tris(2,2'-bipyridyl)dichlororuthenium(II).

7. The method of claim 6, wherein the first mixture comprises the tris(2,2'-bipyridyl)dichlororuthenium(II) photosensitizer at a concentration of about 50 μM to about 500 μM.

8. The method of claim 5, wherein the photosensitizer is mesoporous graphitic carbon nitride.

9. The method of claim 8, wherein the first mixture comprises about 2.5 mg of the mesoporous graphitic carbon nitride.

10. The method of claim 1, wherein the reducing agent is sodium ascorbate, or a mixture of sodium ascorbate and triethanolamine.

11. The method of claim 1, wherein the first mixture comprises the reducing agent at a concentration of about 0.01 M to about 0.50 M.

12. The method of claim 1, wherein the first mixture has a pH of about 8.0 to about 11.0.

13. The method of claim 1, wherein the alkyne compound is a $C_2$-$C_4$ alkyne and the alkene compound is a $C_2$-$C_4$ alkene.

14. The method of claim 13, wherein the alkyne compound is acetylene and the alkene compound is ethylene.

15. The method of claim 13, wherein the alkyne compound is propyne and the alkene compound is propylene.

16. The method of claim 1, wherein the light is selected from white light and blue light.

17. The method of claim 1, comprising illuminating the reaction mixture with visible light from a light-emitting diode.

18. The method of claim 1, wherein the first mixture is provided in a reaction vessel, and the step of adding the alkyne compound to the first mixture comprises adding the alkyne compound to the reaction vessel at a pressure of about 1 atm.

19. The method of claim 1, wherein the method is conducted at ambient temperature.

20. A composition comprising a cobalt(III) porphyrin compound, a photosensitizer, a reducing agent, and water.

* * * * *